US011964215B2

(12) United States Patent
Kelliher et al.

(10) Patent No.: US 11,964,215 B2
(45) Date of Patent: Apr. 23, 2024

(54) TOY VEHICLE TRACK SYSTEM

(71) Applicant: Mattel, Inc., El Segundo, CA (US)

(72) Inventors: Timothy Lynn Kelliher, Alameda, CA (US); Christopher D. Cimerman, Clarence Center, NY (US); Gerry Cody, Los Angeles, CA (US); Stephen C. Hallaian, Long Beach, CA (US); Adam Miller, Los Angeles, CA (US); Jebraeil Samo, Rowland Heights, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 17/902,376

(22) Filed: Sep. 2, 2022

(65) Prior Publication Data

US 2023/0050151 A1    Feb. 16, 2023

Related U.S. Application Data

(62) Division of application No. 16/849,255, filed on Apr. 15, 2020, now Pat. No. 11,471,783.
(Continued)

(51) Int. Cl.
 *A63H 18/02* (2006.01)
 *A63F 13/803* (2014.01)

(52) U.S. Cl.
 CPC ............ *A63H 18/02* (2013.01); *A63F 13/803* (2014.09); *A63F 2300/8017* (2013.01);
(Continued)

(58) Field of Classification Search
 CPC ........................ A63H 18/02; A63H 33/04–14
 See application file for complete search history.

(56) References Cited

U.S. PATENT DOCUMENTS 3,605,016 A * 9/1971 Zimmerli ............... G04F 10/04
                                                           368/118
4,449,114 A    5/1984 Fascenda et al.
(Continued)

FOREIGN PATENT DOCUMENTS

GB        2376585 A    12/2002
WO    1998006184 A1     2/1998
WO    2001033530 A1     5/2001

*Primary Examiner* — Eugene L Kim
*Assistant Examiner* — Matthew B Stanczak
(74) *Attorney, Agent, or Firm* — Edell, Shapiro & Finnan, LLC

(57) ABSTRACT

A toy vehicle track system of the present application includes electrical connections between the track pieces that allow a central hub, referred to herein as a "portal piece," to communicate with any track pieces included in the track system. In order to ensure that the portal piece can quickly and accurately identify track configurations that are built, the toy vehicle track system implements a communications protocol that supports communications between any two pieces of track. Based on these communications, the portal piece can determine an orientation, a track type, and a position of any track pieces attached, whether directly or indirectly, to the portal piece. The portal piece can then transmit this information to an electronic device executing an application associated with the track system to allow for digital play on a digital version of the track configuration (among other digital play modes).

16 Claims, 43 Drawing Sheets

Related U.S. Application Data

(60) Provisional application No. 62/834,571, filed on Apr. 16, 2019.

(52) U.S. Cl.
CPC .......... *A63H 18/026* (2013.01); *A63H 18/028* (2013.01); *A63H 2200/00* (2013.01)

(56) References Cited

U.S. PATENT DOCUMENTS

| | | | |
|---|---|---|---|
| 4,925,424 A | 5/1990 | Takahashi | |
| 5,048,704 A | 9/1991 | Takahashi | |
| 5,090,030 A | 2/1992 | Jenkins | |
| 5,194,843 A | 3/1993 | Jones | |
| 5,420,903 A | 5/1995 | Newton | |
| 5,435,553 A | 7/1995 | Arima | |
| 5,637,996 A | 6/1997 | McDarren | |
| 5,656,907 A * | 8/1997 | Chainani | G09B 19/0053 |
| | | | 318/587 |
| 5,666,101 A | 9/1997 | Cazzani | |
| 5,741,181 A * | 4/1998 | Nakagawa | A63H 18/16 |
| | | | 273/237 |
| 5,970,882 A | 10/1999 | Smith et al. | |
| 6,006,165 A | 12/1999 | Okada | |
| 6,012,957 A | 1/2000 | Cyr | |
| 6,019,369 A | 2/2000 | Nakagawa | |
| 6,109,186 A | 8/2000 | Smith | |
| 6,192,099 B1 | 2/2001 | Chiu | |
| 6,908,066 B2 | 6/2005 | Koenig | |
| 7,066,781 B2 | 6/2006 | Weston | |
| 7,072,792 B2 | 7/2006 | Freifeld | |
| 7,275,975 B2 | 10/2007 | Trageser et al. | |
| 7,285,035 B1 | 10/2007 | Tullis | |
| 7,312,590 B1 | 12/2007 | Kovach, II et al. | |
| 7,336,178 B2 | 2/2008 | Le | |
| 7,339,478 B2 | 3/2008 | Le | |
| 7,387,559 B2 | 6/2008 | Sanchez-Castro | |
| 7,402,106 B2 | 7/2008 | Weisel, Jr. | |
| 7,474,984 B2 | 1/2009 | Freifeld | |
| 7,488,231 B2 | 2/2009 | Weston | |
| 7,833,080 B2 | 11/2010 | Arnaumanresa et al. | |
| 7,880,413 B1 | 2/2011 | Kovach, II et al. | |
| 7,883,080 B2 | 2/2011 | Hoehle | |
| 7,980,913 B1 | 7/2011 | D'Avanzo | |
| 8,013,550 B1 | 9/2011 | Young et al. | |
| 8,030,871 B1 | 10/2011 | Young et al. | |
| 8,145,448 B2 | 3/2012 | Vincenzini | |
| 8,154,227 B1 | 4/2012 | Young | |
| 8,245,807 B2 | 8/2012 | Frank | |
| 8,257,133 B2 | 9/2012 | Ando | |
| 8,257,157 B2 | 9/2012 | Polchin | |
| 8,287,327 B1 | 10/2012 | Ghaly | |
| 8,337,274 B1 | 12/2012 | Wong | |
| 8,353,737 B2 * | 1/2013 | Sofman | A63H 17/44 |
| | | | 463/2 |
| 8,502,483 B2 | 8/2013 | Young et al. | |
| 8,545,284 B2 | 10/2013 | Baarman | |
| 8,616,320 B2 | 12/2013 | Frank et al. | |
| 8,747,182 B2 | 6/2014 | Sofman et al. | |
| 8,753,165 B2 | 6/2014 | Weston | |
| 8,845,384 B2 | 9/2014 | Ghaly | |
| 8,858,339 B2 | 10/2014 | Reiche | |
| 8,882,560 B2 | 11/2014 | Sofman | |
| 8,892,276 B1 | 11/2014 | Young et al. | |
| 8,951,092 B2 | 2/2015 | Sofman et al. | |
| 8,951,093 B2 | 2/2015 | Sofman et al. | |
| 8,961,260 B2 | 2/2015 | Weston | |
| 9,039,482 B2 | 5/2015 | Cohen | |
| 9,067,145 B2 | 6/2015 | Sofman | |
| 9,126,122 B2 | 9/2015 | Boeckle | |
| 9,162,155 B2 | 10/2015 | Platzer | |
| 9,238,177 B2 | 1/2016 | Sofman et al. | |
| 9,283,472 B2 | 3/2016 | Platzer | |
| 9,320,976 B2 | 4/2016 | Weston | |
| 9,320,978 B2 | 4/2016 | Mliner | |
| 9,446,316 B2 | 9/2016 | Reiche et al. | |
| 9,480,929 B2 | 11/2016 | Weston | |
| 9,486,702 B2 | 11/2016 | Reiche et al. | |
| 9,649,565 B2 | 5/2017 | Leyland et al. | |
| 9,694,296 B2 | 7/2017 | Sofman et al. | |
| 9,704,003 B1 * | 7/2017 | Anderson | G06K 7/10356 |
| 9,802,126 B2 | 10/2017 | Reiche et al. | |
| 9,802,135 B2 | 10/2017 | Caudill | |
| 9,895,622 B2 | 2/2018 | Mliner | |
| 9,901,838 B2 | 2/2018 | Baarman | |
| 9,914,055 B2 | 3/2018 | Reiche et al. | |
| 9,931,578 B2 | 4/2018 | Weston | |
| 9,937,430 B2 | 4/2018 | Kovach, II et al. | |
| 9,937,431 B2 | 4/2018 | Kovach, II et al. | |
| 9,950,271 B2 | 4/2018 | Sofman | |
| 10,652,719 B2 | 5/2020 | Cody et al. | |
| 10,890,897 B2 * | 1/2021 | Denayer | A63H 33/042 |
| 11,253,790 B2 * | 2/2022 | Watanabe | A63F 13/20 |
| 11,471,783 B2 * | 10/2022 | Kelliher | A63H 18/02 |
| 11,498,014 B1 * | 11/2022 | Aalund | A63H 33/26 |
| 11,541,322 B1 * | 1/2023 | Aalund | G09B 1/325 |
| 2003/0040347 A1 * | 2/2003 | Roach | A63F 13/12 |
| | | | 463/9 |
| 2003/0148700 A1 * | 8/2003 | Arlinsky | G09B 1/40 |
| | | | 446/91 |
| 2006/0084361 A1 | 4/2006 | Favorito | |
| 2006/0148579 A1 | 7/2006 | Arnaum Manresa | |
| 2006/0183405 A1 | 8/2006 | Mathews | |
| 2006/0196384 A1 | 9/2006 | Faulcon | |
| 2006/0217232 A1 | 9/2006 | Kondrat | |
| 2006/0226298 A1 | 10/2006 | Pierson | |
| 2006/0229843 A1 | 10/2006 | Freifeld | |
| 2006/0273907 A1 | 12/2006 | Heiman | |
| 2006/0273909 A1 | 12/2006 | Heiman | |
| 2007/0004311 A1 | 1/2007 | Trageser | |
| 2007/0097832 A1 | 5/2007 | Koivisto | |
| 2007/0293324 A1 | 12/2007 | Tyler | |
| 2008/0285628 A1 * | 11/2008 | Gizis | A63H 30/04 |
| | | | 446/454 |
| 2009/0005167 A1 | 1/2009 | Arrasvuori | |
| 2009/0053974 A1 | 2/2009 | Domm | |
| 2009/0197658 A1 * | 8/2009 | Polchin | A63F 13/245 |
| | | | 463/9 |
| 2009/0212103 A1 | 8/2009 | Li | |
| 2009/0215357 A1 * | 8/2009 | Seligman | A63H 33/042 |
| | | | 446/127 |
| 2009/0291764 A1 | 11/2009 | Kirkman | |
| 2010/0001923 A1 * | 1/2010 | Zilber | A63F 13/42 |
| | | | 345/1.1 |
| 2010/0062817 A1 | 3/2010 | Seydoux | |
| 2010/0130096 A1 * | 5/2010 | Baarman | A63H 18/12 |
| | | | 446/444 |
| 2011/0065357 A1 * | 3/2011 | Morgan | A63H 19/10 |
| | | | 446/444 |
| 2012/0122059 A1 * | 5/2012 | Schweikardt | G09B 1/36 |
| | | | 434/118 |
| 2012/0179417 A1 | 7/2012 | Vincenzini | |
| 2012/0221181 A1 * | 8/2012 | Rosener | A63H 19/24 |
| | | | 701/19 |
| 2012/0295510 A1 | 11/2012 | Boeckle | |
| 2013/0059284 A1 | 3/2013 | Giedgowd, Jr. | |
| 2013/0141583 A1 | 6/2013 | Platzer | |
| 2013/0143631 A1 | 6/2013 | Platzer | |
| 2013/0143675 A1 | 6/2013 | Platzer | |
| 2013/0296058 A1 | 11/2013 | Leyland | |
| 2014/0057524 A1 | 2/2014 | Teel | |
| 2014/0273721 A1 | 9/2014 | Katan | |
| 2015/0031268 A1 | 1/2015 | Waites | |
| 2015/0042795 A1 | 2/2015 | Tsuria | |
| 2015/0065258 A1 | 3/2015 | Meade | |
| 2015/0224418 A1 | 8/2015 | Mliner | |
| 2015/0290548 A1 | 10/2015 | Meyers | |
| 2015/0306515 A1 | 10/2015 | Kovach, II | |
| 2015/0375114 A1 * | 12/2015 | Scott | A63F 13/40 |
| | | | 463/47 |
| 2016/0144288 A1 * | 5/2016 | Liu | A63H 17/26 |
| | | | 446/454 |

(56) References Cited

U.S. PATENT DOCUMENTS

| | | | |
|---|---|---|---|
| 2016/0175723 A1 | 6/2016 | Boeckle | |
| 2016/0184724 A1 | 6/2016 | Butler | |
| 2016/0184725 A1 | 6/2016 | Wong | |
| 2016/0193537 A1* | 7/2016 | May | A63F 13/63 463/31 |
| 2016/0287979 A1 | 10/2016 | Akavia | |
| 2016/0332087 A1* | 11/2016 | Sato | A63H 19/24 |
| 2017/0136380 A1* | 5/2017 | Creedican | A63H 33/06 |
| 2017/0173486 A1* | 6/2017 | Rothschild | G06V 10/75 |
| 2017/0195642 A1 | 7/2017 | Platzer | |
| 2017/0213475 A1 | 7/2017 | Butler et al. | |
| 2017/0252664 A1* | 9/2017 | Cletheroe | A63H 33/046 |
| 2018/0104609 A1 | 4/2018 | Mliner | |
| 2018/0211550 A1* | 7/2018 | Bellamy | G09B 19/00 |
| 2019/0105579 A1* | 4/2019 | Karunaratne | A63H 33/042 |
| 2019/0126158 A1* | 5/2019 | Hygh | G06K 7/10009 |
| 2019/0217216 A1* | 7/2019 | Chen | A63H 33/042 |
| 2019/0275439 A1 | 9/2019 | Kit | |
| 2019/0297480 A1 | 9/2019 | Cody et al. | |
| 2020/0061481 A1* | 2/2020 | Payne | A63H 18/026 |
| 2020/0133279 A1* | 4/2020 | Nakayama | G05D 1/0234 |
| 2020/0161803 A1* | 5/2020 | Xiong | A63H 33/042 |
| 2020/0330886 A1* | 10/2020 | Kelliher | A63H 19/30 |
| 2020/0330887 A1* | 10/2020 | Samo | A63H 17/008 |
| 2020/0391129 A1 | 12/2020 | Kit | |
| 2021/0197096 A1* | 7/2021 | Donaldson | A63H 33/042 |
| 2021/0197372 A1* | 7/2021 | He | G06F 13/4068 |
| 2021/0366308 A1* | 11/2021 | Tsuchiya | G09B 19/00 |
| 2021/0370191 A1 | 12/2021 | Murakami et al. | |
| 2021/0375025 A1* | 12/2021 | Yan | G06V 10/757 |
| 2022/0118376 A1* | 4/2022 | Donaldson | A63H 33/086 |
| 2022/0161151 A1* | 5/2022 | Donaldson | A63H 33/08 |
| 2022/0247218 A1* | 8/2022 | Knights | H02J 50/402 |

* cited by examiner

TOY VEHICLE TRACK SYSTEM

CROSS REFERENCE TO RELATED APPLICATIONS

This application is a divisional of U.S. patent application Ser. No. 16/849,255, filed Apr. 15, 2020, entitled "Toy Vehicle Track System," which claims priority to and is based on U.S. Patent Application No. 62/834,571, filed Apr. 16, 2019, entitled "Toy Vehicle Track System," the entire disclosure of each of which are incorporated herein by reference.

FIELD OF THE INVENTION

The present invention relates to a toy vehicle track system with which a toy vehicle can be used and in particular, to a toy vehicle track system with electrically connected pieces that can communicate quickly and accurately based on a communication protocol so that a track configuration of the connected track pieces can be determined.

BACKGROUND OF THE INVENTION

Conventional toy vehicle track sets include one or more sections of track along which a toy vehicle can travel. In some track sets, accessories will act on a toy vehicle when the toy vehicle is traveling along the track or when the toy vehicle reaches the end of a track path. However, in the modern world, even new and interesting physical accessories may have limited play value as compared to digital games and apps.

In view of the foregoing, toy vehicles with identifying data stored therein have been introduced. For example, U.S. patent application Ser. No. 16/170,145, filed on Oct. 25, 2018, and entitled "Toy Vehicle Accessory and Related System," the contents of which are hereby incorporated herein in their entirety, provides a toy vehicle with a wireless tag that can be read by a reader to identify a toy vehicle and import the toy vehicle into a digital world. To further enhance this digital-physical play, toy vehicle track sets that can transfer play into a digital environment are desired. It also desirable to have a toy vehicle track set that implements a relatively straightforward and accurate protocol in order to ensure that play can seamlessly and accurately transfer between a physical toy vehicle track set and a digital representation of the toy vehicle track set.

SUMMARY OF THE INVENTION

A toy vehicle track system is disclosed herein. The toy vehicle track set includes track pieces that can communicate with and/or be sensed by a processing piece (referred to herein as a "portal piece"). Then, the portal piece can determine a configuration of the physical toy vehicle track and transmit data to a computing device (e.g., to a tablet or smartphone executing an app associated with the track system) in order to allow the computing device to create a digital representation of the physical toy vehicle track. In some embodiments, the toy vehicle track set also includes track pieces, such as jumps, splits, infrared (IR) gates, etc. that can add play value to the physical and/or digital toy vehicle track.

In at least some embodiments, the toy vehicle track system presented herein implements a specific communication protocol. The communication protocol is a hi-speed, bi-directional protocol that allows the portal piece of the toy vehicle track system to identify and assign addresses, such as numerical identities, to track pieces connected to the portal piece (directly or via a base piece in which the portal piece is installed). The address assigning is also referred to herein as enumerating. Additionally, the communication protocol allows the portal piece to authenticate and determine the orientation/location of track pieces currently connected to the portal piece (or a base piece in which the portal is installed). In at least some embodiments, the protocol utilizes an extensible message format (XML), is backward and forward compatible, and allows for fast firmware updates.

BRIEF DESCRIPTION OF THE DRAWINGS

Like reference numerals have been used to identify like elements throughout this disclosure.

DETAILED DESCRIPTION OF THE INVENTION

Figure 1:
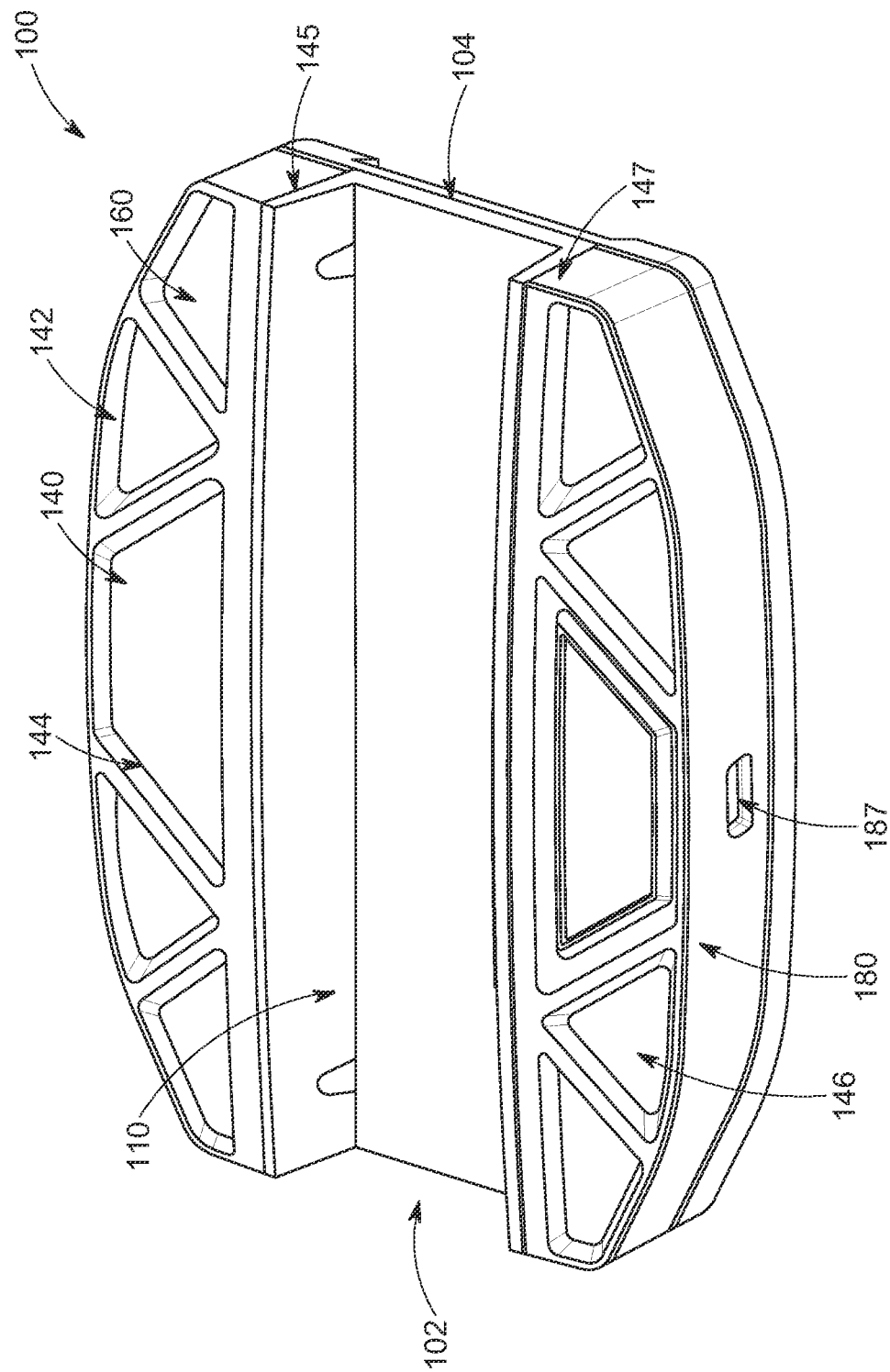
FIG. 1 illustrates a top perspective view of an example embodiment of a portal piece for a toy vehicle track system of the present application.
Figure 2A:
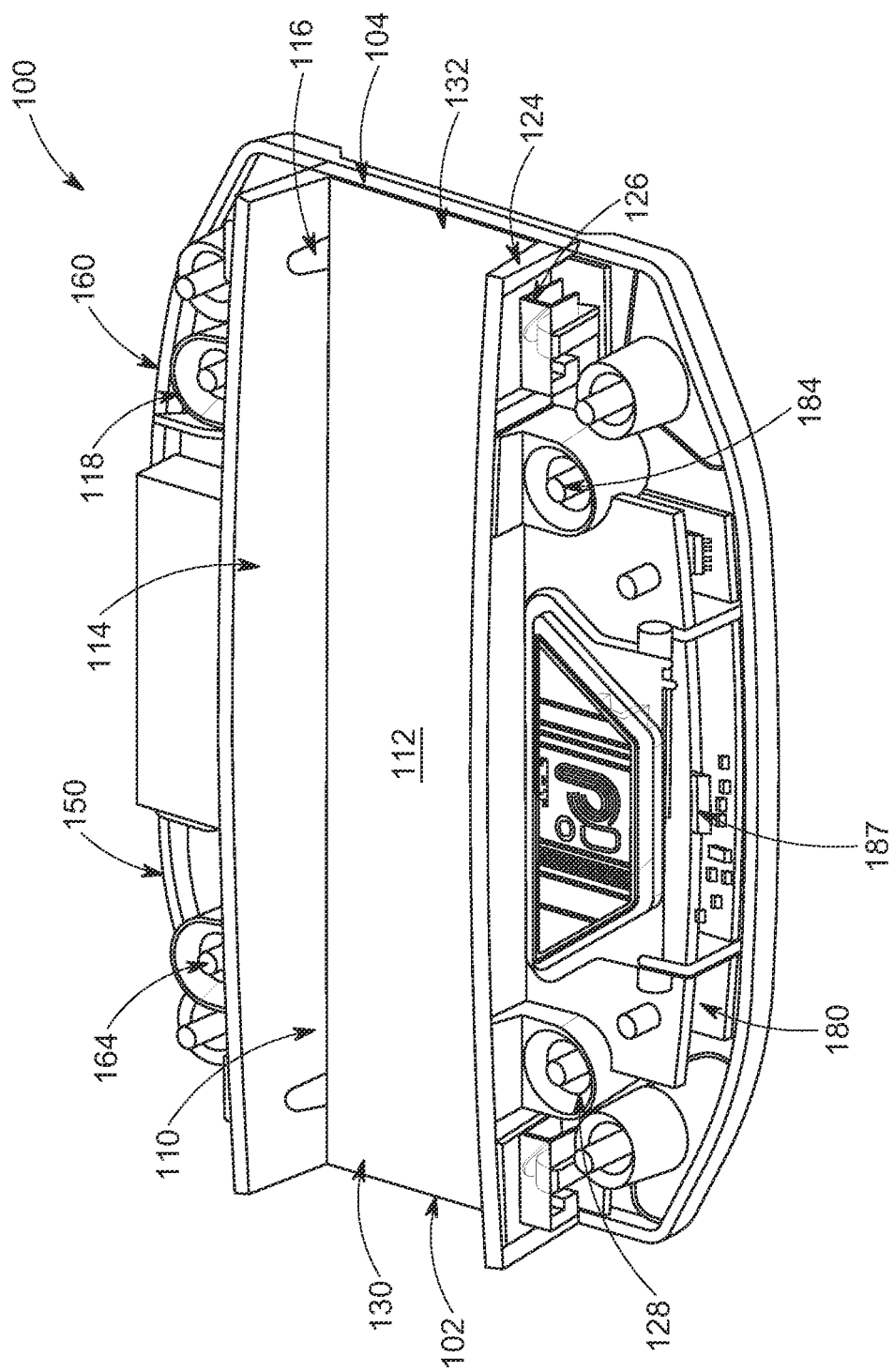
FIGS. 2A and 2B illustrate top perspective views of the portal piece of FIG. 1 with different parts of the portal piece removed to illustrate example interior components of the portal piece.
Figure 2B:
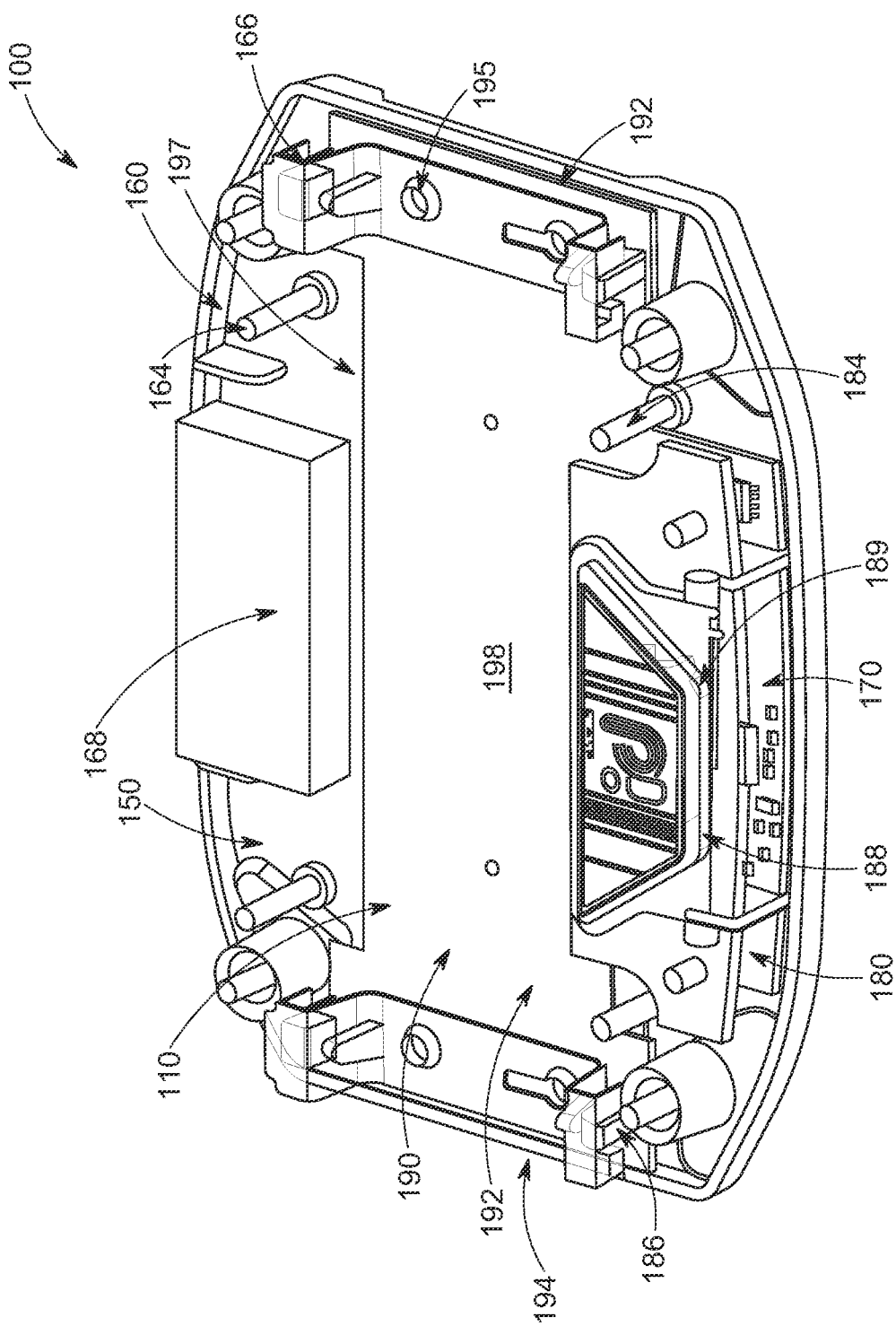
Figure 3:
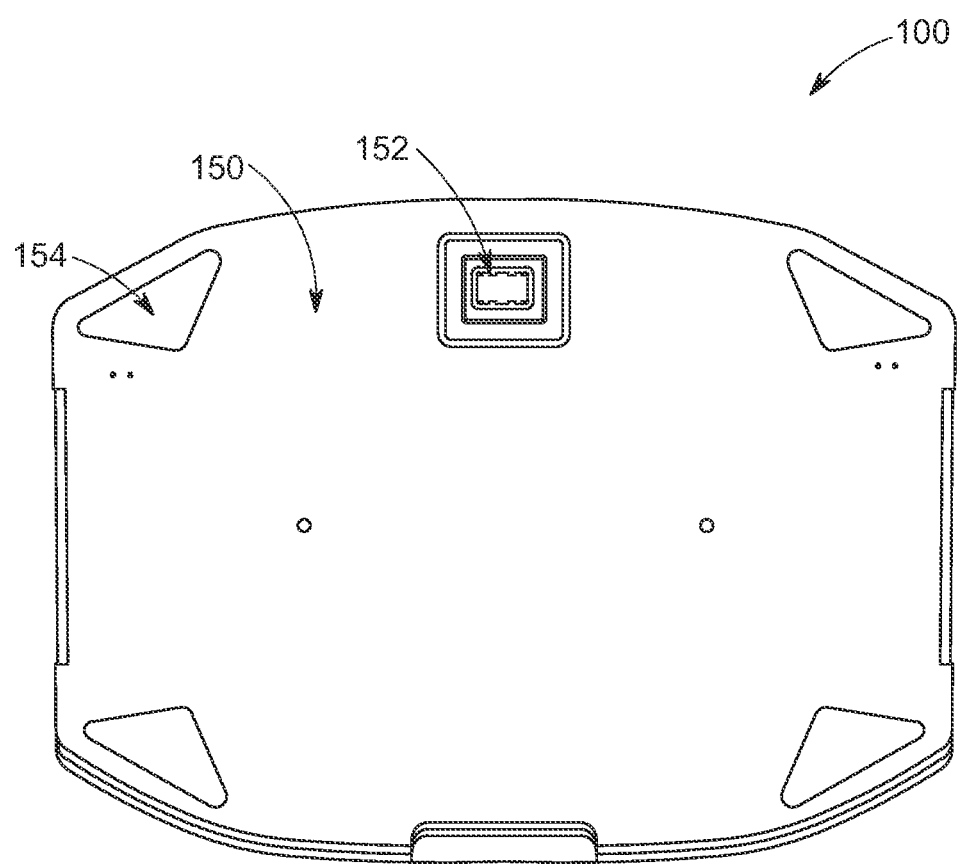
FIG. 3 illustrates a bottom view of the portal piece of FIG. 1.

Overall, the present application is directed to a toy vehicle track system that includes electrical connections between the track pieces. The electrical connections allow a central hub, referred to herein as a "portal piece," to communicate with any track pieces included in the track system so that the portal piece can quickly and accurately determine a track configuration that is built with the track pieces. In order to ensure that the portal piece can quickly and accurately identify track configurations as they are built, the toy vehicle track system implements a communications protocol that supports communications between any two pieces of track. Based on these communications, the portal piece can determine an orientation, a track type, and a position of any track pieces attached, whether directly or indirectly, to the portal piece. The portal piece can then transmit this information to an electronic device executing an application associated with the track system to allow for digital play on a digital version of a detected track configuration (among other digital play modes).

FIGS. 1, 2A, 2B, and 3 illustrate a portal piece according to one embodiment. The portal piece 100 extends from a first end 102 (upstream end 102) to a second end 104 (downstream end 104) and includes a track portion 110 and a base portion 140. The base portion 140 includes a housing 142 that defines one or more internal cavities for computing and/or electrical components. Additionally, the base portion 140 defines a passageway 192 configured to receive the track portion 110.

More specifically, the housing 142 is formed by a base plate 150, a first side cover 144, and a second side cover 146. The base plate 150 and the first side cover 144 define a first side interior cavity 160 while the base plate 150 and the second side cover 146 define a second side interior cavity 180. In the depicted embodiment, a connector 190 sits atop the base plate 150 to connect components in the first side interior cavity 160 with components in the second side interior cavity 180. Thus, in the depicted embodiment, an interior wall 145 of the first cover 144, an interior wall 147 of the second side cover 146, and a top surface 197 of the connector 190 define the passageway 192 for the track portion 110. However, in other embodiments, the connector 190 could be included or embedded in the base plate 150 and the passageway could be defined in any manner.

The track section 110 extends from a first end 130 to a second end 132 and includes a bottom 112 that is bounded by opposing sidewalls 114, 124. Sidewall 114 includes openings 116 and mounts 118 while sidewall 124 includes openings 126 and mounts 128. Mounts 118 can couple the track portion 110 to posts 164 included in the first side interior cavity 160 and mounts 128 can couple the track portion 110 to posts 184 included in the second side interior cavity 180.

Openings 116 and openings 126 provide openings through which sensors 166 included in the first side interior cavity 160 can communicate with sensors 186 included in the second side interior cavity 180. For example, in some embodiments, sensor 166 may be infrared (IR) transmitters and sensors 186 may be IR receivers, and sensors 166 and 186 may cooperate to detect a toy vehicle moving along the track portion 110 with break the beam technology. An example of this type of tracking is described in U.S. patent application Ser. No. 16/170,145, filed on Oct. 25, 2018, and entitled "Toy Vehicle Accessory and Related System," which is incorporated herein in its entirety. However, in other embodiments, any desirable sensors may be aligned with openings 116 and 126 and a toy vehicle can be detected moving along the track portion 110. In fact, sensors that do not require openings (i.e., sensors that do not require line of sight communication) could be included in the portal piece 100 so that the track section 110 need not include openings 116 and 126.

In addition to sensors 166, 186, the two side portions may also house a number of other computing and/or electrical components. In the depicted embodiment, the first side interior cavity 160 also houses a battery module 168. The battery module may be a battery, such as a rechargeable battery, a battery housing that can receive replaceable batteries, or a power converter than can convert power received from an outlet into usable power for the components of the portal piece 100. Meanwhile, the second side interior cavity 180 may house a switch 188 with a light box 189, as well as computing components 170, such as a processor, memory, and communications module, as is described in further detail below in connection with FIG. 4.

The second side interior cavity 180 may also house a data port 187 that may allow a wired connection to the computing components 170. Similarly, the base plate 150 of the portal piece 100 may also have a connector 152 that may provide an electrical and/or data connection to a base piece, examples of which are described below. The base plate 150 may also have mounting features 154 (e.g., feet) that may enhance and/or facilitate a mechanical connection between the portal piece 100 and a base piece.

As mentioned above, the connector 190 can connect components in the first side interior cavity 160 with components in the second side interior cavity 180. To effectuate this, the connector 190 of the depicted embodiment includes a ferrite sheet 198 that extends from a first end 194 to a second end 196. The first end 194 is adjacent or proximate the upstream end 102 of the portal piece 100 and the second end 196 is adjacent the downstream end 104 of the portal piece 100. Additionally, the connector 190 includes two brackets 195 that mount/align sensor components 166/186 in alignment with each other and with the openings 116/126 included on the track portion 110.

Figure 4:
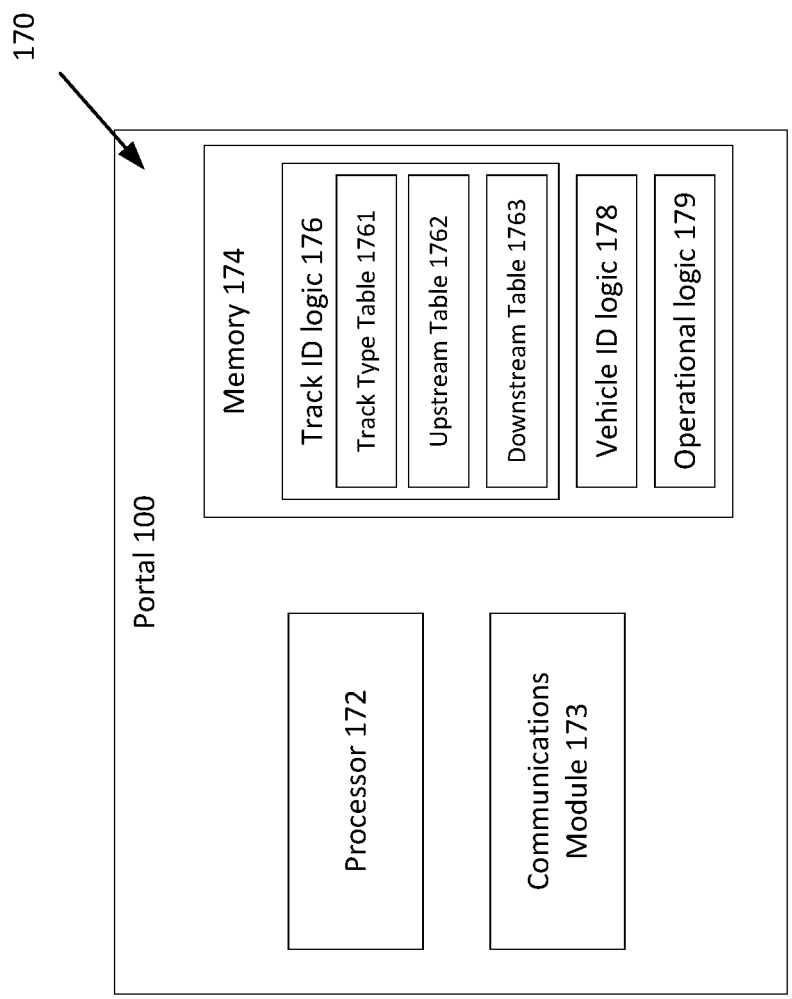
FIG. 4 is a block diagram illustrating example computing components of the portal piece of FIG. 1.

Now turning to FIG. 4, at a high-level, the computing components 170 included in the portal piece 100 may include a processor 172, a memory 174, and a communications module 173 (each of which may be powered by battery module 168). The memory 174 may store track identification logic 176, which may be executed by the processor 172 to determine a configuration of track pieces connected to the portal piece 100. That is, the track identification logic may allow the portal piece to identify a track configuration that has been or is being built off of the portal piece. As is explained in further detail below, the logic may cause the portal piece to update or build various tables, such as a track type table 1761, an upstream table 1762, and a downstream table 1763 (in some embodiments, the upstream table 1762 and downstream table 1763 might be maintained as one combined table). These tables can be maintained in local memory and/or transmitted to an electronic device that is connected to the portal piece and executing an application associated with the toy vehicle track system presented herein (also referred to as the "track app") so that the electronic device can create a digital representation of a detected track configuration.

Additionally, the memory 174 may store vehicle identification logic 178 and store operational logic 179. The identification logic 178 may be executed by the processor 172 to identify toy vehicles traversing physical track pieces connected to the portal piece 100, for example, in accordance with the techniques described in U.S. patent application Ser. No. 16/170,145, filed on Oct. 25, 2018, and entitled "Toy Vehicle Accessory and Related System," which, as mentioned above, is incorporated herein in its entirety. Meanwhile, the operational logic 179 may allow the processor 172 to operate and/or monitor various sensors/equipment included in the portal piece 100 or track pieces connected thereto.

More specifically, memory 174 may include random access memory (RAM) or other dynamic storage devices (i.e., dynamic RAM (DRAM), static RAM (SRAM), and synchronous DRAM (SD RAM)), for storing information and instructions to be executed by processor 172. The memory 174 may also include a read only memory (ROM) or other static storage device (i.e., programmable ROM (PROM), erasable PROM (EPROM), and electrically erasable PROM (EEPROM)) for storing static information and instructions for the processor 172. Although not shown, the portal piece 100 may also include a bus or other communication mechanism for communicating information between the processor 172 and memory 174.

Meanwhile, although FIG. 4 shows the processor 172 as a single box, it should be understood that the processor 172 may represent a plurality of processing cores, each of which can perform separate processing. The processor 172 may also include special purpose logic devices (i.e., application specific integrated circuits (ASICs)) or configurable logic devices (i.e., simple programmable logic devices (SPLDs), complex programmable logic devices (CPLDs), and field programmable gate arrays (FPGAs)), that, in addition to microprocessors and digital signal processors may individually, or collectively, are types of processing circuitry.

The processor 172 performs a portion or all of the processing steps required to execute instructions received at communication module 173 and/or instructions contained in memory 174. Such instructions may be read into memory 174 from another computer readable medium. One or more processors in a multi-processing arrangement may also be employed to execute the sequences of instructions contained in memory 174. In alternative embodiments, hard-wired circuitry may be used in place of or in combination with software instructions. Thus, embodiments are not limited to any specific combination of hardware circuitry and software. Put another way, the portal 100 includes at least one computer readable medium or memory for holding instructions programmed according to the embodiments presented herein and for containing data structures, tables, records, or other data described herein.

Still referring to FIG. 4, the communication module 173 provides a two-way data communication coupling to a network, such as a local area network (LAN) or the Internet. The two-way data communication coupling provided by the communication module 173 can be wired (e.g., via data port 152 and/or 187) or wireless. Moreover, the two-way communication may allow the portal piece 100 to communicate with other track pieces in accordance with a communications protocol described in further detail below and/or may allow the portal piece to communicate with an electronic device that is coupled to the track system (e.g., via a wired connection between an electronic device and data port 152 and/or 187 of the portal piece and/or via a wireless connection, such as a BLUETOOTH LE connection).

Although an electronic device is not shown in FIG. 4, the portal piece 100 can connect to any personal electronic device, including portable electronic devices like smartphones, tablets, and laptops running a variety of operating systems (e.g., iOS, Android, etc.), as well as desktops or other computing device that require wired power. Still further, in at least some embodiments, the communications module 173 is or includes a near field communication (NFC) reader that allows the communications module 173 to read wireless tags included in toy vehicles traveling along the track in the manner described in U.S. patent application Ser. No. 16/170,145, filed on Oct. 25, 2018, and entitled "Toy Vehicle Accessory and Related System."

Figure 5:
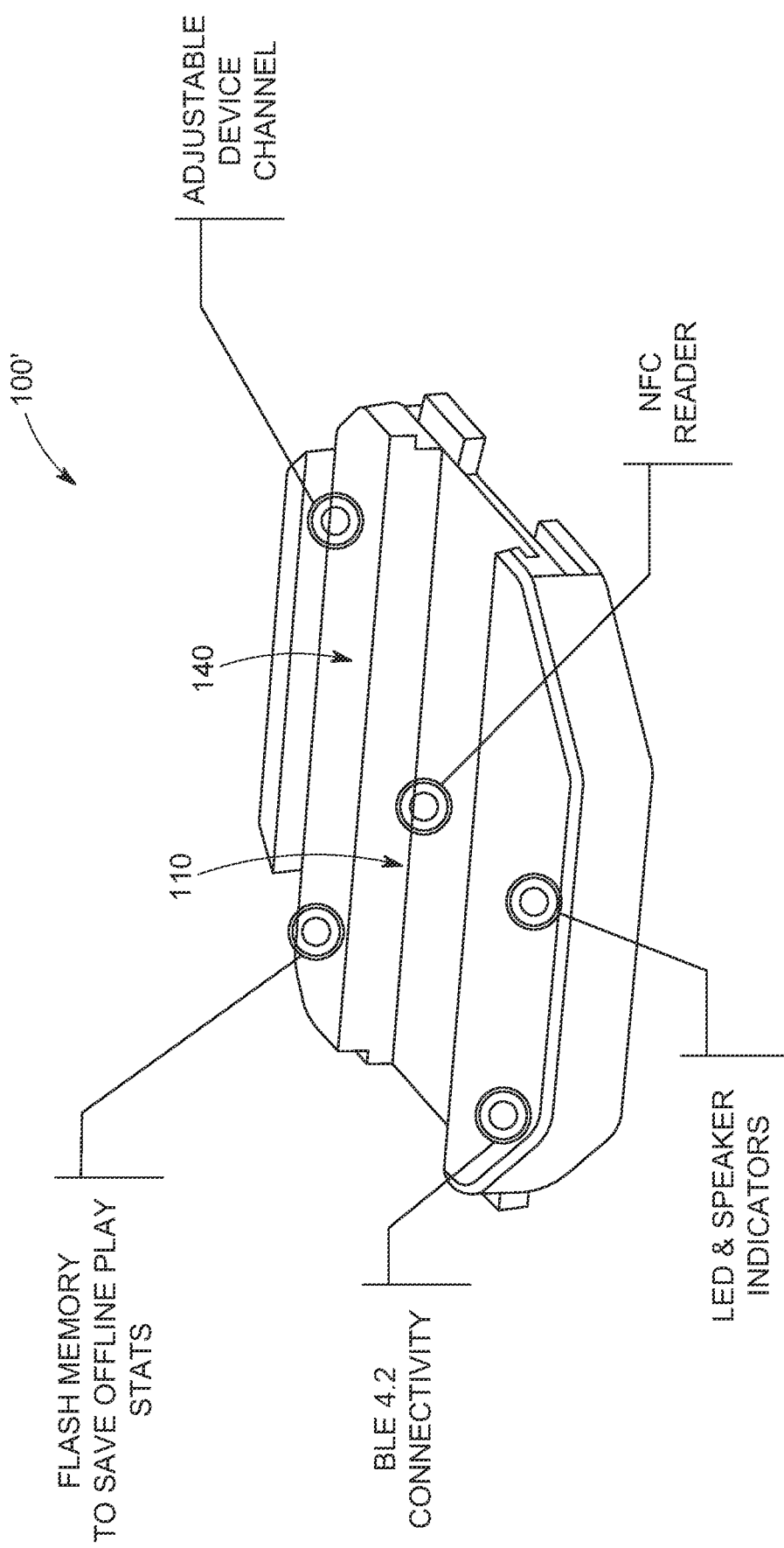
FIG. 5 illustrates a top perspective view of another example embodiment of a portal piece for a toy vehicle track system of the present application.

FIG. 5 illustrates another embodiment of a portal piece 100' that is suitable for the toy vehicle track system presented herein. Like portal 100, portal 100' includes a base portion 140 and a track portion 110. Additionally, the portal piece 100' may include a holding portion, as is described in at least some embodiments of U.S. patent application Ser. No. 16/170,145, filed on Oct. 25, 2018, and entitled "Toy Vehicle Accessory and Related System."

Figure 6:
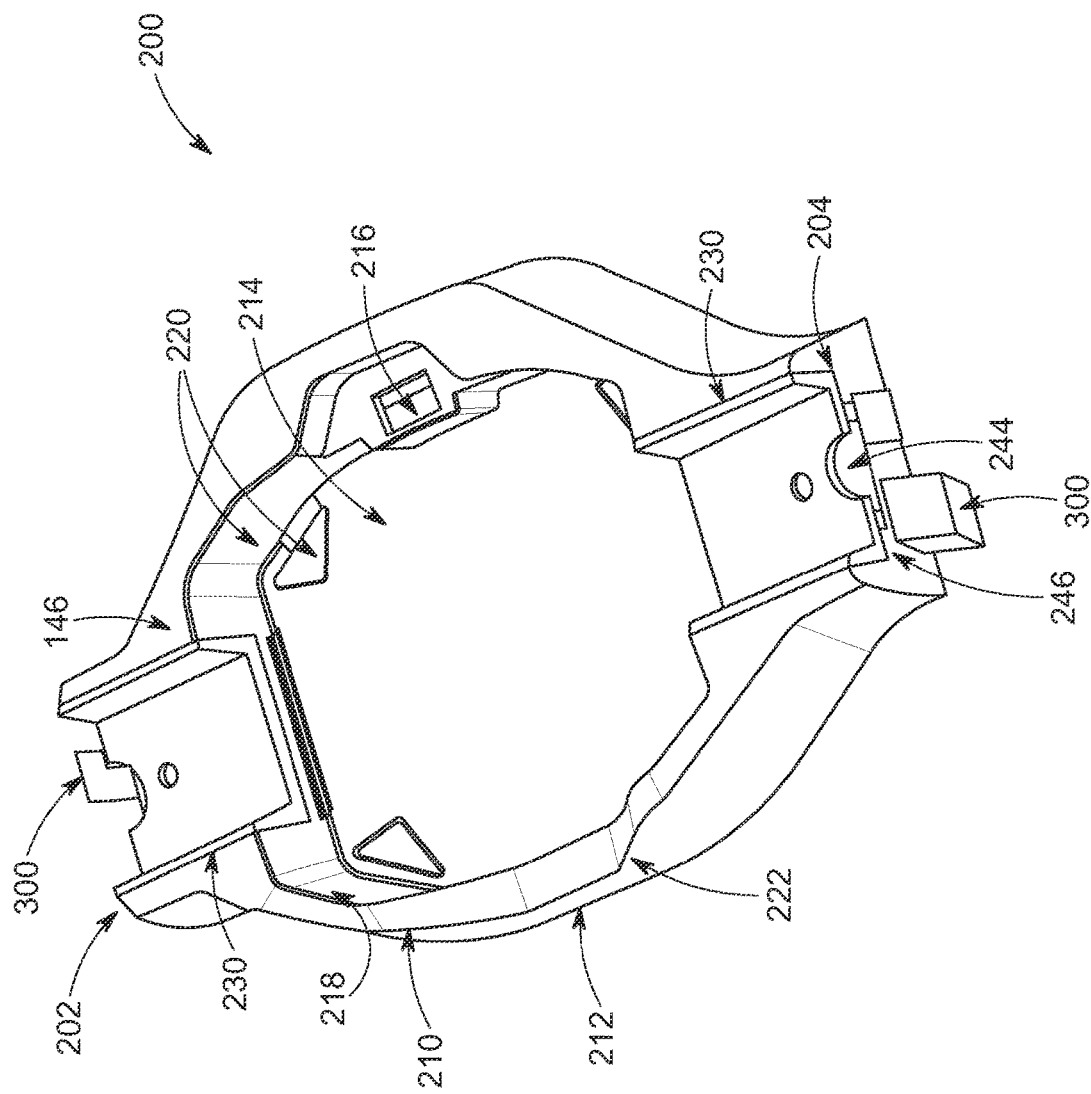
FIG. 6 illustrates a top perspective view of an example embodiment of a base piece for a toy vehicle track system that is configured to receive the portal piece of FIG. 1.
Figure 7:
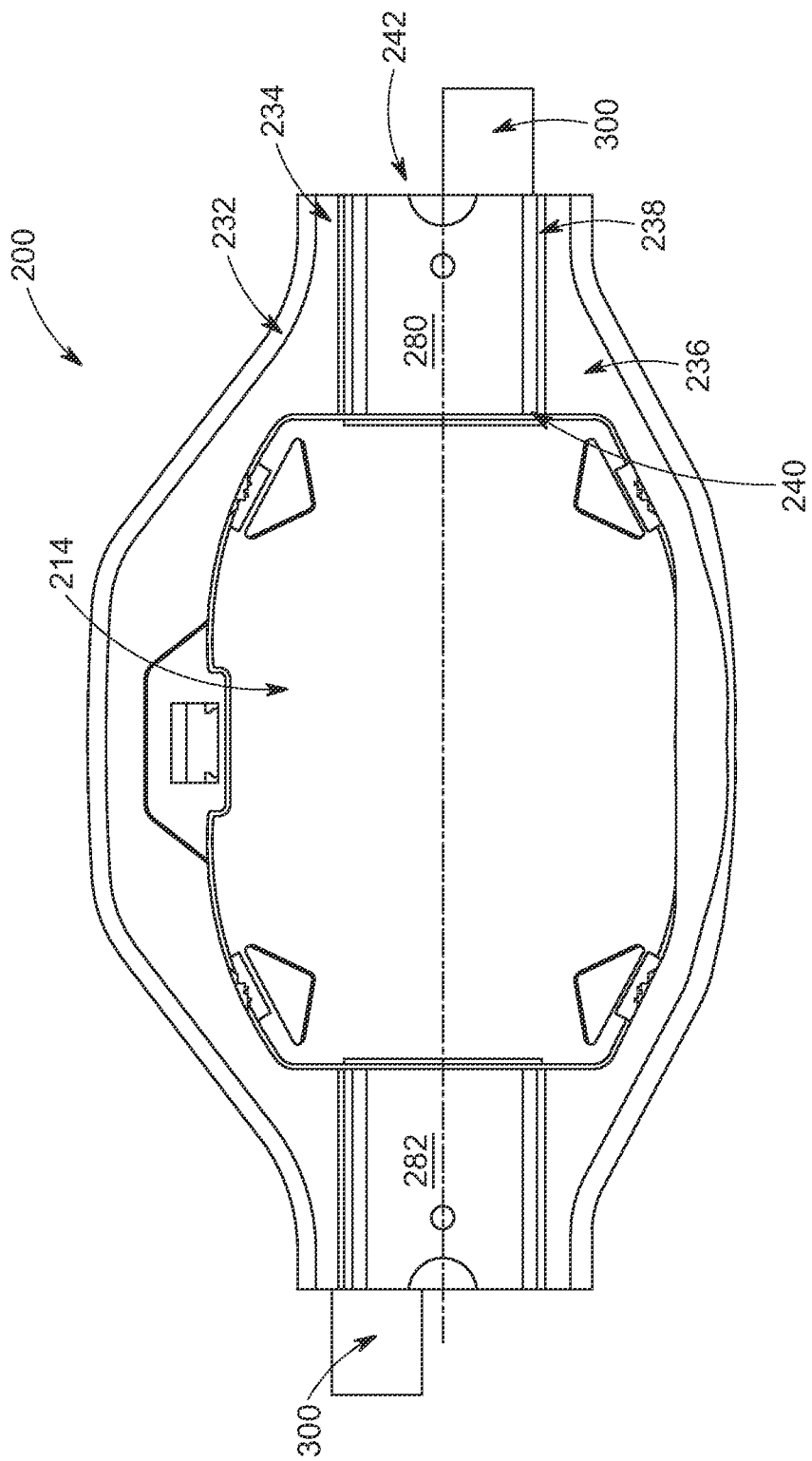
FIG. 7 illustrates a top view of the base piece of FIG. 6.
Figure 8:
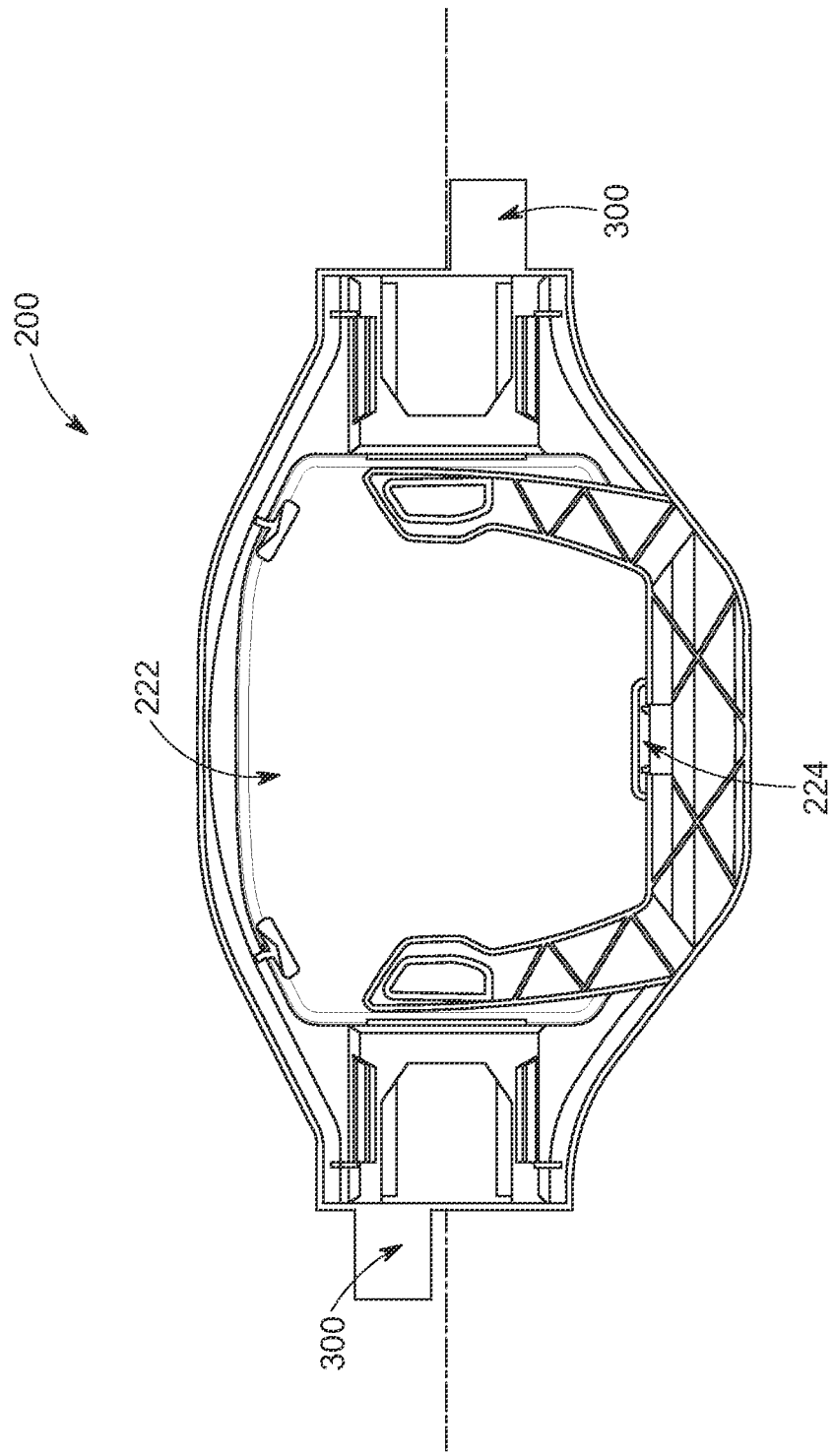
FIG. 8 illustrates a bottom view of the base piece of FIG. 6.

FIGS. 6-8 illustrate an example base piece 200 that can receive the portal piece 100 and provide electrical connections to other track pieces of the toy vehicle track system presented herein. The base piece 200 extends from a first end 202 (an upstream end) to a second end 204 (a downstream end) and includes a base portion 210 that defines a portal receptacle 214 and track receptacles 230, among other features. The portal receptacle 214 allows the portal piece 100 to be removably coupled, mechanically and electrically, to the base piece 200.

More specifically, the base portion 210 includes a housing 212 that defines the portal receptacle 214 between track receptacles 230 disposed at the opposing ends 202, 204 of the base piece 200. The portal receptacle 214 is generally shaped to mate with a peripheral surface of the portal piece 100, but may also include mounting receptacles 220 configured to mate with the mounting features 154 included on the bottom of the portal piece 100. Engaging mounting features 154 and/or the outer periphery of the portal piece 100 with the mounting receptacles 220 of the base piece 200 may form a snap or press fit connection between the two pieces to ensure they are securely mechanically coupled together.

The base piece may also include contoured inner walls 218 to support this mechanical connection and/or to enable a user to grip the portal piece 100 to disconnect the two pieces. Meanwhile, the portal receptacle may also include an electrical connector 216 (e.g., a "base connector") that is sized and positioned to mate with the electrical port 152 (e.g., a "portal connector") included on the bottom 150 of the portal piece 100. Thus, when the portal piece 100 is mechanically connected to the base piece 200, the portal piece 100 may also be electrically coupled to the base piece 200. The shape and size of the portal receptacle 214, as well as any coupling features included therein may also ensure that the portal is always installed with its upstream end 102 aligned with the upstream end 202 of the base 200 and its downstream end 104 aligned with the downstream end 204 of base 200. As is discussed in further detail below, this may enable the portal 100 to determine the specific position and orientation of track pieces that are connected to the portal piece 100 (for simplicity, track pieces may be described to herein as being connected to the portal piece 100; however, it should be understood that this description may refer to connecting a track piece to the portal piece 100 via the base piece 200).

An outer wall 222 of the base may be spaced apart from the inner wall 218 to form a protective barrier around the portal receptacle 214. In at least some locations, the outer wall 222 may be contoured in a substantially similar manner to the inner wall to enable a user to grip a portal piece 100 sitting in the portal receptacle 214 and disconnect the two pieces. In at least some embodiments, the outer wall 222 may also define an external electrical port 224. In some instances, port 224 may allow an electronic device, such as a smartphone or tablet, to connect to a portal piece 100 installed in the base piece 200 (i.e., a portal piece coupled to port 216) via a wired connection. Additionally or alternatively, port 224 may enable power delivery to a portal piece 100 installed in the base piece 200.

The track receptacles 230 formed on opposing sides of the portal receptacle 214 are sized to receive tack pieces that can align with the track section 110 of the portal piece 100. That is, each of the receptacle 230 is formed by an inner surface 234 of a first sidewall 232 and an opposing inner surface 238 of a second sidewall 236. Each of the track receptacles 230 spans from an outer wall 242 that is aligned with end 202 or end 204 of the base piece 200 to an inner wall 240 that is aligned with the portal receptacle 214. Put another way, the track receptacles 230 define passageways 246 from the portal receptacle 214 to either end 202 or end 204 of the base piece 200.

Track pieces 280 and 282 are mounted on upper surfaces 244 of the passageways 246 so that when a portal piece 100 is mounted in the base piece 200, the portal piece 100 and base piece 200 cooperate to provide a track pathway from the first end (i.e., the upstream end) 202 of the base piece to the second end (i.e., the downstream end) 204 of the base piece 200. Track sections 280 and 282 may be substantially similar to the track section 110 included in portal piece 100 and, thus, any description of track section 110 included above is intended to apply to track sections 280 and 282 and, for brevity, is not repeated here. That said, in at least some embodiments, track sections 280 and 282 need not include openings for sensors (e.g., IR components), for example, if track section 110 accommodates such components.

Still referring to FIGS. 6-8, each end of base piece 200 includes a track coupler 300. The track couplers 300 are described in further detail below; however, importantly, the track coupler 300 included at the upstream end 202 of base piece 200 has a mirrored arrangement as compared to the coupler 300 included at the downstream end 204 of base piece 200. Thus, if the base piece was flipped about its Y-axis (i.e., rotated 180 degrees about a vertical axis extending through a center of the portal receptacle 214), protrusions of the couplers 300 would be disposed in the same place as shown in FIGS. 6-8.

Moreover, although not shown explicitly in FIGS. 6-8, when a portal piece 100 is installed in the base piece 200 so that an electrical connection is formed between the portal piece 100 and the base piece 200, the computing components 170 included in the portal piece 100 will be electrically coupled to the couplers 300 included in the base piece 200. In some embodiments, the couplers 300 connect directly to the components 170 of the portal piece 100. In fact, in some embodiments, the portal piece 100 does not include couplers 300 and the base piece 200 does not include computing components (e.g., a processor) and, thus, these components cooperate to communicate with other track pieces. Alternatively, the base piece 200 may also include computing components, such as a processor, memory, and communications module, and the couplers 300 may communicate with the computing components 170 included in the portal piece 100 via the computing components included in the base piece 200.

Figure 9:
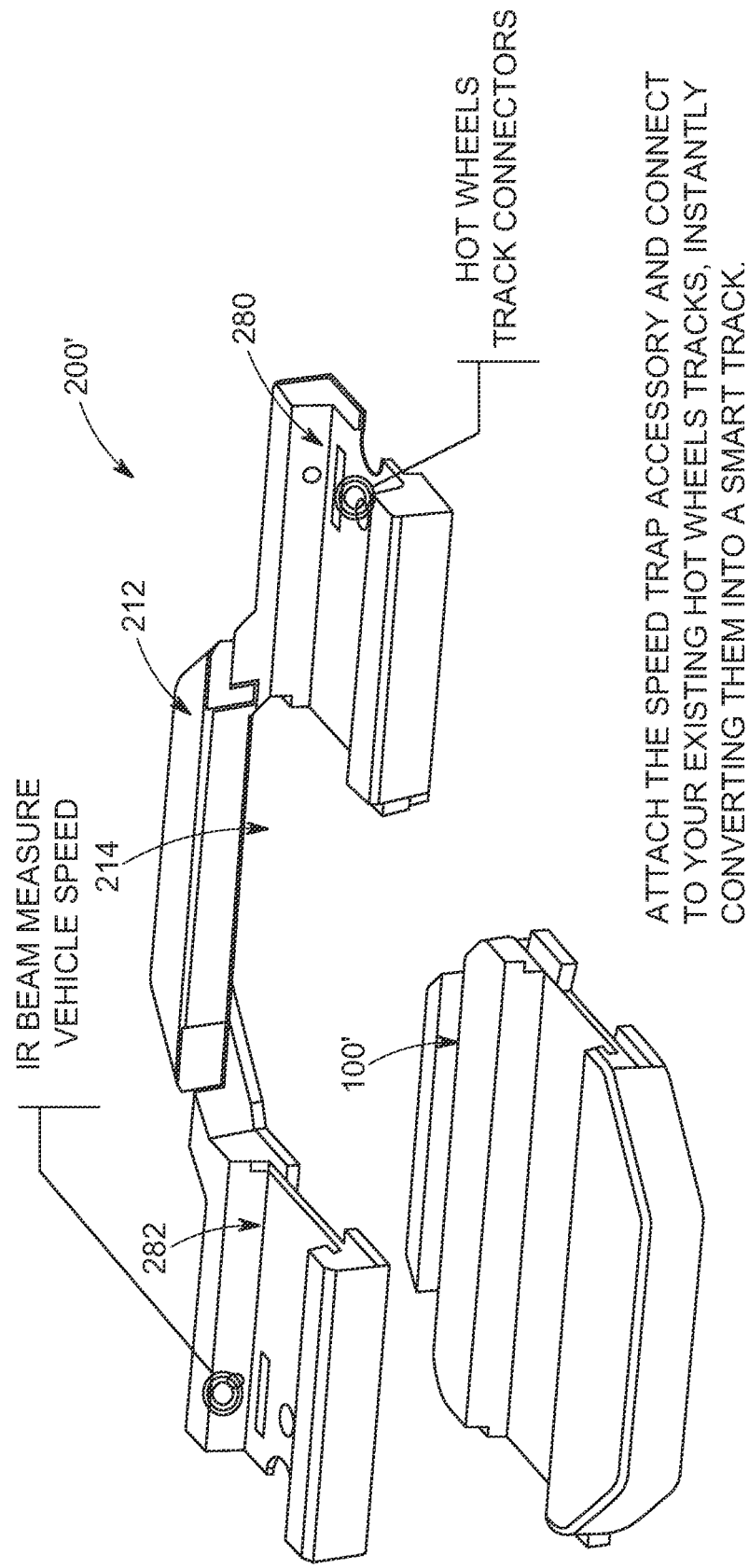
FIG. 9 illustrates a perspective view of another example embodiment of a base piece for a toy vehicle track system that is configured to receive a portal piece.
Figure 10:
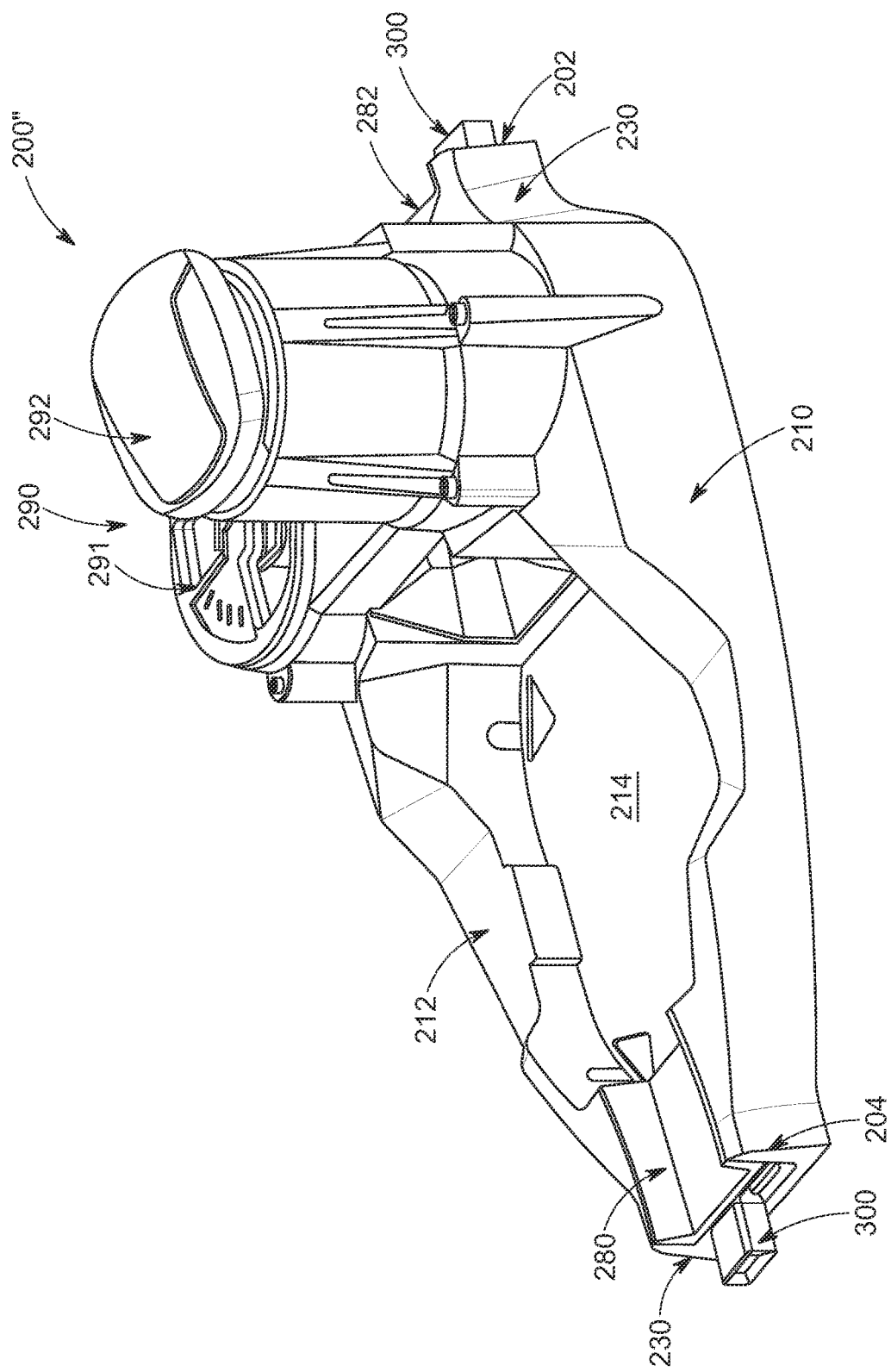
FIGS. 10 and 11 illustrate perspective views of another example embodiment of a base piece for a toy vehicle track system that is configured to receive the portal piece of FIG. 1, the base piece of FIGS. 10 and 11 including a booster.
Figure 11:
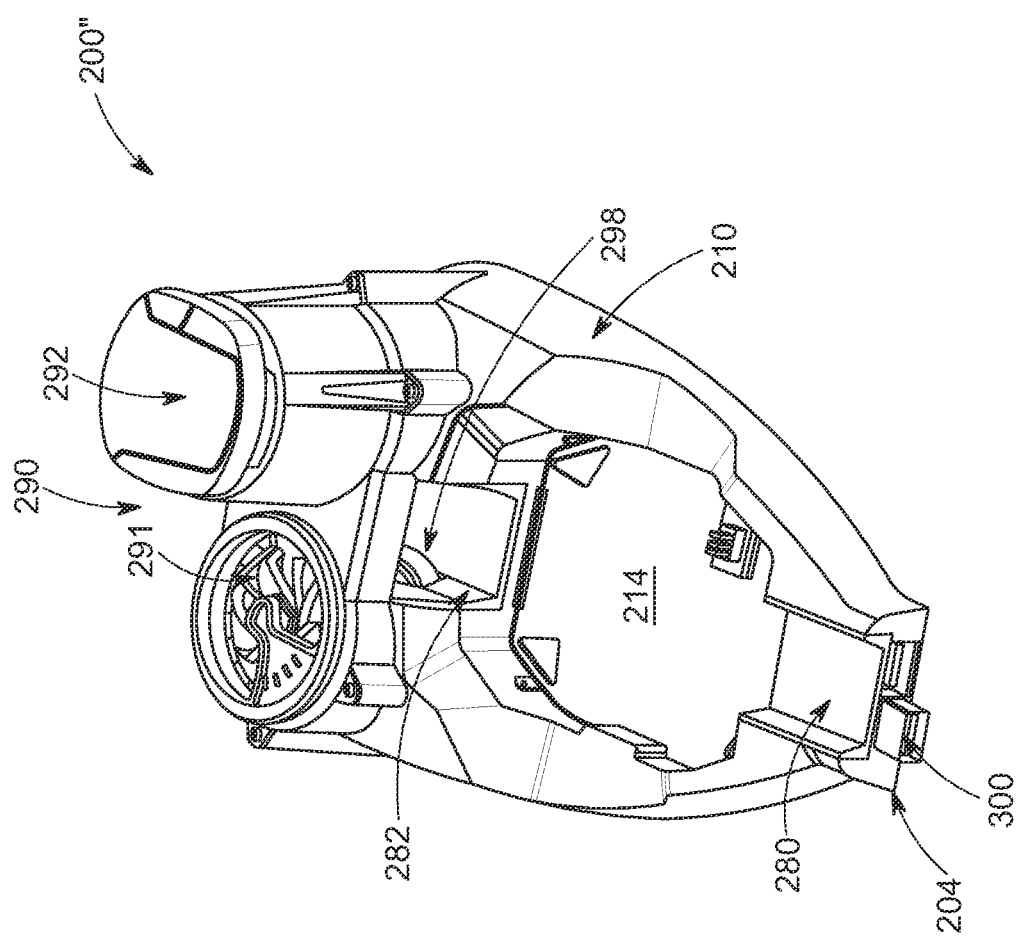

FIGS. 9-11 illustrate additional embodiments of base pieces that can receive a portal piece 100. Each of these additional embodiments incorporates different features into the base piece. In FIG. 9, the base piece 200' includes portal receptacle 214 with an open-side so that the portal piece 100' can slide into the portal receptacle 214. Additionally, the base piece 200" includes IR beams to track toy vehicle movement through the base piece, which can supplement or replace sensors included in the portal piece 100. Meanwhile, in FIGS. 10 and 11, the base piece 200" includes a portal receptacle 214 that is substantially similar to the portal receptacle of base piece 200, but the base piece 200" also includes a booster 290 configured to propel toy vehicles along track sections 280, 282, and 110. The booster 290 includes a booster assembly 298 (e.g., one or more booster wheels) that engages and propels toy vehicles, an actuator portion 292 that allows a user to actuate or rev the booster assembly 298, and a gauge section 291 that shows the speed of the booster assembly 298.

Figure 12:
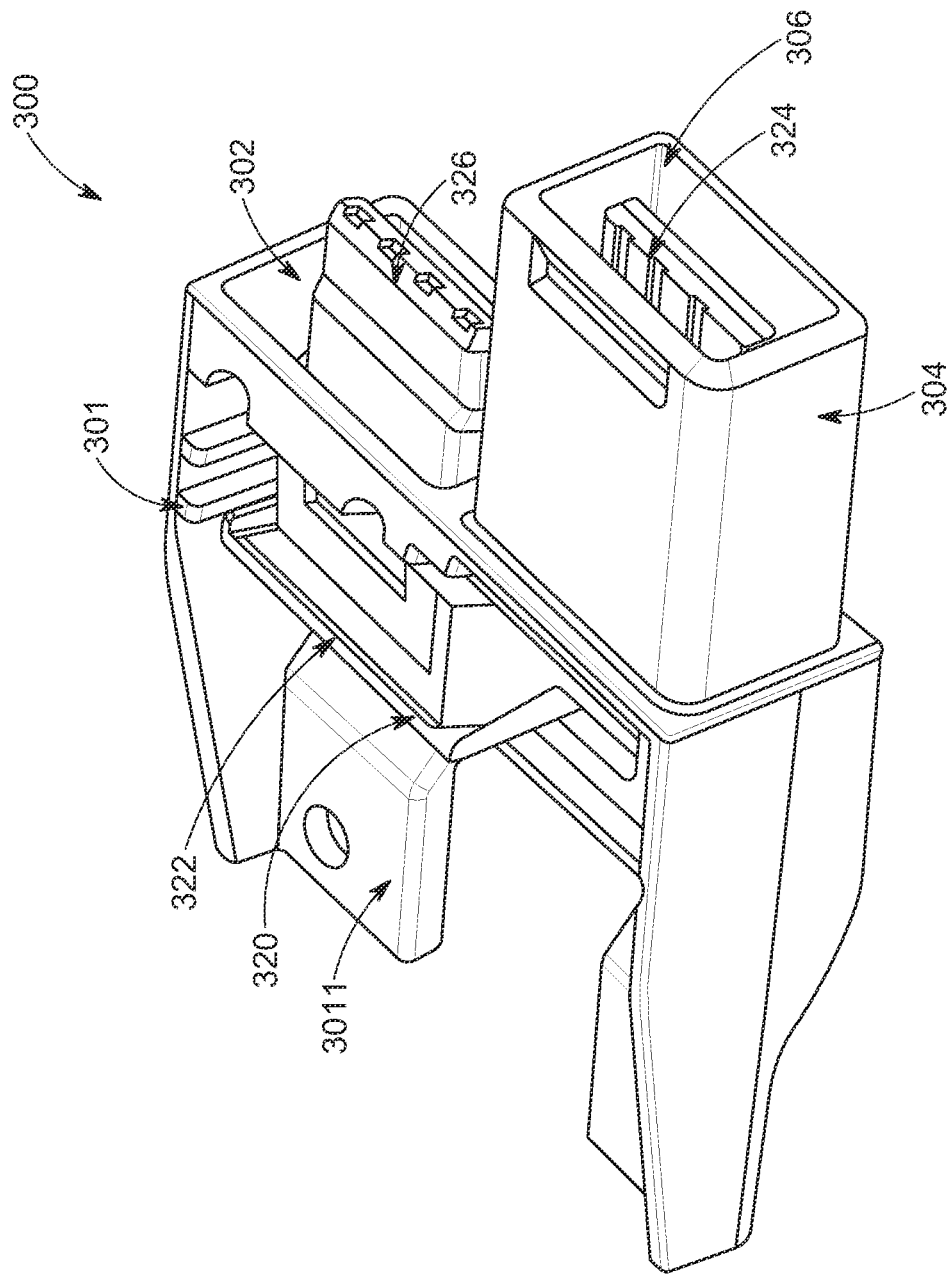
FIG. 12 illustrates a top perspective view of a coupler that can be included in ends of the base piece or track pieces included in a toy vehicle track system of the present application.

FIG. 12 illustrates an example coupler 300 that can be included at the upstream and downstream ends 202, 204 of a base piece 200. The coupler 300 can also be included at the upstream and downstream ends of other track pieces, examples of which are described below in connection with at least FIGS. 14-29. The coupler 300 includes a mechanical coupling member 301 and an electrical coupling member 320. The mechanical coupling member 301 includes a projection 304 and a receptacle 302 that is sized to receive and mate with a projection 304 included on another track piece. The projection 304 includes a recess 306 so that both the projection 304 and the receptacle 302 provide an interior space in which the electrical coupling member 320 may be positioned. The mechanical coupling member 301 also includes a back end 3011 that is configured to mechanically connect the coupler to base piece 200 or another track piece, such as those shown in FIGS. 14-33.

The electrical connector 320 includes a male connector 324 (also referred to as a plug) and a female connector 326 (also referred to as a socket) that are configured to mate to with a socket 326 and plug 324, respectively, included on a coupler 300 of another piece to form an electrical connection. For example, the male connector 324 may include an arrangement of pins and the female connector 326 may include pin receptacles arranged to mirror the arrangement of pins. The male connector 324 is disposed in the recess 306 of the projection 304 and the female connector 326 is disposed in the receptacle 302. The electrical coupling member 320 also includes a back end 322 that is configured to electrically connect the electrical coupling member 320 to any electrical/computing components included in a portal 100, a base piece 200, or another track piece, such as those shown in FIGS. 14-33.

Figure 13:
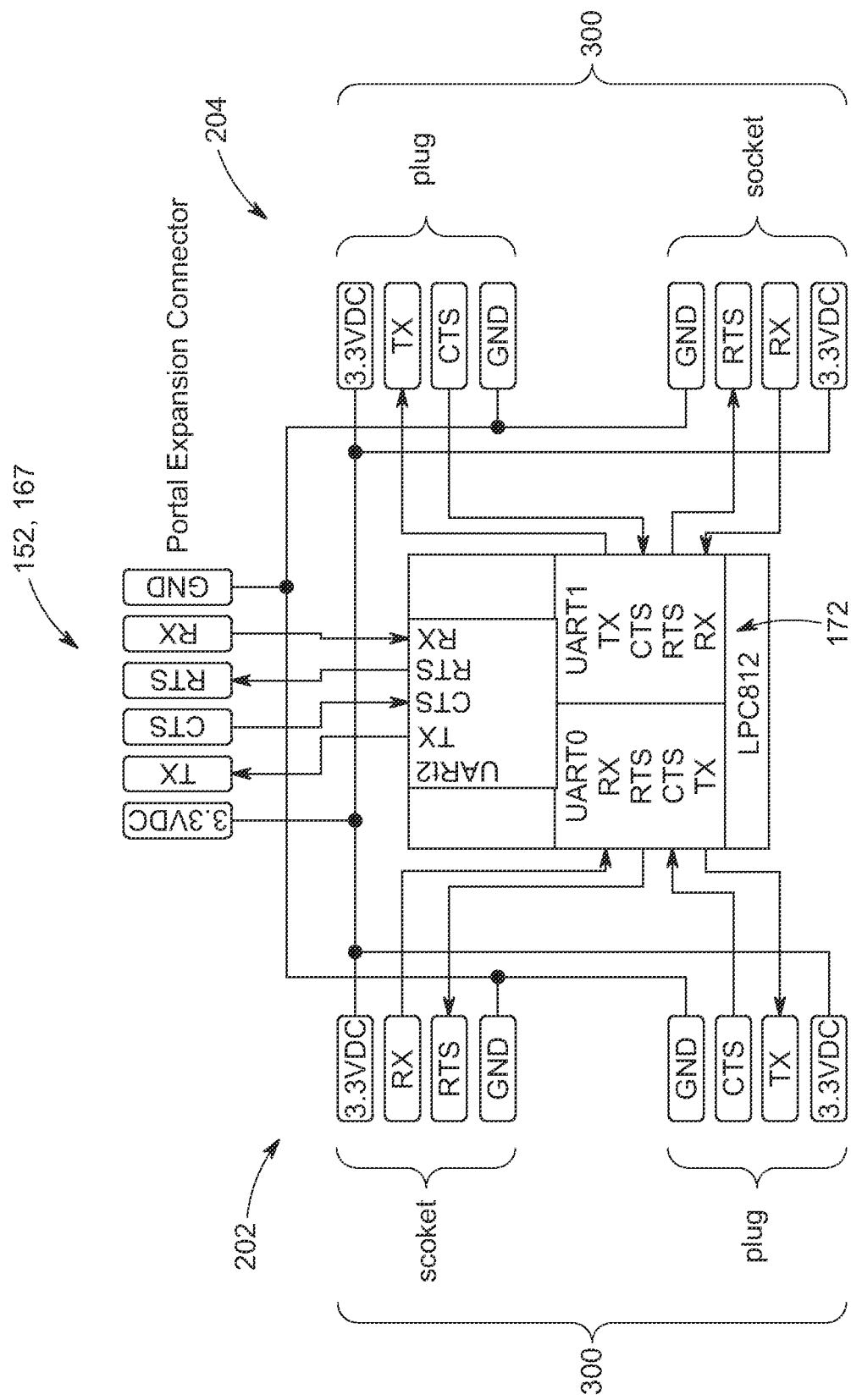
FIG. 13 is an electrical diagram illustrating intra-track electrical connections between the couplers of FIG. 12 and electronics included in the portal piece of FIG. 1 when the portal piece is installed in a base piece that includes the couplers, according to an example embodiment.
Figure 14:
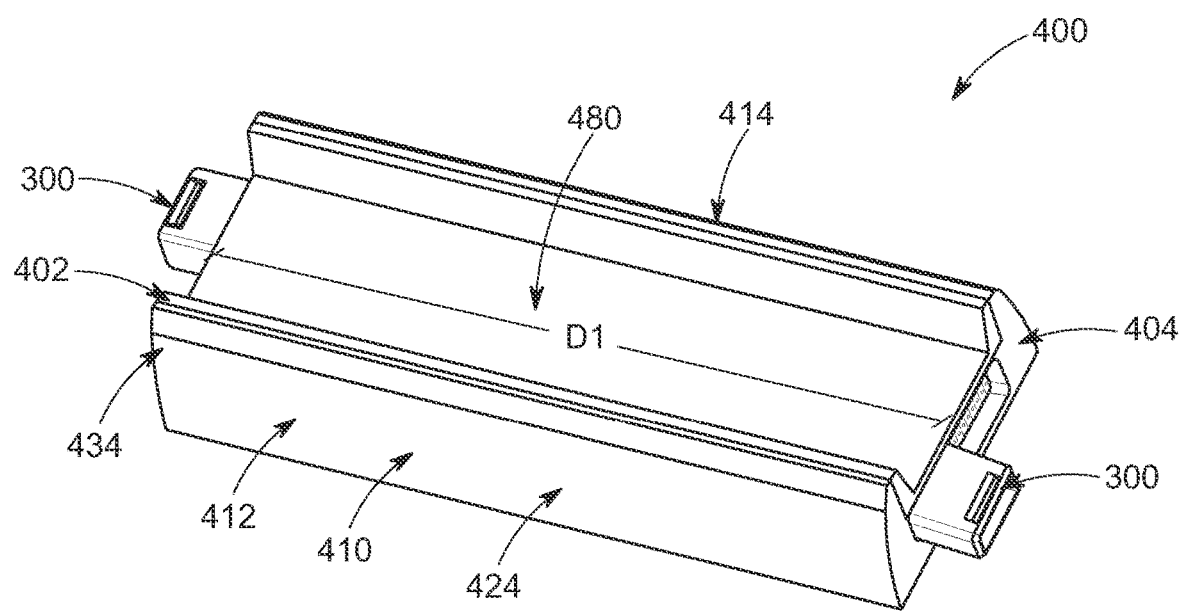
FIG. 14 illustrates a top perspective view of an example embodiment of a straight track piece for a toy vehicle track system of the present application.
Figure 15:
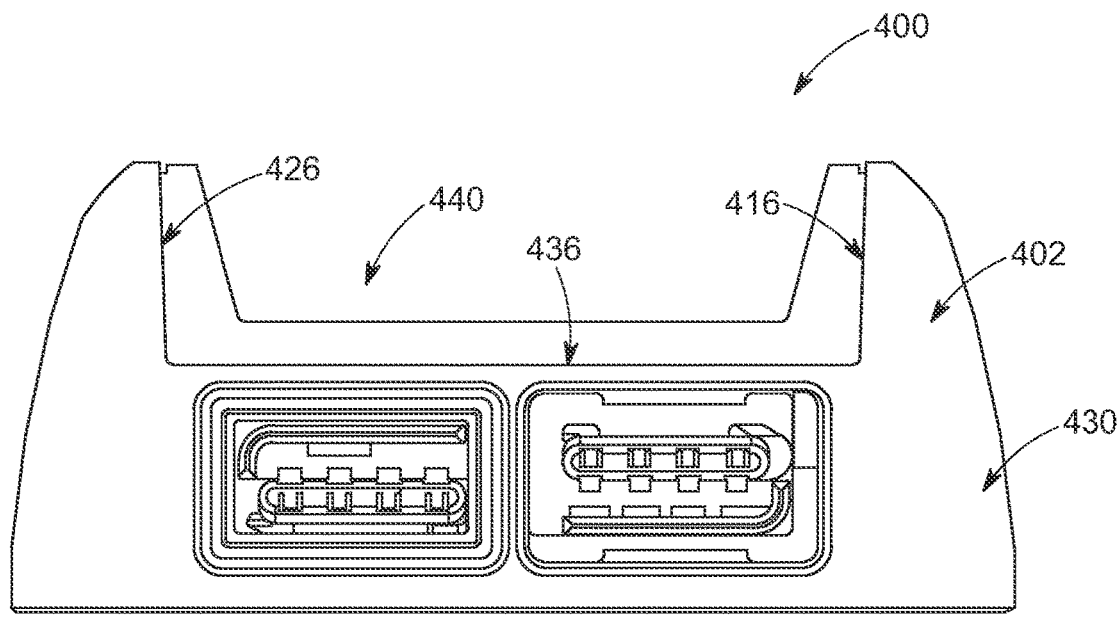
FIG. 15 illustrates a front view of the straight track piece of FIG. 14.
Figure 16:
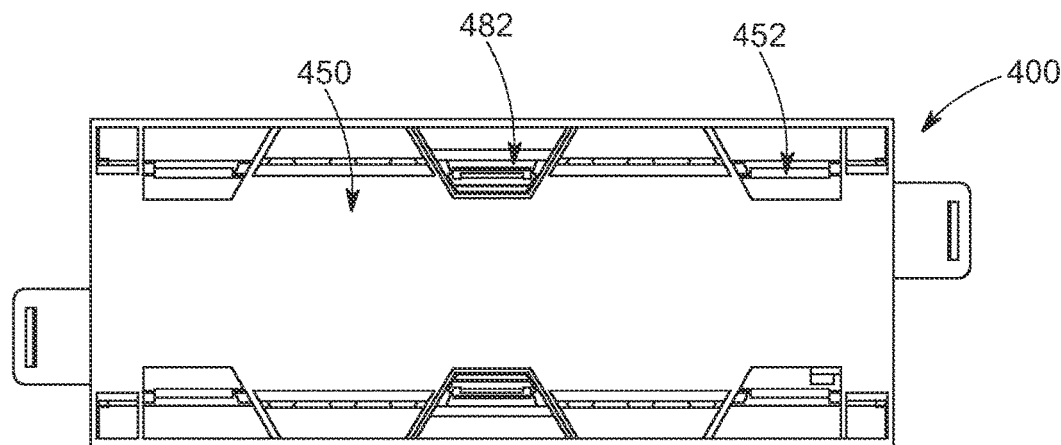
FIG. 16 illustrates a bottom view of the straight track piece of FIG. 14.

FIG. 13 illustrates example electrical connections that can be formed between two couplers 300 included on a base 200 and at least some of the computing components 170 of the portal 100 when the portal piece 100 is installed in base piece 200. As is shown, both couplers 300 are connected to a microprocessor (labeled LPC812, but only as an example of a suitable microprocessor) with multiple Universal Asynchronous Receiver/Transmitters (UARTs) that can transmit or receiver serial data so that the portal piece can communicate with other track pieces through the couplers 300. Although the microprocessor is shown as LPC812 with multiple UARTs, in other embodiments, any processor or controller with logic or circuitry configured to transmit and receive serial data can be included in the portal piece, such as a LPC824 microprocessor.

However, regardless of the specific components or logic included in the base 200 and/or portal 100, it is important that different UARTs (or equivalent structures thereto, e.g., "serial data circuits") be associated with couplers at specific ends of the base piece 200. For example, in the depicted embodiment, the coupler 300 at the upstream end 202 of the base is connected to UART0, the coupler at the downstream end 204 of the base is connected to UART1, and the portal expansion connector is connected to UART2. As is described in further detail below, these associations are known or detected by the processor 172 so that the portal 100 can determine whether pieces are connected upstream or downstream of the portal based on where signals are received.

Still referring to FIG. 13, in order to transmit or receive data from the portal piece's processor to and from other track pieces, the couplers 300 each include various a set of pins. The male connector 324 (labeled plug) of each coupler 300 includes a pin dedicated to transmitting output (labeled TX), a "clear to send input" pin (labeled CTS) dedicated to determining whether the transmitter (TX) is allowed to transmit data, a ground pin (labeled GND), and a power pin (labeled 3.3 VDC). As is shown, the CTS pin relays information to the processor that allows the processor to determine when it can instruct the transmitter to transmit data.

Meanwhile, the female connector 326 (labeled socket) of each coupler 300 includes a pin dedicated to receiving output (labeled RX), a "request to send" pin (labeled RTS) dedicated to asserting when the receiver (RX) is ready to receive data, a ground pin (labeled GND), and a power pin (labeled 3.3 VDC). As is shown, the RTS pin receives information from the processor when the processor determines that the RX pin can receive data to relay to the processor. Finally, a data port of the portal includes all of the aforementioned pins (i.e., TX, CTS, RX, RTS, GND, and 3.3 VDC) to facilitate bi-directional communication with an electronic device that executing the track app and is wired or wirelessly coupled to the portal piece 100.

Now turning to FIGS. 14-18, these Figures illustrate a track piece 400 that is configured to communicate with the portal piece 100 of the track system presented herein. The track piece 400 extends from a first end 402 (an upstream end) to a second end 404 (a downstream end) and includes a base portion 410 and a track portion 480. The base portion 410 includes a housing 412 is substantially similar to the track receptacles 230 included on the base piece 200, except the housing 412 forms a continuous passageway 440 (see FIG. 16) that extends from its first or upstream end 402 to its second or downstream end 404 (as opposed to the receptacles 230 that form discrete and discontinuous in base piece 200). The passageway 440 is sized to receive tack pieces that can align with the track sections of other track pieces, such as the track pieces 280, 282, and 110 of a base piece 200 with a portal piece 100 installed therein.

More specifically, passageway 440 is formed by an inner surface 416 of a first sidewall 414, an opposing inner surface 426 of a second sidewall 424, and a top surface 436 of the base portion 410 that extends between inner surface 416 and inner surface 426. The passageway 440 spans from a first wall 434 that is aligned with the upstream end 402 of track piece 400 to a second wall 430 that is aligned with the downstream end 404 of the track piece 400. Put another way, passageway extends along the length D1 of the track piece 400. Consequently, a track piece 480 can be installed in the base portion 410 and sit flush against the base portion 410.

The track piece 480 may be similar to track sections 110, 280, and/or 282. Thus, any description of track sections 110, 280, and/or 282 included above applies to track section 480 and, for brevity, is not repeated here. One difference between track section 480 and the previously described track sections is that track section 480 may snap or detent into base portion 410. Thus, track section 480 may include protrusions 482 that can snap into openings 452 included in or accessible from a bottom 450 of the base section 410, as can be seen in the bottom view of track piece 400 provided in FIG. 16. However, in other embodiments, track section 480 may connect to the base portion 410 in any manner. Similarly, in various embodiments, track sections 110 of the portal piece 100 or track sections 280 and 282 of the base piece 200 can be coupled to their respective base portions, including via the detent-like snap connections illustrated in FIG. 16.

Figure 17:
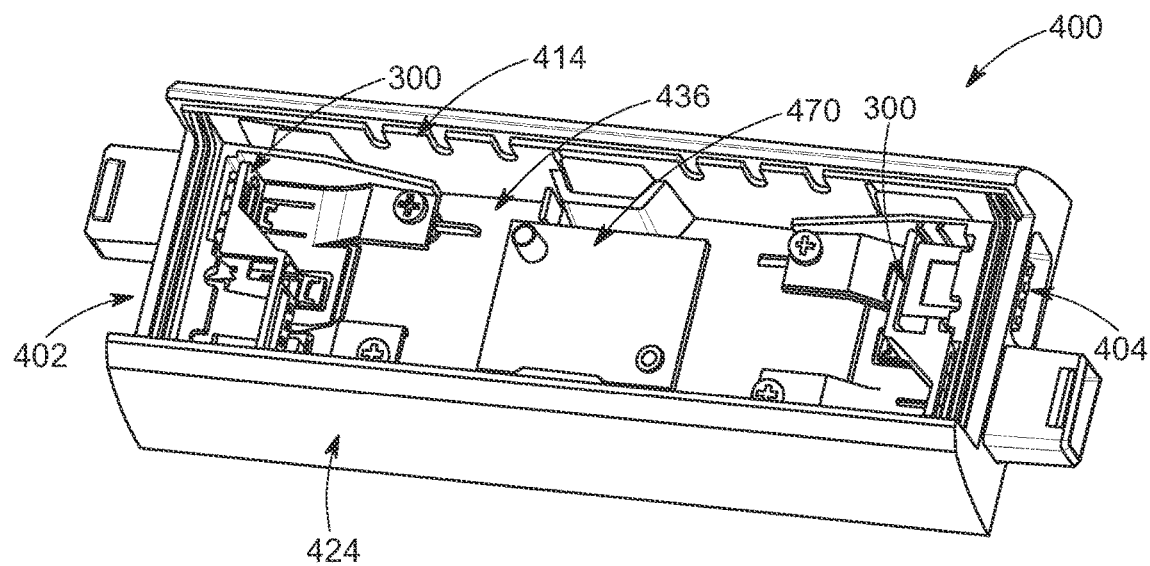
FIG. 17 illustrates a top perspective view of the straight track piece of FIG. 14 with the track portion removed.
Figure 18:
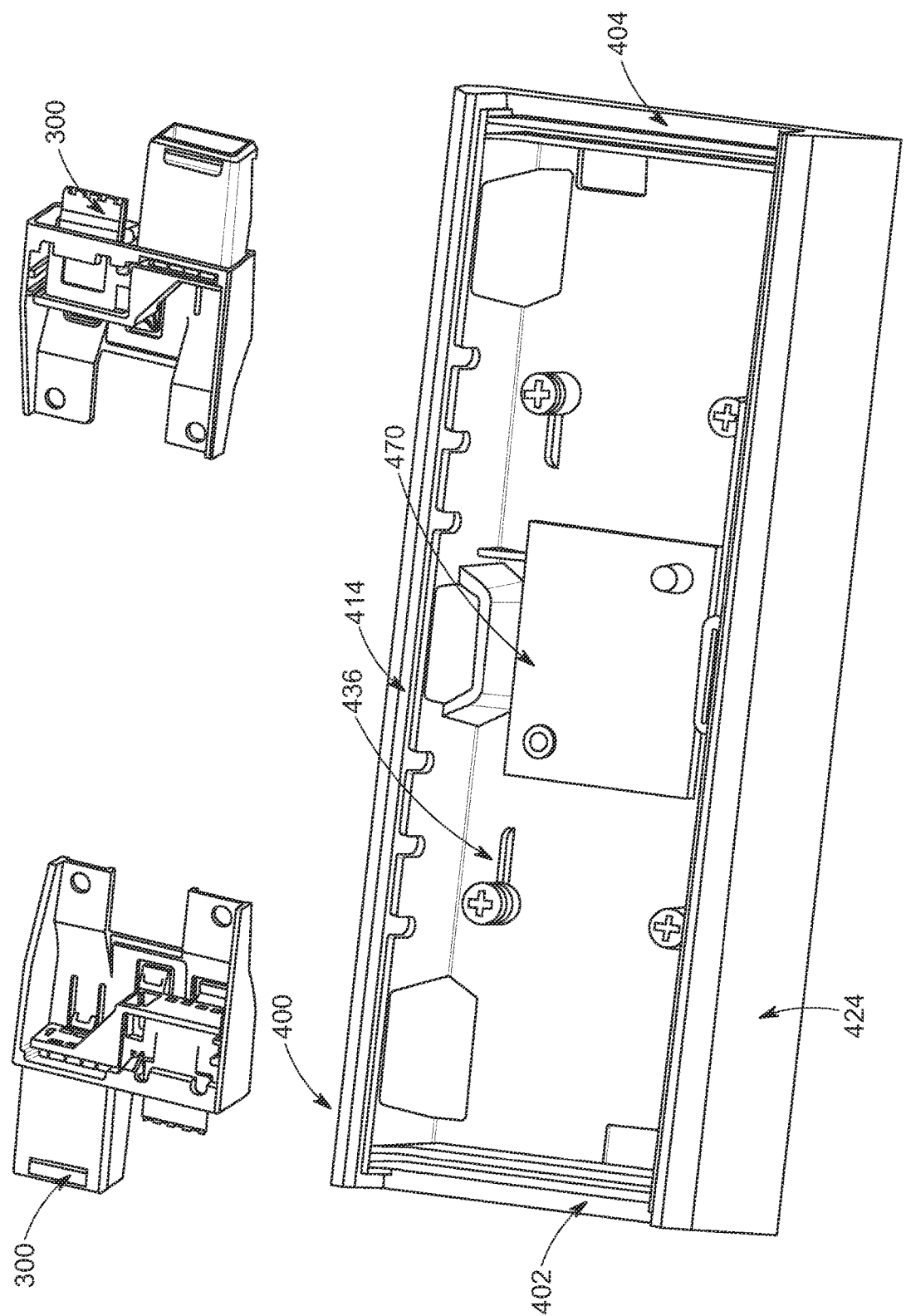
FIG. 18 is a partially exploded view of FIG. 17.
Figure 19A:
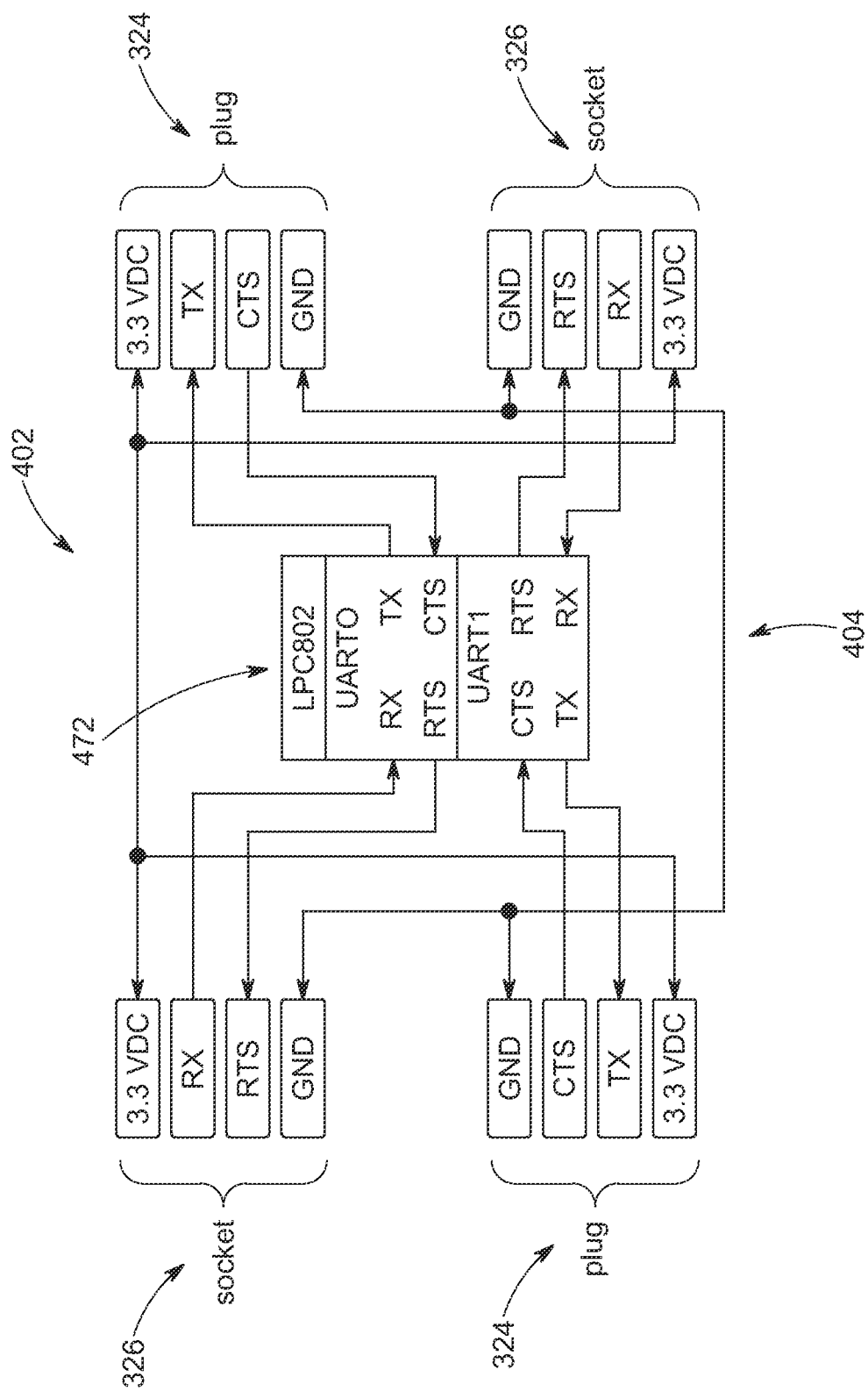
FIG. 19A is an electrical diagram illustrating example intra-track electrical connections between the couplers and electronics included in the track piece of FIGS. 14-18, according to an example embodiment

FIGS. 17 and 18 illustrate the straight track piece 400 with the track section 480 removed from the base portion 410. Consequently, electronics stored beneath the track section 480 can be seen. Notably, each end 402, 404 of track piece 400 includes a track coupler 300 that is coupled to a printed circuit board (PCB) 470. The PCB may include or be configured to receive various computing components, such as a processor, memory, and communications module. FIG. 19A illustrates the electrical connections between the PCB 470 and the couplers 300 and FIG. 19B illustrates, at a high-level, the computing components included on or connected to PCB 470 of track piece 400.

Notably, the connections between the couplers 300 and the PCB 470 are substantially similar to the connections between the couplers 300. For example, each coupler 300 includes the same pins as those shown and described in connection with FIG. 13. Additionally, each coupler connected to a specific UART circuit (e.g., a "serial data circuit") as was described in connection with FIG. 13. Specifically, the coupler 300 disposed at upstream end 402 (which includes the upper plug and upper socket shown in FIG. 19A, instead of the pairings at the left or right) is connected to UART0 and the downstream coupler 300 (which includes the lower plug and lower socket shown in FIG. 19A) is connected to UART1.

Notably, when track piece 400 is connected to the portal 100 (e.g., by way of base 200), the UART numbers of the track piece 400 may provide an indication of orientation of track piece 400 to the portal piece 100. However, by comparison, the UART numbers associated with couplers 300 included on the base 200 may provide an indication of whether a piece is installed upstream or downstream of the portal piece 100. These UART-based determinations are each described in further detail below. Nevertheless, due to the similarities between the connections shown in FIG. 13 and the connections shown in FIG. 19A, any description of FIG. 13 included herein also applies to like components shown in FIG. 19A.

Figure 19B:
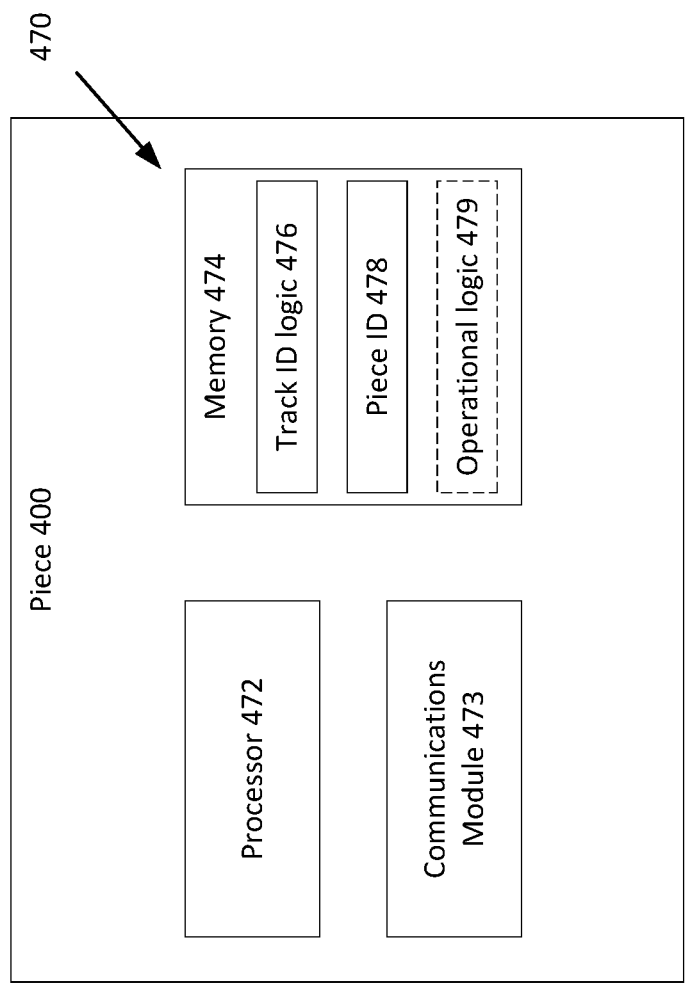
FIG. 19B is a block diagram illustrating example computing components of the track piece of FIGS. 14-18.

Likewise, the computing components of piece 400 shown in FIG. 19B (generally represented as PCB 470, which may hold any computing components for piece 400) are substantially similar to the computing components 170 of portal piece 100 shown in FIG. 4. Thus, any description of FIG. 4 included herein also applies to like components shown in FIG. 19B. That is, at least some of the description of processor 172 included above applies to processor 472, at least some of the description of communications module 173 included above applies to communications module 473, and at least some of the description of memory 174 included above applies to memory 474.

One notable difference between the components shown in FIG. 19B and the components shown in FIG. 4 is that the memory 474 of track piece 400 need not store all of the same logic as portal piece 100. In fact, advantageously, the communications protocol utilized by the toy vehicle track system presented herein allows a non-portal track piece to store a minimal amount of data in memory 474. For example, in the embodiment depicted in FIG. 4, the portal piece 100 may store logic suitable for identifying a vehicle (e.g., vehicle ID logic 178) and various tables associated with track ID logic 176, but the track piece 400 need not store tables or vehicle ID logic. Instead, the memory 474 may include track ID logic 476 that allows it to communicate with the portal piece (e.g., to request enumeration, as is described below), but the piece 400 itself need not know the position, orientation, etc. of any other pieces. Thus, track ID logic 476 may include only a small portion of track ID logic 176.

Otherwise, memory 474 may store a piece identification (ID) 478, which is also referred to herein as a birth certificate, and may optionally store operational logic 479. The piece ID 478 may be or include data relating to the type and/or orientation of the track piece 400. For example, the piece ID 478 may specify that track piece 400 is a straight track piece with a length D1. Additionally, the birth certificate may specify the make, model number, part number, place of manufacture, or other such information that allows verification/authentication of the track piece 400. Still further, in at least some embodiments, the birth certificate may provide associations between the UARTs of the track piece (or equivalent circuitry/logic) and the ports of a piece (insofar as port means entrance or exit). For example, in piece 400, the birth certificate may specify that UART0 is associated with the upstream end of the track and UART1 is associated with the downstream end of the track. The operational logic 479 may be stored on a track piece if the track piece has operational features, such as an IR gate. In at least some embodiments, such as those without any operational features, like track piece 400, the track piece 400 need not include operational logic 479 (thus, it is shown in dashed lines). However, in other embodiments, any pieces included in the toy vehicle track system presented herein may store any combination of information or logic shown in FIG. 4 or 19B in memory.

FIGS. 20-29 illustrate additional track pieces that are suitable for use with the toy vehicle track system presented herein. That is, FIGS. 20-27 illustrate additional track pieces that include similar electrical/computing components to track piece 400 so that these pieces can communicate with each other, track piece 400, base 200, and/or portal piece 100. Since these pieces are largely similar to track 400, these pieces are only briefly described below to discuss example features that can be included in the toy vehicle track system presented herein.

Figure 20:
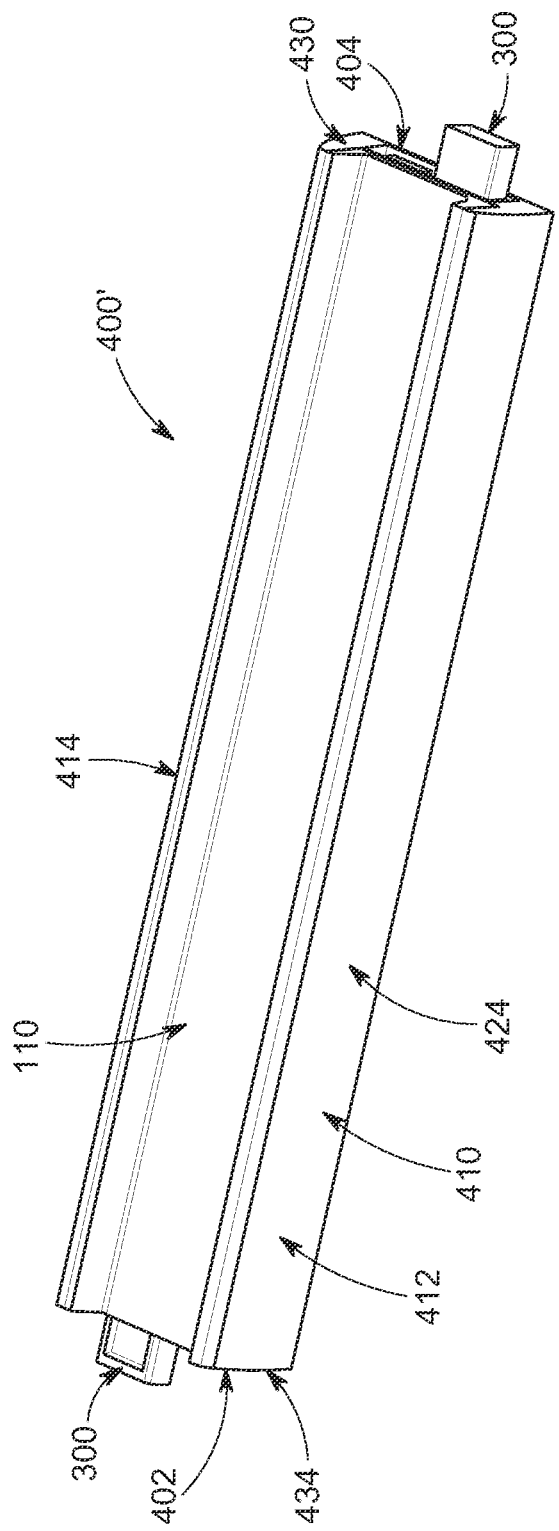
FIG. 20 illustrates a top perspective view of another example embodiment of a straight track piece for a toy vehicle track system of the present application.
Figure 21:
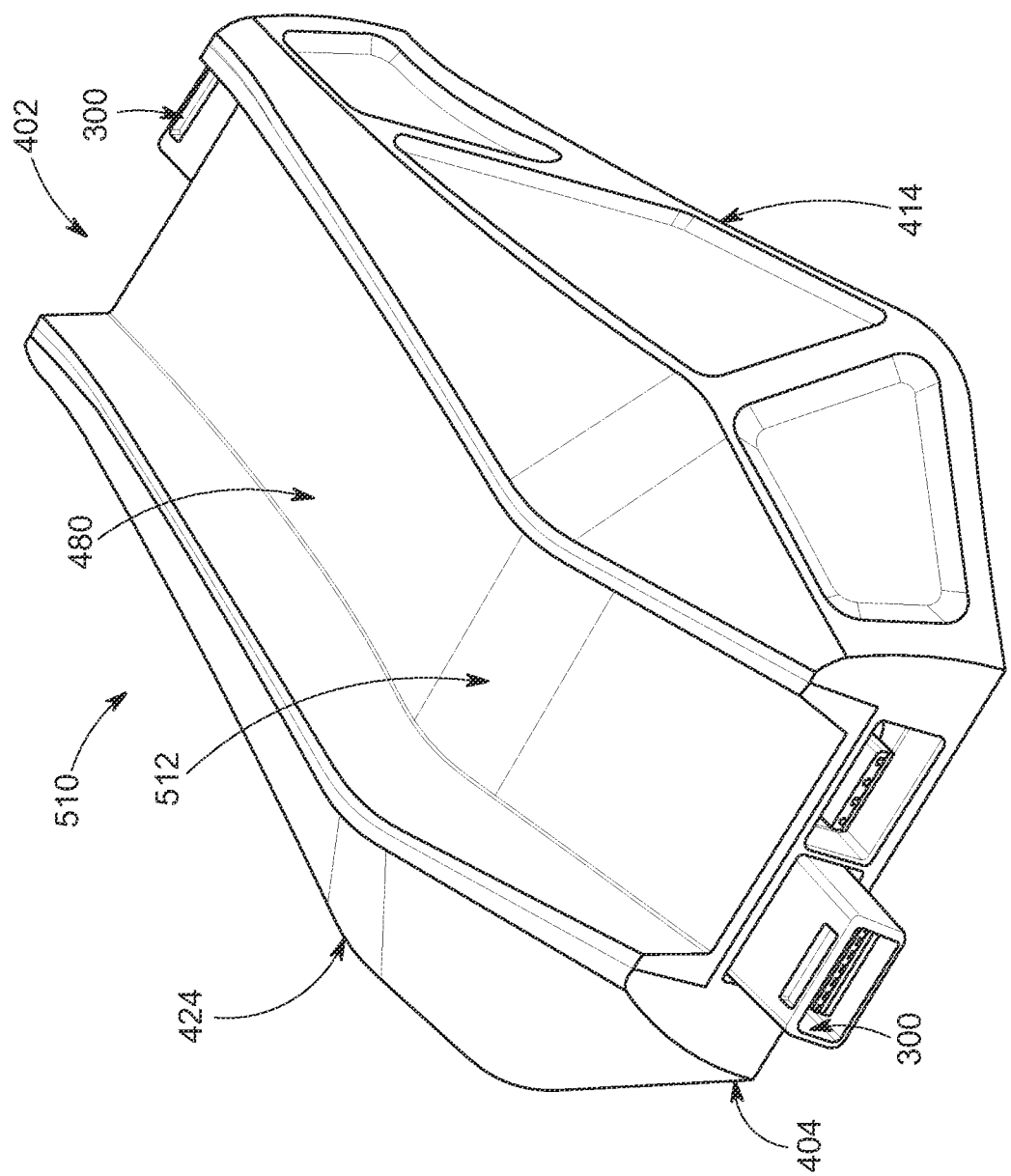
FIG. 21 illustrates a top perspective view of an example embodiment of a jump track piece for a toy vehicle track system of the present application.
Figure 22:
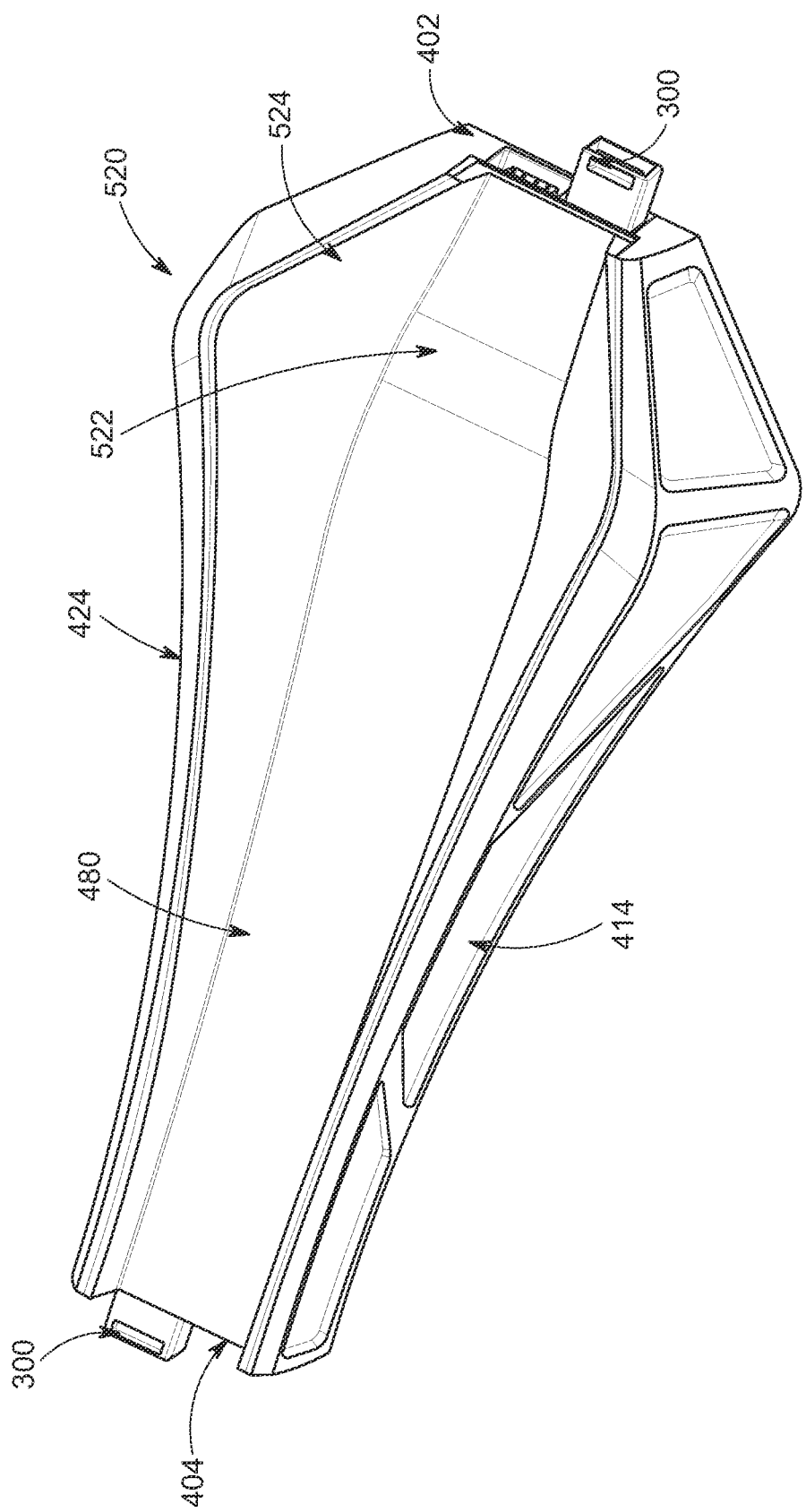
FIG. 22 illustrates a top perspective view of an example embodiment of a landing track piece for a toy vehicle track system of the present application.

First, FIG. 20 illustrates a straight track piece 400' that is nearly identical to track piece 400, except that track piece 400' has a length D2 that is substantially larger than the length D1 of track piece 400. For example, D2 may be double the length of D1. Second, FIG. 21 illustrates a jump track piece 510 that includes a sloped track section 480. The sloped track section 480 is angled upwards until an apex 512, at which point, it angles downwards. Third, FIG. 22 illustrates a landing track piece 520 that also includes a sloped track section 480. The sloped track section 480 is angled downwards from an apex 522. Additionally, upstream of the apex 522, the landing track piece 520 includes a widened landing area 524. Notably, in FIGS. 21 and 22, track pieces 510 and 520 are shown from a downstream perspective (so that the upstream end of each piece is shown on a right side of the drawing when viewed in landscape), while many of the other track pieces shown from an upstream perspective (so that the upstream end of each piece is shown on a left side of the drawing when viewed in landscape).

In some configurations, the upstream end 402 of landing track piece 520 may be coupled directly to the downstream end 404 of the jump track piece 510. Alternatively, a straight track piece 400 may connect the downstream end 404 of the jump track piece 510 to the upstream end 402 of landing track piece 520. Either way, the jump and landing pieces 510, 520 encourage a user to propel a toy vehicle along the jump track piece 510 with enough speed so that it can jump (i.e., leave the track) from apex 512 to apex 522.

Figure 23:
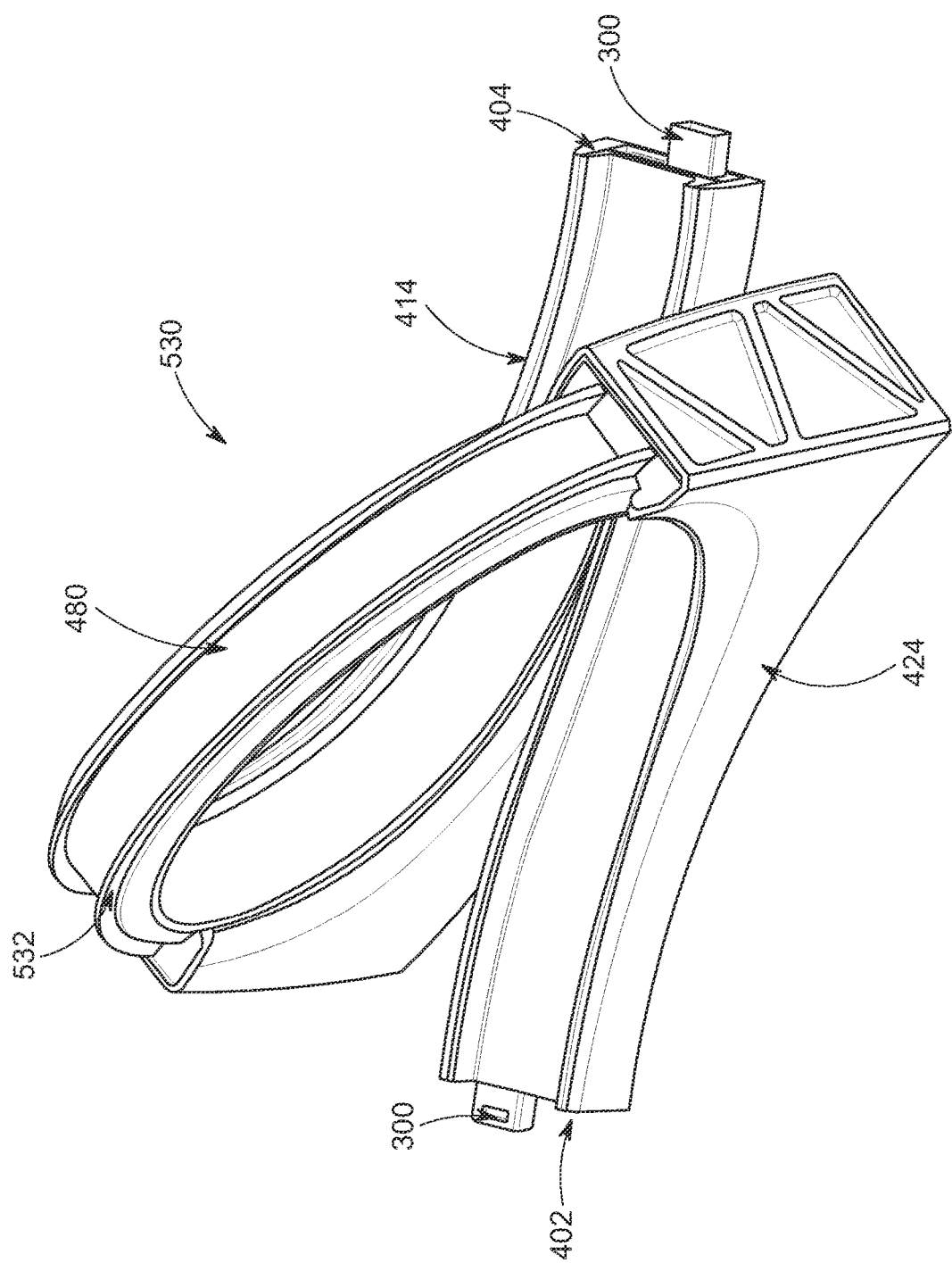
FIG. 23 illustrates a top perspective view of an example embodiment of a loop track piece for a toy vehicle track system of the present application.
Figure 24:
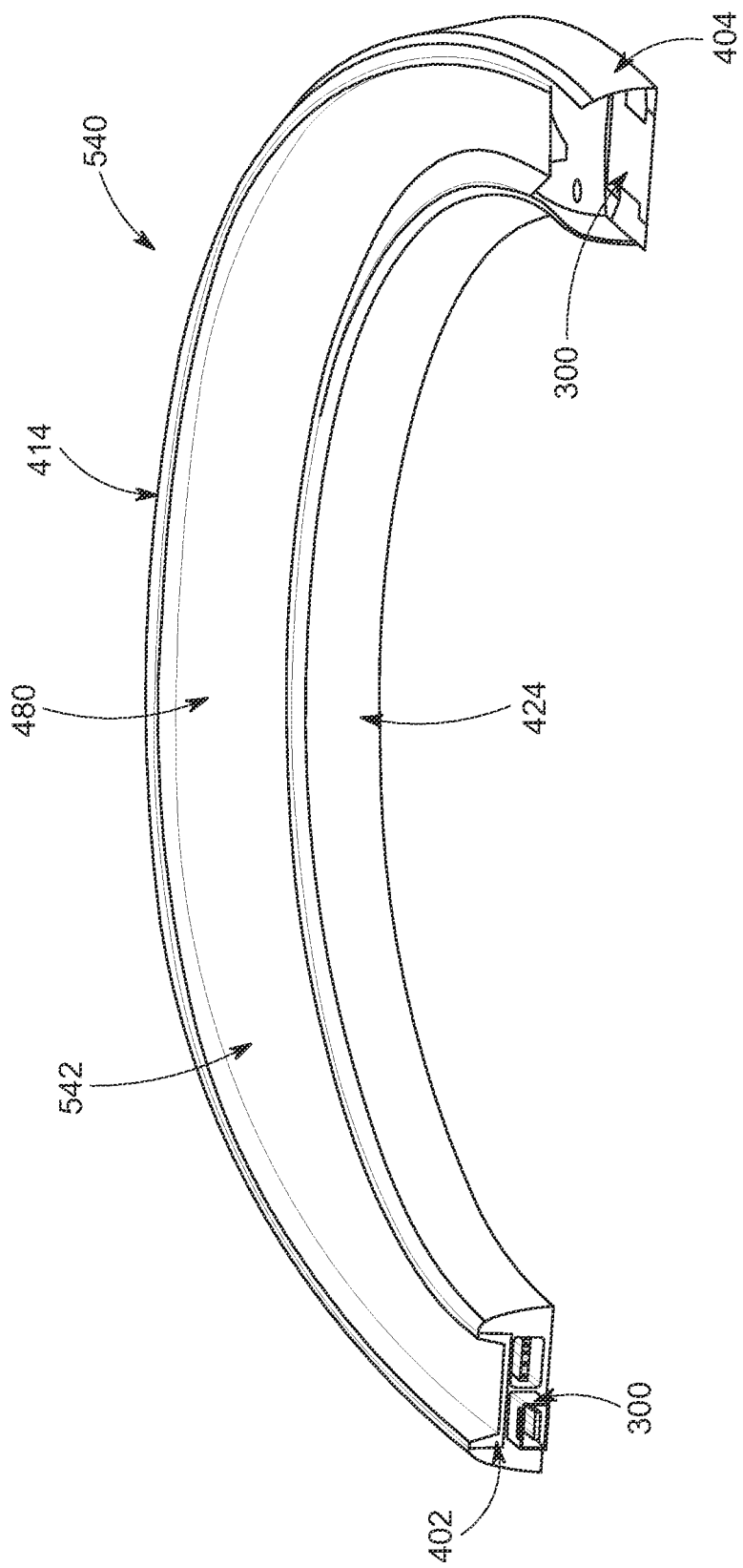
FIG. 24 illustrates a top perspective view of an example embodiment of a 180-degree curve track piece for a toy vehicle track system of the present application.
Figure 26:
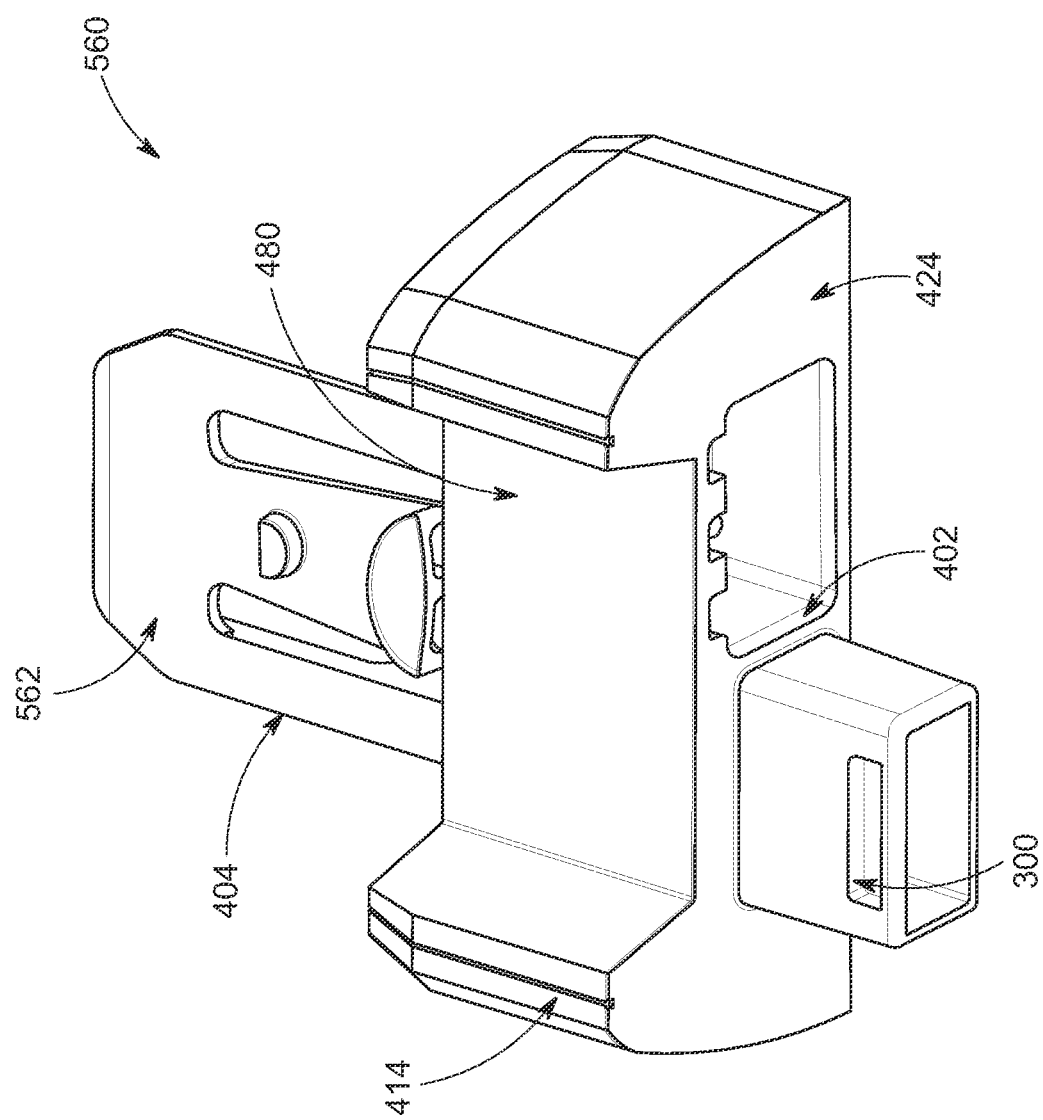
FIG. 26 illustrates a top perspective view of an example embodiment of an adaptor track piece for a toy vehicle track system of the present application.
Figure 27:
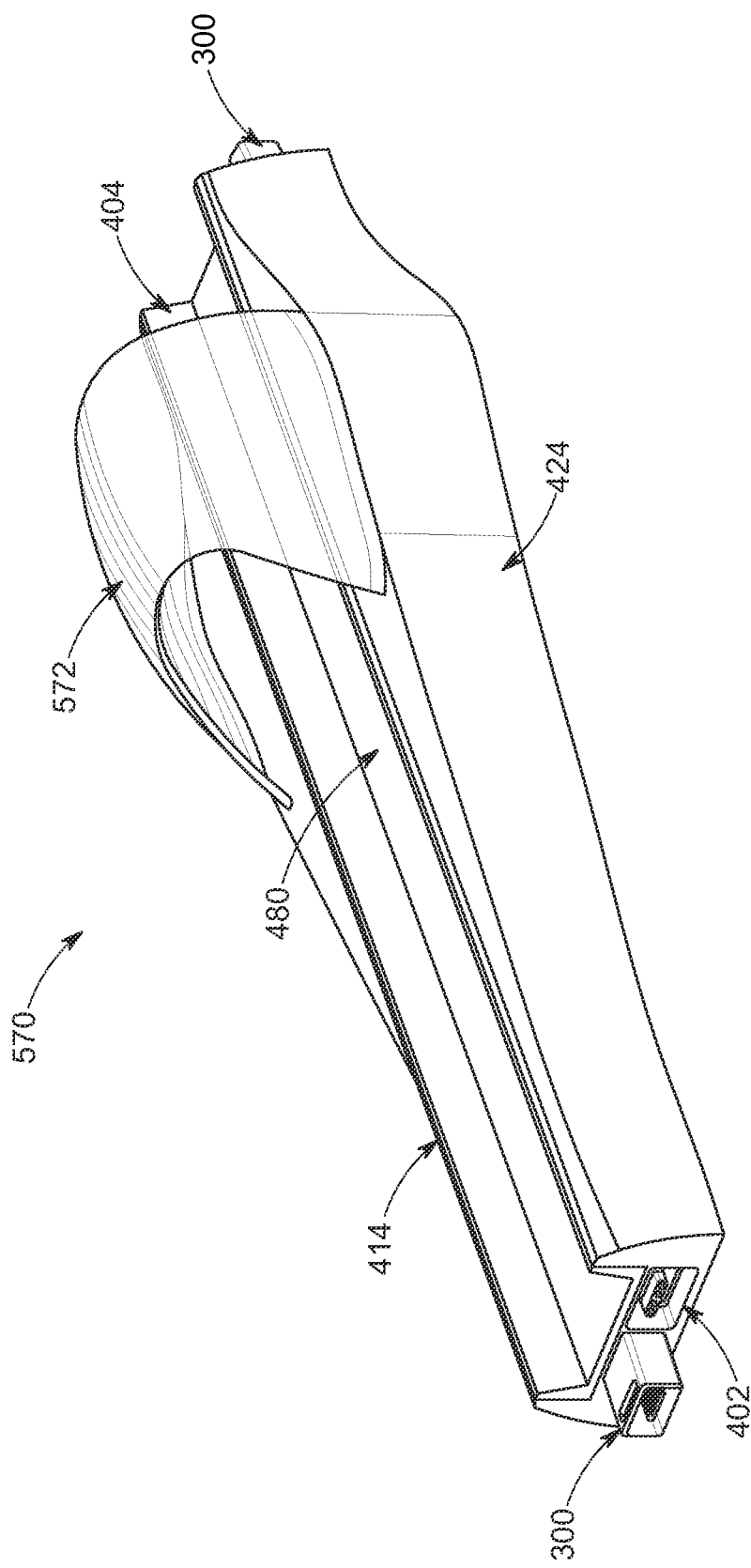
FIG. 27 illustrates a top perspective view of an example embodiment of a gate track piece for a toy vehicle track system of the present application.

Fourth, FIG. 23 illustrates a loop track piece 530 that includes an offset loop 532. The offset in the loop allows the upstream end 402 and the downstream end 404 to be substantially aligned along a single horizontal axis. Fifth, FIG. 24 illustrates a curved track piece 540 that includes a banked, 180-degree curve 542. However, in other embodiments, pieces incorporating any type of loop, curve, turn, or combination thereof could be included in the toy vehicle track system presented herein. That is, as mentioned above, the track pieces illustrated in FIGS. 20-24, as well as those illustrated in FIGS. 25-27 are merely examples.

Notably, each of the pieces shown in FIGS. 20-24 includes a coupler 300 at its upstream end 402 and its downstream 404. That is, each of these track pieces includes two ports (one entry and one exit that each have a coupler 300). This allows these track pieces to be reversible and also allows additional track pieces to be attached at either end of these track pieces. By comparison, FIGS. 25 and 26 illustrate two pieces with one coupler 300.

Figure 25:
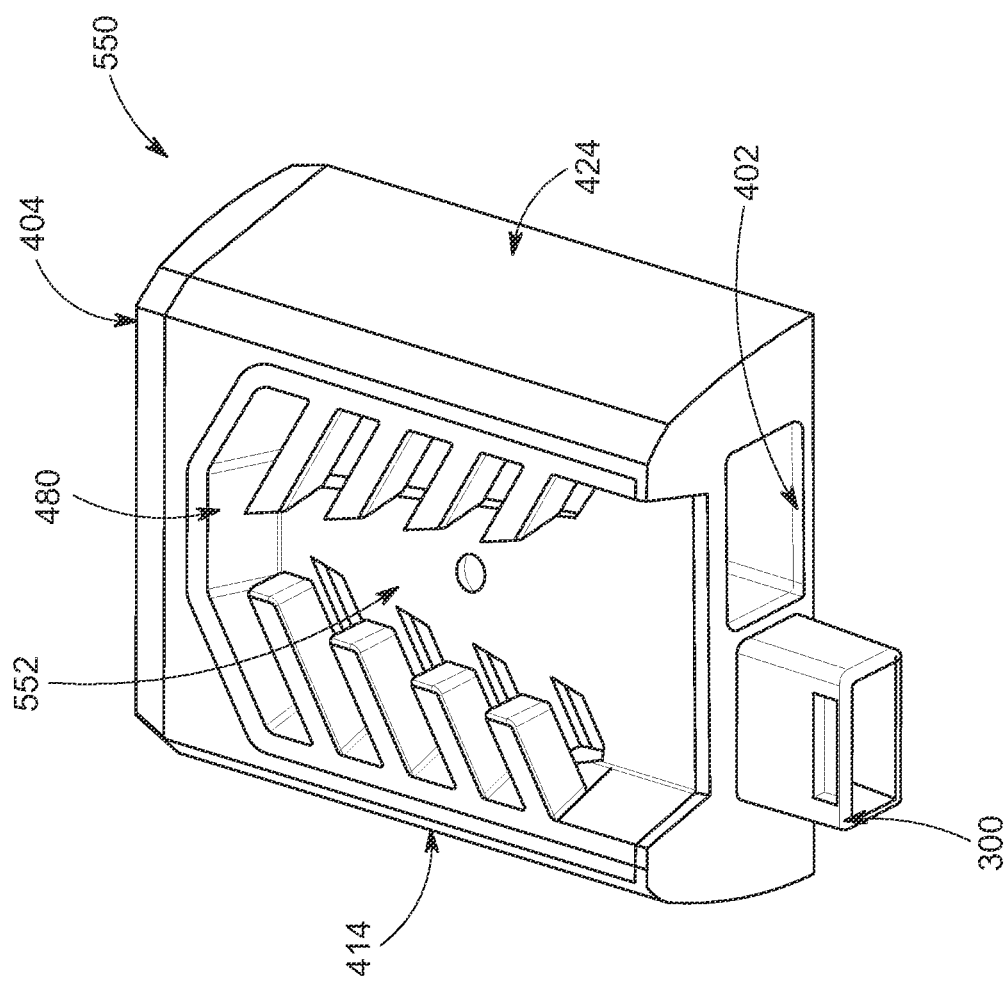
FIG. 25 illustrates a top perspective view of an example embodiment of a stop track piece for a toy vehicle track system of the present application.

FIG. 25 illustrates a stop piece 550 with resilient fingers 552 configured to slow and eventually stop a toy vehicle that enters the stop piece 550. By comparison, FIG. 26 illustrates an adaptor piece 560 with a traditional connector 562 that allows the track pieces presented herein to be used with traditional components that do not include any electronic or computing components. The coupler 300 included in adaptor piece 560 allows the adaptor piece 560 to communicate with other pieces of the toy vehicle track system presented herein, such as a portal piece 100 (e.g., so that the portal piece 100 can recognize the adaptor piece 560). However, any traditional pieces attached to the traditional connector 562 will be unable to communicate with the portal piece 100 (or other track pieces of the toy vehicle track system presented herein).

Figure 28:
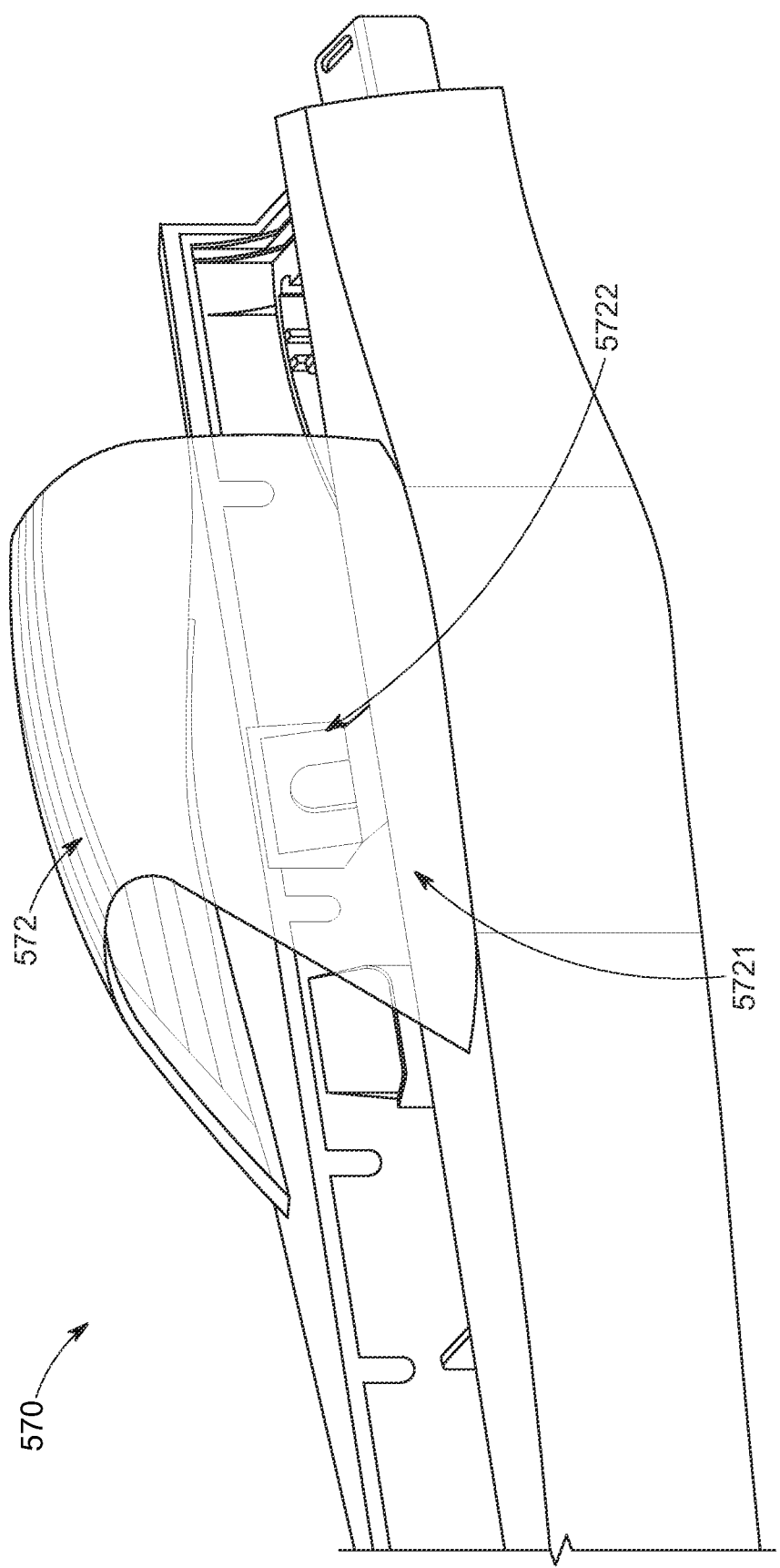
FIG. 28 illustrates a close-up view of a wireless gate included in the gate track piece of FIG. 27 with a track portion of the gate track piece removed.
Figure 29:
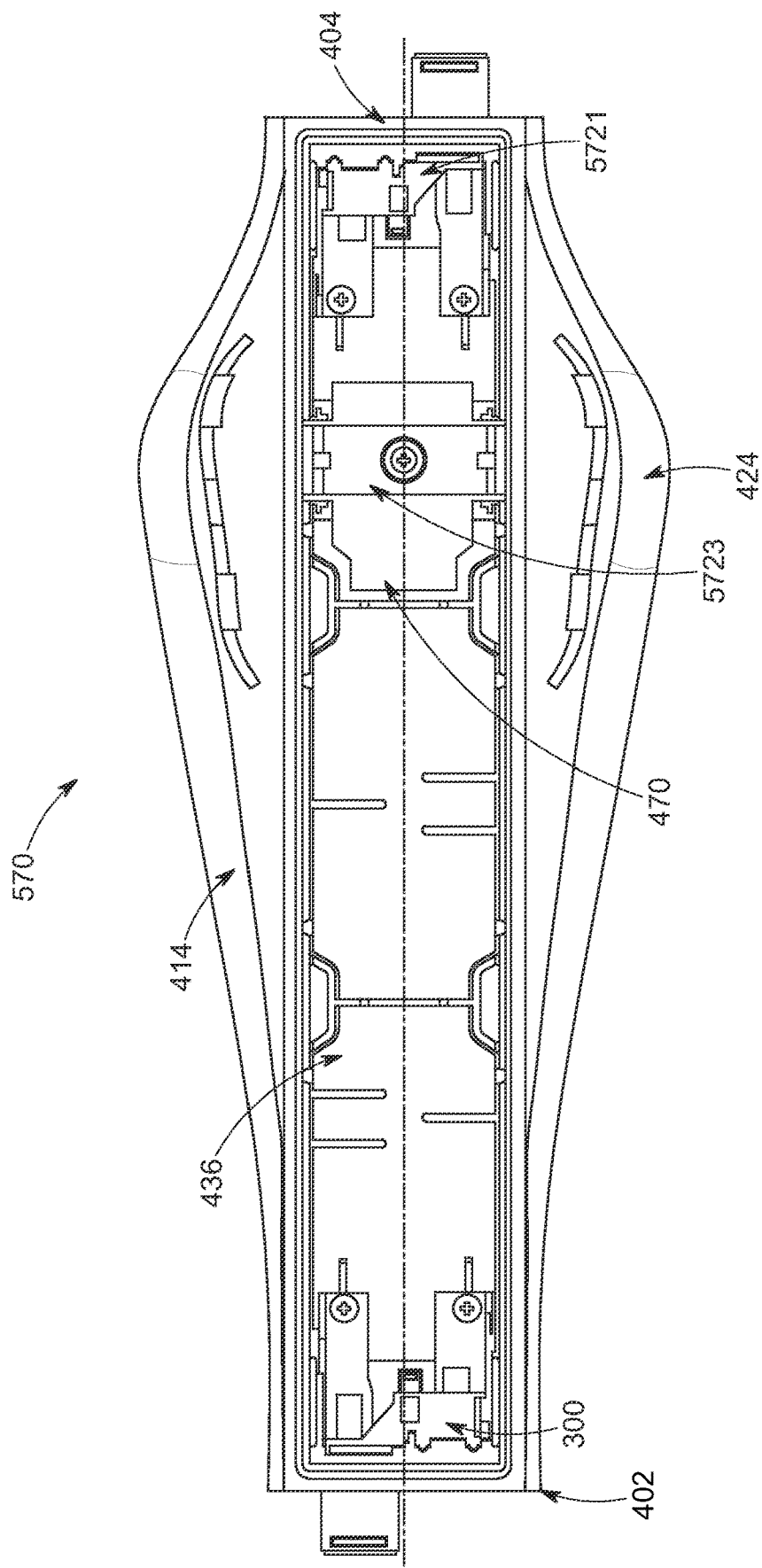
FIG. 29 illustrates a top view of the gate track piece of FIG. 27 with its canopy and track portion removed.

Put another way, the adaptor 560, as well as all of the other pieces presented herein, are considered "smart pieces," but conventional pieces attached to the adaptor 560 would be considered "dumb pieces." Moreover, each of the pieces shown in FIGS. 14-26 may be considered passive track pieces since these pieces do not include sensors, actuators, or indicators. However, the track system can also include active track pieces that include any combination of sensors (e.g., IR gates), actuators (e.g., pressure actuated launchers), and indicators (e.g., tracks with lights or sounds). FIGS. 27-29 illustrate an example embodiment of an active track piece 570 for the toy vehicle track system presented herein.

In FIGS. 27-29, track piece 570 includes an operational feature in the form of an IR gate 572 that can sense a toy vehicle moving through the track piece 570. The IR gate 572 may be demarcated and protected by a canopy 5721 that extends above IR components 5722 (e.g., a transmitter and receiver), as show in FIG. 28. The IR components 5722 may be mounted on a bracket 5723 (see FIG. 29) that electrically connects the IR components 5722 to the PCB 470 of the gate track piece 570. However, the IR gate is merely one example of an operational feature that may be included in track pieces of the toy vehicle track system presented herein and in other embodiments, any track piece may include any operational features. Moreover, track pieces with tracking features need not utilize IR technology to determine whether a toy vehicle is traversing a particular track piece and may use any other tracking technology now known or developed hereafter.

To emphasize, the track pieces (or components thereof) shown in FIGS. 14-29 are merely example track pieces/components and the toy vehicle track system presented herein can include a wide variety of track pieces to allow for a variety of configurations, stunts, accessories, etc. For example, although not shown in FIGS. 14-29, some track pieces may have split configurations so that pieces have two or more entrances and/or two or more exits. As a specific example, a track piece may have a Y-shape. In these instances, the track pieces may still have similar components to the track piece 400 shown in FIGS. 14-19B (the split pieces could also be active pieces if desired); however, now, these pieces may now have one or more extra couplers 300 and, thus, may have a slightly different electrical arrangement.

Figure 30:
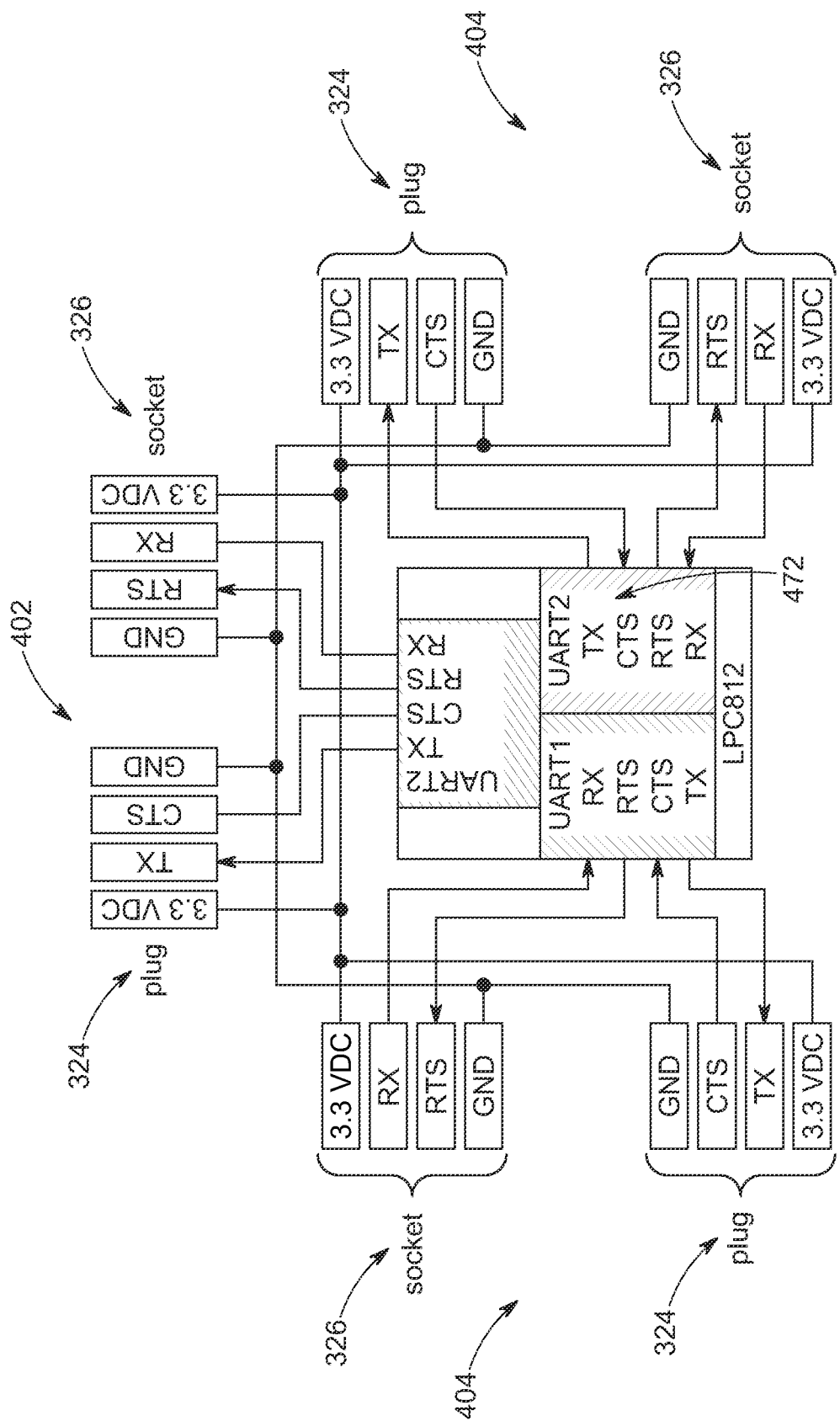
FIG. 30 is an electrical diagram illustrating example intra-track electrical connections between the couplers and electronics included in another track piece for a toy vehicle track system of the present application.

FIG. 30 shows one example electrical arrangement for a piece with three couplers 300. In this example, there are more connections between couplers 300 and the PCB 470 than shown in FIG. 19A, but each connection is substantially similar to the connections that are shown and described in connection with FIG. 19A (as well as the connections between couplers 300 and the computing components of portal piece 100 shown and described in connection with FIG. 13). The arrangement of parts in FIG. 30 is simply a bit different than the arrangement of parts in FIG. 19A. Specifically, in FIG. 30, couplers 300 are shown on either side and above processor 472, with the two couplers at the downstream end 404 shown connected to UART1 and UART2 from the right and left sides of processor 472 and the sole coupler at the upstream end 402 shown connected to UART0 from above the processor 472. Thus, any description of FIGS. 13 and 19A included herein also applies to like components shown in FIG. 30.

Figure 31:
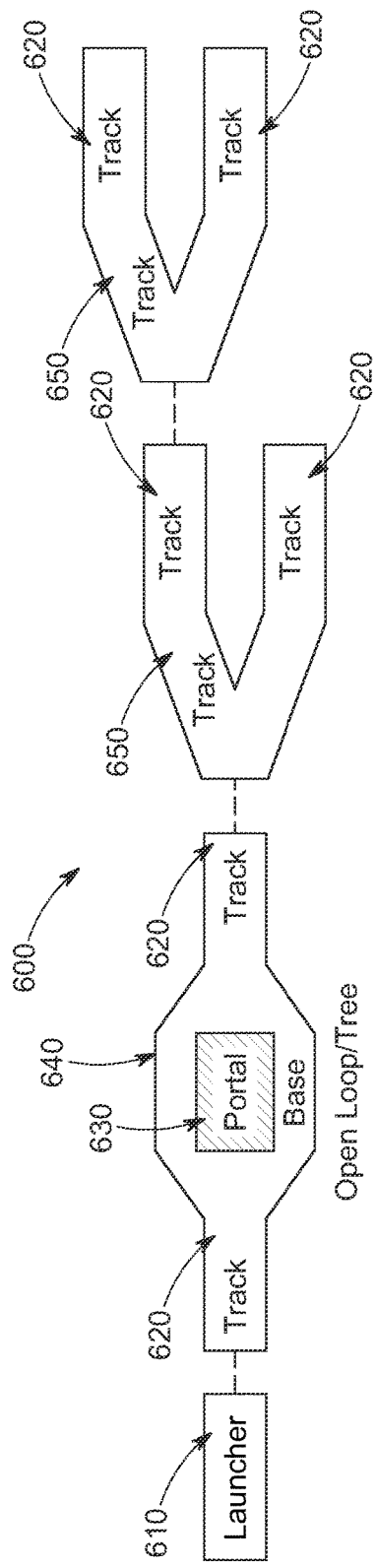
FIGS. 31-33 illustrate three examples of track configurations that can be created with toy vehicle track pieces of the present application.
Figure 32:
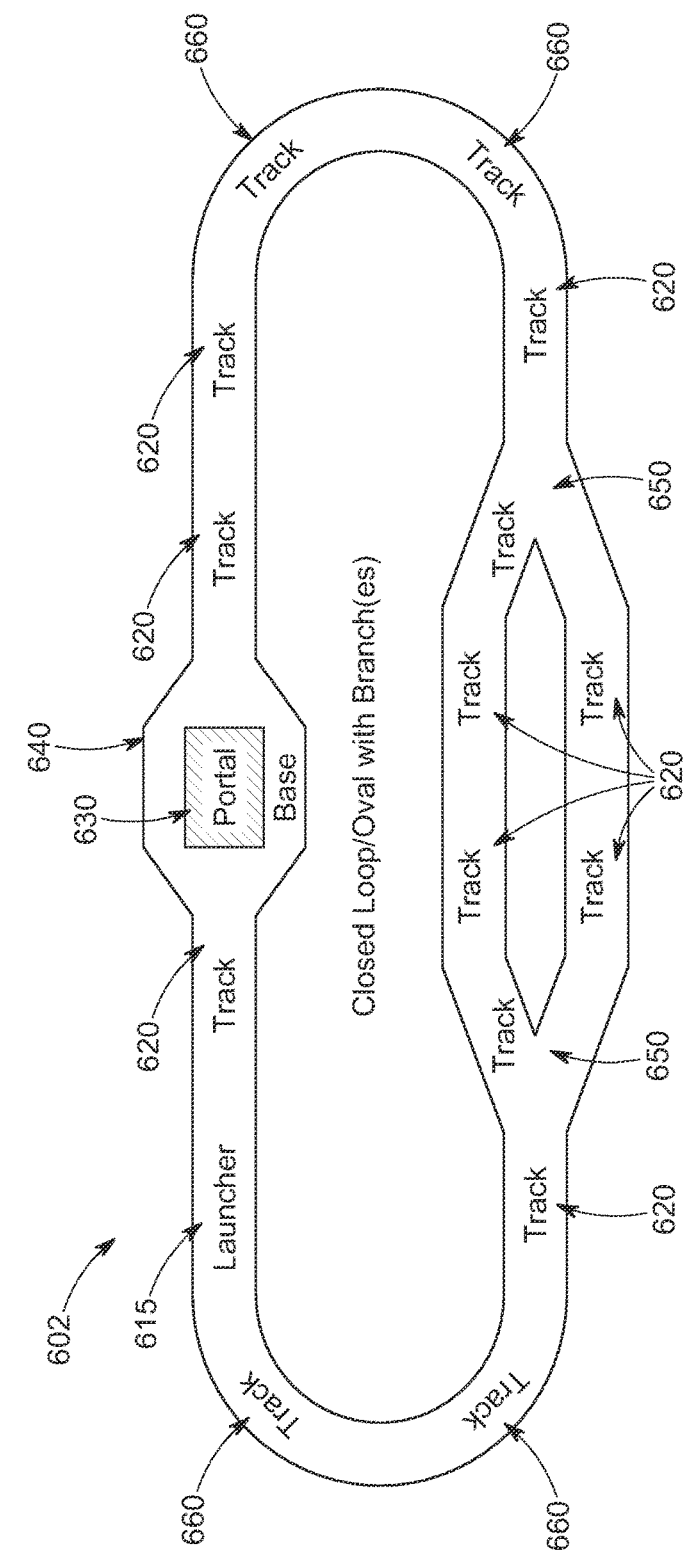
Figure 33:
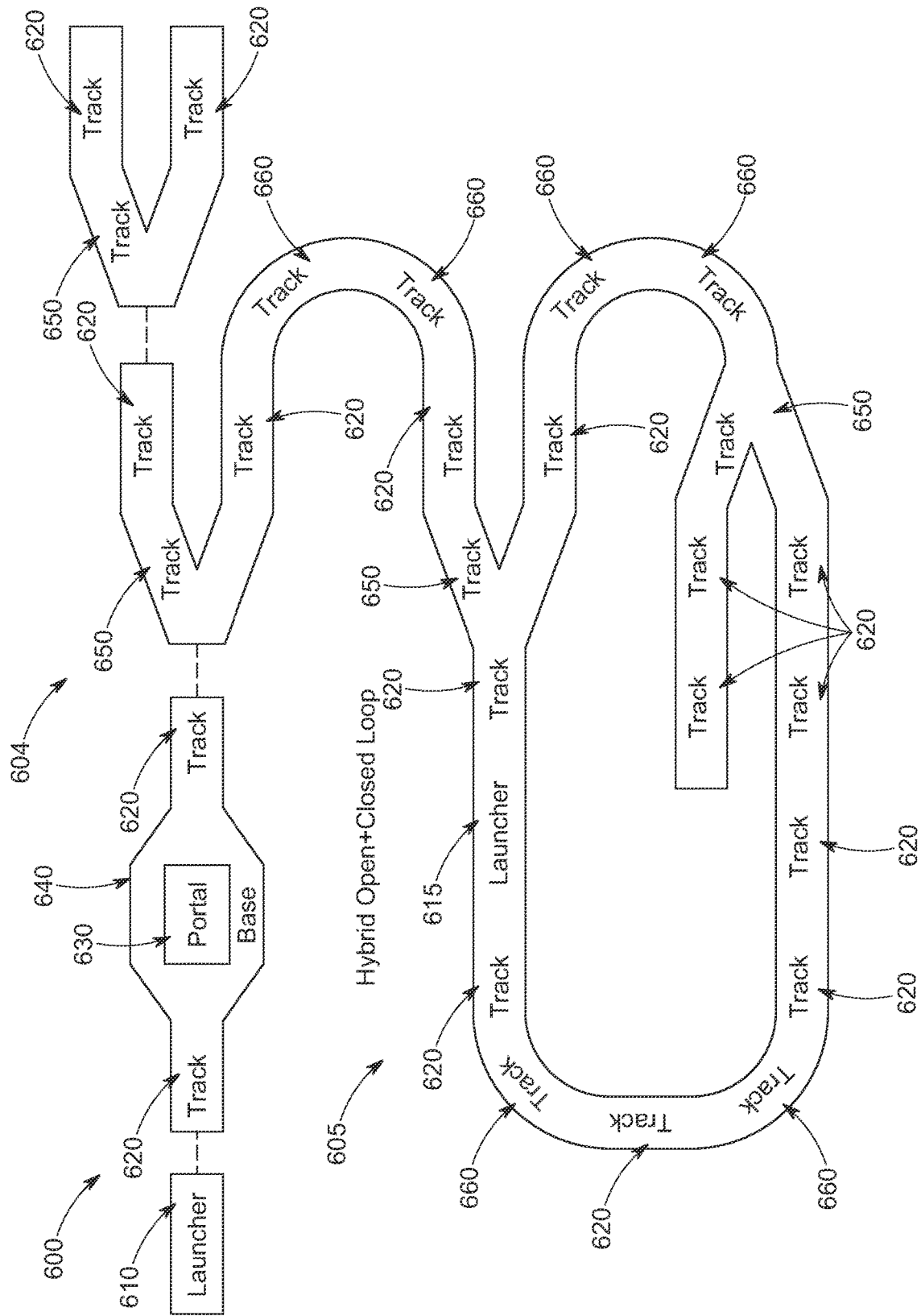

FIGS. 31-33 illustrate example track configurations that can be formed with track pieces of the toy vehicle track system presented herein. Configuration 600 (FIG. 31) is an open or tree configuration that begins at a launcher 610, but does not return to the launcher 610. Thus, the launcher 610 may be a closed launcher with only one port (and one coupler 300). The launcher is connected to a straight track 620 (e.g., track piece 400 or 400') that is connected to a base piece 640 (e.g., base piece 200, base piece 200', or base piece 200") in which a portal 630 (e.g., portal piece 100) is installed. A downstream end of the base piece 640 is attached to another straight track piece 620 (e.g., track piece 400 or 400') and a downstream end of this straight track piece 620 is attached to an upstream end of a Y-assembly formed from a splitter 650 and two straight track pieces 620. One downstream branch of this Y-assembly is then attached to the upstream end of another Y-assembly formed in the same manner. Notably, if the base piece 640 is or is similar to base piece 200", the bi-directional communication between the portal 620 and operational features of track pieces might communicate with and/or control the launcher 610 and/or the booster 290 of base piece 200".

By comparison, configuration 602 (FIG. 32) is a closed configuration that includes a launcher 615 that allows a toy vehicle to travel therethrough. That is, launcher 615 includes two ports (and two couplers 300) so that track pieces can be connected to an upstream and downstream end of the launcher 615 and vehicles can enter and exit the launcher via track pieces coupled to the launcher 615 by couplers 300. In configuration 602, a loop is formed from the downstream end of launcher 615 back to the upstream end of launcher 615 by: (1) straight track pieces 620 (e.g., track piece 400 or 400'); (2) a base piece 640 (e.g., base piece 200) in which a portal 630 (e.g., portal piece 100) is installed; (3) curved track pieces 660 (e.g., 90 degree versions of curved track piece 540); and (4) splitters 650 (oriented in opposite directions to split and subsequently converge the track).

FIG. 33 illustrates a hybrid track configuration 604 with open and closed pathways. This hybrid configuration 604 is formed by connecting an open end of the first Y-assembly from configuration 600 to a closed loop 605 with curved track pieces 660, a straight track piece 620, and a diverter 650. The closed loop 605 is substantially similar to the closed loop configuration 602 shown in FIG. 32 except that loop 605 does not include a base and portal. Notably, when track configurations are formed with the track pieces of the toy vehicle track system presented herein, only one portal piece needs to be included per configuration. This does not mean that only one portal piece can be included in a track configuration and, to the contrary, any number of portal pieces may be included in a configuration; however, only one is necessary to execute the techniques described below.

Figures 34A, 34B:
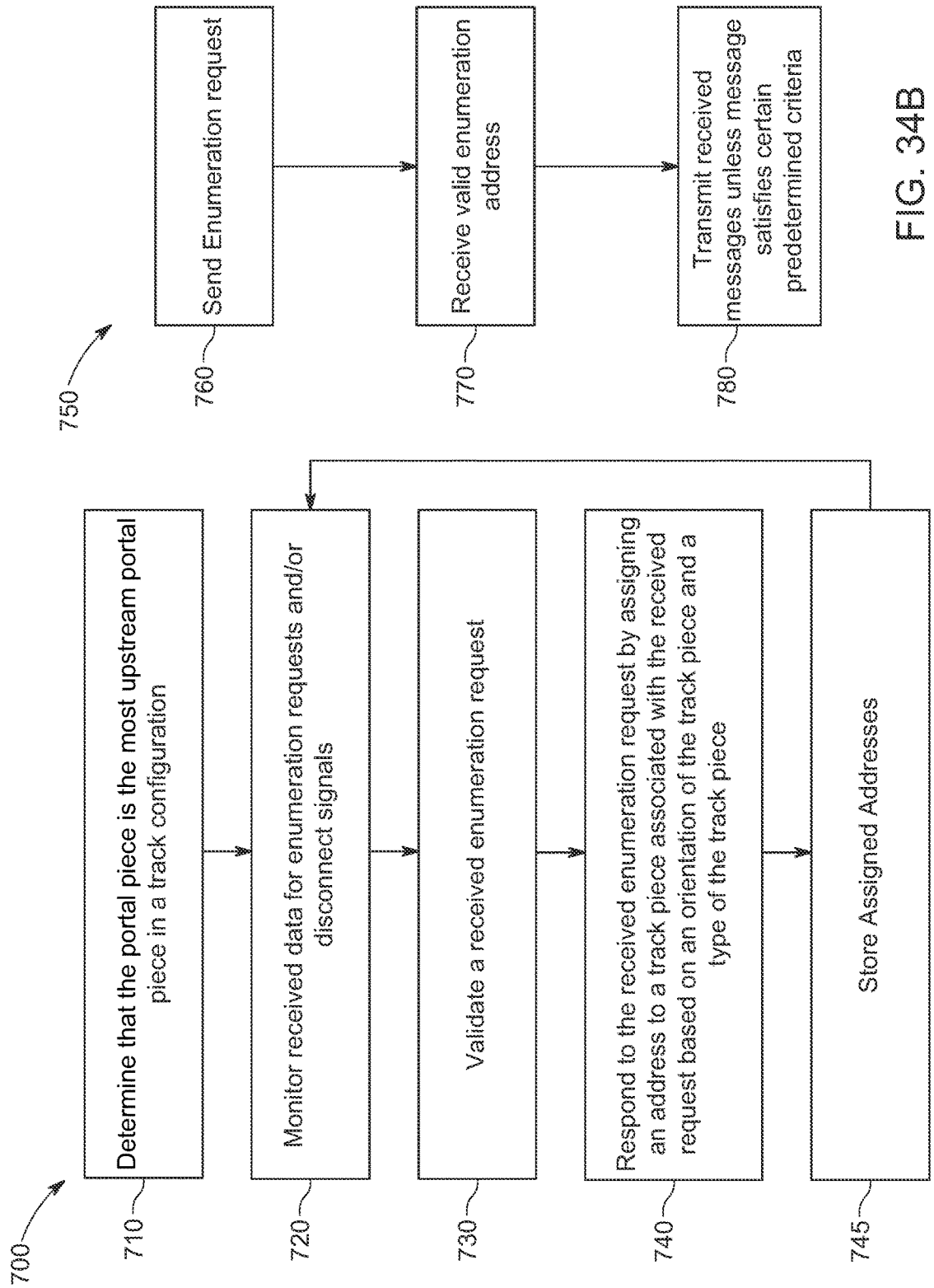
FIGS. 34A and 34B show high-level flow charts depicting example operations that may be executed by a portal piece and a track piece, respectively, to determine a physical track configuration created with the toy vehicle track system of the present application.

FIGS. 34A and 34B are high-level flow charts depicting operations executed by a portal piece and a track piece, respectively, to determine a physical track configuration created with the toy vehicle track system of the present application. That is, FIG. 34A depicts a method 700 executed by a processor included in the portal piece (e.g., processor 172) and FIG. 34B depicts a method 750 executed by a processor included in a track piece (e.g., processor 472) when these pieces are connected in in a track configuration. Each of these methods, which are described in turn below, implements a specific communications protocol that provides accurate and quick communications along an entire track configuration.

First, in method 700, the portal piece initially determines, at 710, whether other portal pieces are included in a track configuration in which the portal has been installed. If the portal piece is the only portal piece in the track configuration or is the most upstream portal piece, the portal piece may assign itself an address reserved for the portal of a track configuration (e.g., 0xFFFF). Alternatively, if the portal piece is not the most upstream portal piece in the track configuration, the portal piece may operate like a track piece any may receive an address from the most upstream portal (as is described in connection with method 750).

In at least some embodiments, the portal may make the determination at 710 by initially assigning itself an address reserved for pieces that need enumeration (e.g., 0x0000) and sending enumeration requests out of all its transmitting ports (e.g., TX ports in the circuitry diagrams included herein). Then, if the portal piece does not receive an address assignment in response to its enumeration requests, the portal piece may determine that it is the most upstream portal piece and the portal piece may assign itself the portal address (e.g., 0xFFFF). The term "most upstream" may be defined based on the orientation of a portal. If, instead, the portal piece receives an address assignment in response to its enumeration requests, the portal piece may be treated as a track piece (and not a portal piece) in the track configuration.

Assuming the portal piece determines at 710 that it is the most upstream portal piece in a track configuration, the portal begins monitoring data received at its receiving ports (e.g., RX ports in the circuitry diagrams included herein) for enumeration requests and/or disconnect signals at 720. The disconnect signals are discussed in further detail below in connection after the description of step 745; however, to monitor for enumeration requests, the portal piece (or more specifically, the portal piece's processor) begins listening for enumeration requests from track pieces connected to couplers associated with the portal piece. For the purposes of this application "couplers associated with the portal piece" denotes couplers included on the portal piece and/or couplers included on a base piece in which the portal is installed, such as couplers 300 of base piece 200. Moreover, track pieces connected to couplers associated with the portal piece may include track pieces directly connected to the couplers associated with the portal piece (e.g., track pieces physically mated with the couplers associated with the portal piece) and indirect connections (i.e., connections by way of an intermediary piece).

Upon receiving an enumeration request, the portal piece validates the request at 730 and, assuming the request is valid, responds to the received enumeration request at 740. The validating that occurs at step 730 may be performed in any manner now known or developed hereafter for validating data. The response sent at 740 involves assigning an address to a track piece associated with the received request based on an orientation of the track piece and a type of the track piece. Generally, track pieces are assigned address sequentially, the sequence being based on the order in which the track pieces are connected to the portal piece (or a base piece in which the portal piece is installed). If multiple pieces are connected together and then connected to the portal piece, the sequence may also be based on proximity to the portal piece, for example, with inner pieces receiving lower addresses.

Additionally, in some embodiments, certain addresses ranges may reserved for certain orientations. For example, odd addresses may be reserved for "normally oriented" track pieces and even addresses may be reserved for "reverse oriented" track pieces. For the purposes of this application "normally oriented" track pieces may include track pieces that have their upstream and downstream ends in the same relative positions as the portal piece. For example, track pieces that are added to a track configuration by connecting an upstream end of that track piece to a downstream end of an adjacent piece and/or by connecting a downstream end of that track piece to an upstream end of an adjacent piece may be considered to be normally oriented. Meanwhile, "reverse oriented" track pieces may include those pieces which are installed into the track configuration by mating an end of that track piece with a like end of another of another track piece (i.e., upstream to upstream or downstream to downstream).

After responding to an enumeration request with an address assignment, the portal piece may store the assigned addresses at 745. For example, the portal piece may update various constructions tables, such as the track type table 1761, the upstream table 1762, the downstream table 1763 from FIG. 4. These tables may collectively track the track configuration of a track that has been or is being built, even if the portal 100 is not connected to an electronic device. For example, the track type table 1761 may track types of track (e.g., straight, loop, diverter, etc.) that are in the track. In at least some embodiments, the track types are each associated with a one or two byte piece of data, which may reduce memory usage as compared to storing an access point name (APN) of a track, which is 10 digits long. Meanwhile, the upstream and downstream tables may track upstream and downstream neighbors for each piece of track. Each of these tables is discussed in further detail below.

After storing assignments at 745, the portal piece may continue monitoring for enumeration requests. Additionally, as mentioned, the portal piece 100 may monitor for disconnect signals. Disconnect signals may be generated (e.g., based on instructions from track ID logic 476) by track pieces when CTS and RX are both low at a particular coupler 300 for more than 10 milliseconds. After 10 milliseconds, the piece detecting the low signals may broadcast a reset message through the track set which will cause each track to reset and re-enumerate. Thus, upon receiving a reset signal, the portal piece may not actually know there has been a disconnect, but it will now start re-enumerating any connected tracks and, thus, will remove disconnected tracks from the enumeration (and the tables that represent the configuration).

Now turning to FIG. 34B, when a track piece is added to a track configuration (or when a portal piece is acting as a track piece), the track piece may initially send an enumeration request at 760. For example, when one of the track piece's couplers 300 is coupled to a coupler 300 that is receiving power (e.g., power being routed to track pieces from/via the portal piece), the track piece will be powered on and may begin transmitting enumeration requests from any of its transmitting ports (e.g., TX ports in the circuitry diagrams included herein). The number of enumeration requests generated by a particular piece may be governed (e.g., based on instructions from track ID logic 476) by the number of ports included in that piece.

Generally, a piece will generate one less enumeration requests than ports, with the minimum number of requests being one (so that a track with one port still generates a request). Thus, a straight track (e.g., piece 400) and a stop/finish track (e.g., piece 550) may each generate one enumeration request but a splitter/diverter track with three ports (e.g., one entrance and two exits, or in reverse, two entrances and one exit) may generate two enumeration requests. As is explained below, this may allow proper tracking of neighbors along an entire construction/configuration.

Moreover, generally data is transmitted between pieces of the toy vehicle track system presented herein (including between two track pieces or between a track piece and the portal piece) in a packet structure. As is described in further detail below in connection with FIGS. 35 and 36, each packet structure will include at least a source ID and a target ID, among other data fields. Thus, in at least some embodiments, the track piece may assign itself initially assigning itself an address reserved for pieces that need enumeration (e.g., 0x0000) prior to sending enumeration requests out of all its transmitting ports. This address may serve as the source ID in the enumeration request. Then, the track piece waits for an address assignment (which will identify the track piece as the target ID).

Once the track piece receives a valid address assignment at 770, the track piece will then be able to forward received packets to their intended destination at 780. However, a track piece cannot forward packets at 780 without receiving a valid address assignment at 770. For example, once the track piece receives a valid address assignment at 770, the track piece might forward enumeration requests from additional track pieces towards the portal piece and/or the track piece might forward address assignments away from the portal piece (the forwarding being based on a target ID of a packet including the request or assignment). One advantage of this setup is that it ensures track pieces are assigned addresses sequentially moving away from the portal piece (since inner track pieces cannot communicate requests for outer track pieces until they have an assigned address).

In at least some embodiments, due to the communication protocol implemented by the toy vehicle track set presented herein, the track pieces may also follow specific rules to determine whether received messages should be transmitted at 780. These rules may further enhance the efficiency and accuracy of communications across a toy vehicle track system configuration. For example, in some embodiments, a track piece will not pass a received packet to its transmit ports if the received packet has a source ID or target ID of that track piece (i.e., if a piece reads a source ID or target ID as itself). Additionally or alternatively, a track piece might not pass a received packet to its transmit ports if the received packet has a target ID indicating it is a broadcast message and certain data fields of the packet (e.g., any one of the target ID, the Source ID, the command ID, and the payload) are identical to a broadcast message that has been received in the last second. This may prevent broadcast storms.

Figure 35:
FIGS. 35 and 36 illustrate example data structures for packets generated during execution of the methods of FIGS. 34A and 34B.
Figure 36:

FIGS. 35 and 36 illustrate example data structures for packets generated during execution of the methods of FIGS. 34A and 34B. FIG. 35 illustrates a first example packet structure 790 that includes Serial Line Internet Protocol (SLIP) encoding and a designated end of packet (EOP) while FIG. 36 illustrates a second example packet structure 795 that does not include SLIP encoding or an EOP. Instead, the second example packet structure 795 includes a payload length data field (and packet structure 790 does not). However, otherwise, packet structure 790 and 795 are largely similar. Thus, for brevity, similar data fields are only described once below.

Moving from left to right, each packet structure includes a Start of Packet (SOP) that marks the beginning of the packet. The SOP may be 1 byte long and may have the value 0x8D. Then, each packet structure includes a source ID (SID) and a target ID (TID) that identify where a packet originated and where it should be delivered, respectively. Each of these fields may be 2 bytes long and may be field on a per-packet basis. Next, each packet structure includes a command ID (CID) that indicates the purpose of the packet (e.g., enumeration request, address assignment, etc.). Like the SID and TID, the CID may be 2 bytes long and may be field on a per-packet basis. Some example commands for the CID include 'enter broadcast mode' (e.g., 0xFFFF), 'firmware upgrade manifest' (e.g., 0xAAAA), 'firmware upgrade package' (e.g., 0x5555), 'enumeration request' (e.g., 0xA5A5), 'set track address' (e.g., 0x5A5A), 'request firmware version' (e.g., 0x0001), and 'reset' (e.g., 0x0000).

After the CID, packet structure 790 includes a payload (PL). By comparison, the payload of packet structure 795 is separated from the CID by the packet length field (LEN), as mentioned above. Regardless, both payloads provide space for a message to be carried by the packet. For example, the payload may carry the address assignment for a specific track piece, the UART associated with transmitting an enumeration request, and/or tags from track pieces forwarding the packet, as is discussed in further detail below in connection with FIGS. 37-40. The length and value of the payload may vary (and is SLIP encoded in packet structure 790, but not packet structure 795); however, in at least some embodiments, the payload should not exceed 500 bytes to ensure that all track pieces of a track system can communicate quickly.

After the payload (and still moving left to right), both packet structures include a 2 byte long cyclic redundancy check (CRC) data field that performs error checking on all bytes transmitted between SOP and CRC. Packet structure 795 ends at CRC and packet structure 790 also includes an end of packet (EOP), as mentioned above. The EOP may be 1 byte long and may have the value 0x8D.

FIGS. 37-40 illustrate example data generated during execution of the methods of FIGS. 34A and 34B. In these Figures, data sent between track pieces is shown being sent in the first packet structure 790; however, this is merely an example and in other embodiments data may be sent between track pieces in the second packet structure 795 or any other structure. Additionally, FIGS. 37-40 each depict one track piece being added to a portal piece 630 installed in a base piece 640 at a time, but in other embodiments, multiple track pieces could be coupled together and then connected to the base piece 640. In these embodiments, pieces closest to the portal piece 630 would communicate with the portal piece 630 first to receive address assignments, as mentioned above. Then, once assigned an address, these inner pieces would forward data transmissions between outer pieces and the portal piece 630.

In addition to the data sent between track pieces, FIGS. 37-40 also illustrate various tables maintained by the portal piece during track construction/configuration (or deconstruction or re-configuration). More specifically, FIGS. 37-40 each include a track type table 820 (which may be equivalent to track type table 1761 of FIG. 4), an upstream table 830 (which may be equivalent upstream table 1762 of FIG. 4), and a downstream table 840 (which may be equivalent to upstream table 1763 of FIG. 4). As is explained below, these tables assist the portal piece with enumeration operations.

Figure 37:
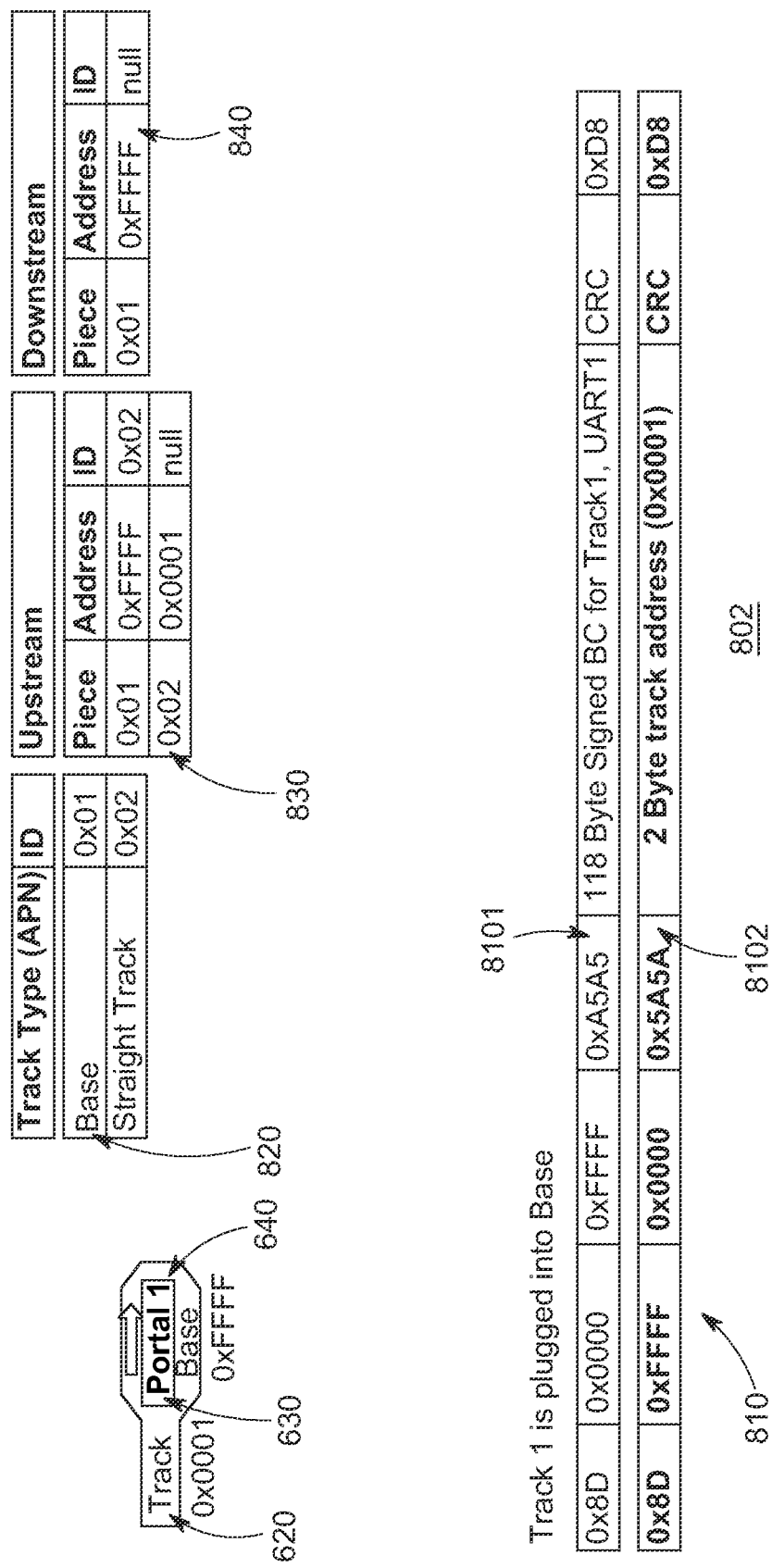
FIGS. 37-40 illustrate example data generated during execution of the methods of FIGS. 34A and 34B.

That all said, in diagram 802, FIG. 37 shows "Track 1," which is a straight track 620 (e.g., track piece 400 or 400') being connected to a base 640 (e.g., track piece 200, 200' or 200") in which a portal 630 (e.g., portal piece 100 or 100') is installed. Once the couplers 300 of Track 1 and base 640 are fully connected and deliver power to a processor included in Track 1, Track 1 assigns itself an address reserved for pieces that need enumeration (e.g., 0x0000) and generates an enumeration request 8101 to send to the portal (which is assigned the portal address (e.g., 0xFFFF)). The enumeration request 8101 includes, from left to right: (1) an SOP of "0x8D;" (2) a SID "0x0000;" (3) a TID of "0xFFFF;" (4) a CID of "0xA5A5," which is indicative of an enumeration request; (5) a payload with the track piece's signed birth certificate ("BC") and "UART1," which is the number of the UART circuit transmitting the request; (6) CRC; and (7) an EOP of "0x8D."

Notably, in diagram 802, Track 1 is installed onto the base 640 by mating the male and female connectors of a coupler 300 included at its downstream end with corresponding portions of a coupler 300 included at an upstream end of base 640. That is, Track 1 is installed onto base 640 in a normal orientation (i.e., it is oriented normally). Since the downstream end of Track 1 is connected to the base, the payload of enumeration request 8101 includes the data "UART1." As mentioned above, the UART number provides an indication of the UART circuit associated with the coupler from which the enumeration request 8101 is transmitted which, in turn, may allow the portal to determine the orientation of the track piece. In this instance, UART1 indicates that a downstream end of Track 1 is coupled to the base 640 and the request is received at a coupler disposed at an upstream end of the base 640 (e.g., the coupler associated with UART0 in FIG. 13). Thus, the portal 630 can determine that Track 1 is oriented normally (because it is coupled downstream to upstream). Meanwhile, and as was also discussed above, the birth certificate of a track piece may identify the track type of Track 1 as being a straight track.

Put broadly, since the payload includes information to identify the track type and the track's orientation, the portal can determine the type and orientation of a track when the portal receives enumeration request 8101. The portal can also determine whether the piece has been installed upstream or downstream of the portal based on which base coupler received the enumeration request (again, based on UART circuitry numbering). Additionally, and as is discussed further in connection with FIGS. 38-40, when an enumeration request is sent to the portal via multiple track pieces, each track piece forwarding the request may append its ID to the payload to provide context relating to the source's position in a track configuration (since enumeration request 8101 is sent by a track piece attached directly to the base, this is not shown in FIG. 37).

In view of the foregoing, and still referring to FIG. 37, upon receiving enumeration request 8101, the portal piece may update its construction tables and respond with an address assignment. Specifically, the portal 630 may assign Track 1 the address "0x0001" and send an address assignment 8102 back to Track 1 with this assignment in the payload. That is, the portal 630 may transmit out of its transmission ports a packet that includes, from left to right, the following data fields: (1) an SOP of "0x8D;" (2) a SID "0xFFFF;" (3) a TID of "0x0000;" (4) a CID of "0x5A5A," which may be indicative of an address assignment; (5) a payload with the new address assignment, "0x0001;" (6) CRC; and (7) an EOP of "0x8D." Notably, the target ID (TID) of the address assignment 8102 remains 0x0000 since track 1 will not be aware of its assigned address until receiving the address assignment.

Additionally, the portal piece will update track type table 820 (which had assigned base 640 the ID "0x01" when the portal 630 was installed in base) to include ID "0x02" for straight tracks (based on information from the signed birth certificate included in the payload of enumeration request 8101). The portal 630 will also update the upstream table 830 to specify that the portal (address 0xFFFF) is upstream of a straight piece (piece 0x02). Since piece 0x02 was added to the upstream table, portal 630 also adds an entry (i.e., a row) for piece 0x02 to the upstream table. However, piece 0x02 (straight track piece "Track 1," which is now identified as address 0x0001) is the most upstream piece and, thus, does not have any upstream neighbors, so the table lists null for piece 0x0001's upstream neighbor. Portal maintains the downstream table 840 in a similar manner to the upstream table. However, in diagram 802, no pieces have been added downstream of the portal 630 and, thus, the downstream table 840 remains un-updated (only listing the portal as piece 0x01, with null downstream).

Figure 38:
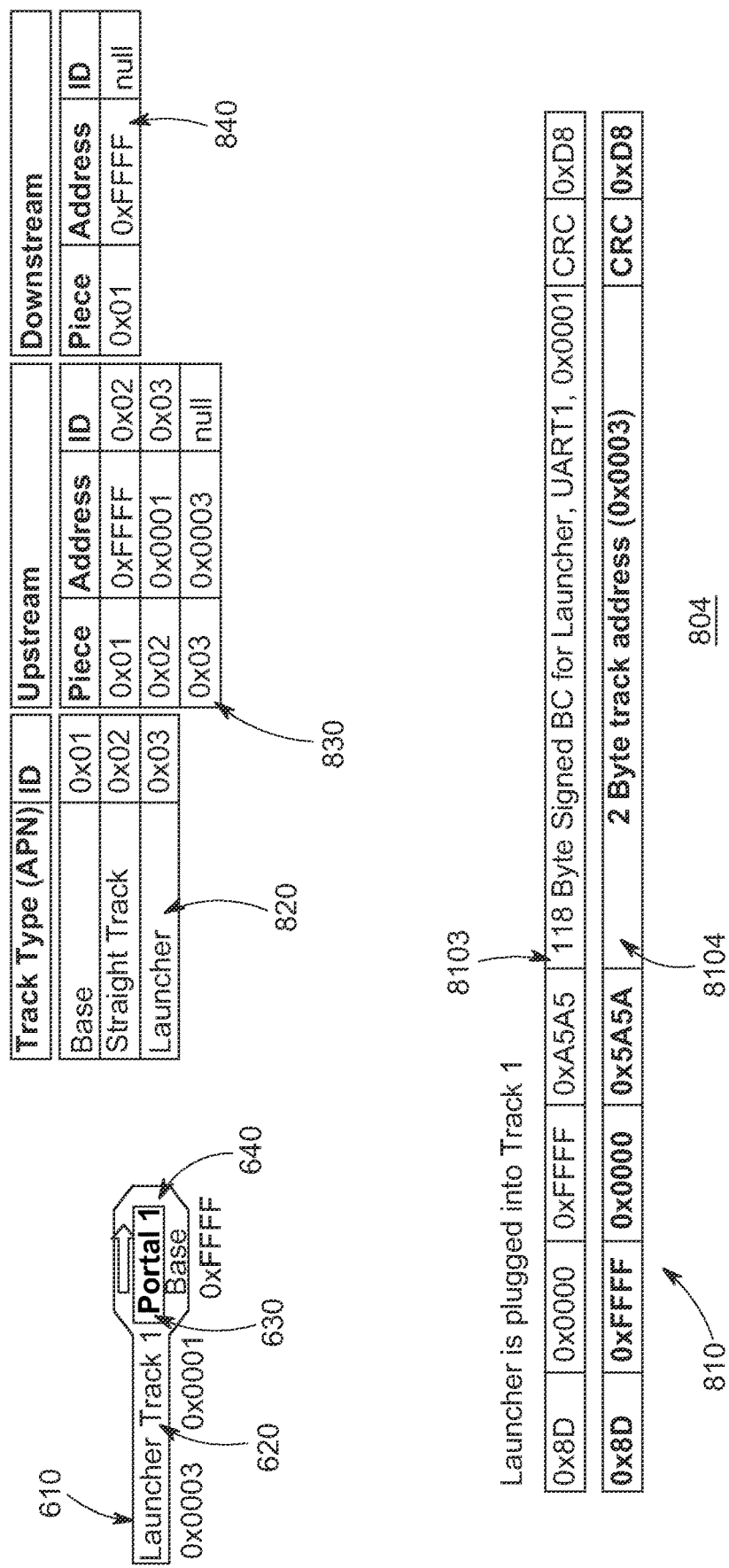

Now turning to FIG. 38, diagram 804 illustrates a launcher 610 being installed onto an upstream end of track 0x0001 (referred to previously as "Track 1") and also illustrates the packets sent and table updates made during this installation. Once the couplers 300 of launcher 610 are fully connected to the couplers 300 on the upstream end of track 0x0001 and deliver power to a processor included in launcher 610, launcher 610 assigns itself an address reserved for pieces that need enumeration (e.g., 0x0000) and generates an enumeration request 8103 to send to the portal (which is assigned the portal address (e.g., 0xFFFF)). Initially, enumeration request 8103 is identical to enumeration request 8101 aside from the birth certificate in the payload; however, since enumeration request 8103 passes through track 0x0001 to get to the portal, the payload is signed by track piece 0x0001 (with its address) so that the payload includes "0x0001" when it reaches the portal (as is shown in diagram 804). Thus, when the portal receives enumeration request 8103, it can recognize that the request originated from a piece attached to an upstream end of track 0x0001, even though the track pieces originating and transmitting the request do not necessarily know this information.

As was discussed above in connection with track 0x0001 (referred to as Track 1 above), the portal can also determine the orientation (normal or reverse) of the launcher based on the UART number included in the payload. Here, the launcher 610 only includes one coupler (the launcher is a closed-end, one port launcher) associated with UART1 and, thus, is considered to be oriented normally if it is connected to an upstream end of another track. In this particular example, tracks oriented normally are assigned odd numbers and tracks oriented in reverse are assigned odd numbers. Thus, the launcher is assigned the next odd numbered address of "0x0003" and the portal sends an address assignment 8104 back to launcher 610 with this assignment in the payload. Aside from the payload, address assignment 8104 is identical to address assignment 8102.

Additionally, the portal piece will update track type table 820 to include ID "0x03" for closed-end launcher tracks (based on information from the signed birth certificate included in the payload of enumeration request 8103). The portal 630 will also update the upstream table 830 to specify that the track 0x0001 (piece 0x02) is upstream of a launcher type piece (piece 0x03). Since piece 0x03 was added to the upstream table, portal 630 also adds an entry (i.e., a row) for piece 0x03 to the upstream table. However, piece address 0x0003 (launcher 610) is the most upstream piece and, thus, is does not have an upstream neighbor, so the table lists null for its upstream neighbor. In diagram 804, no pieces have been added downstream of the portal 630 and, thus, the downstream table 840 remain un-updated (only listing the portal as piece 0x01, with null downstream).

Figure 39:
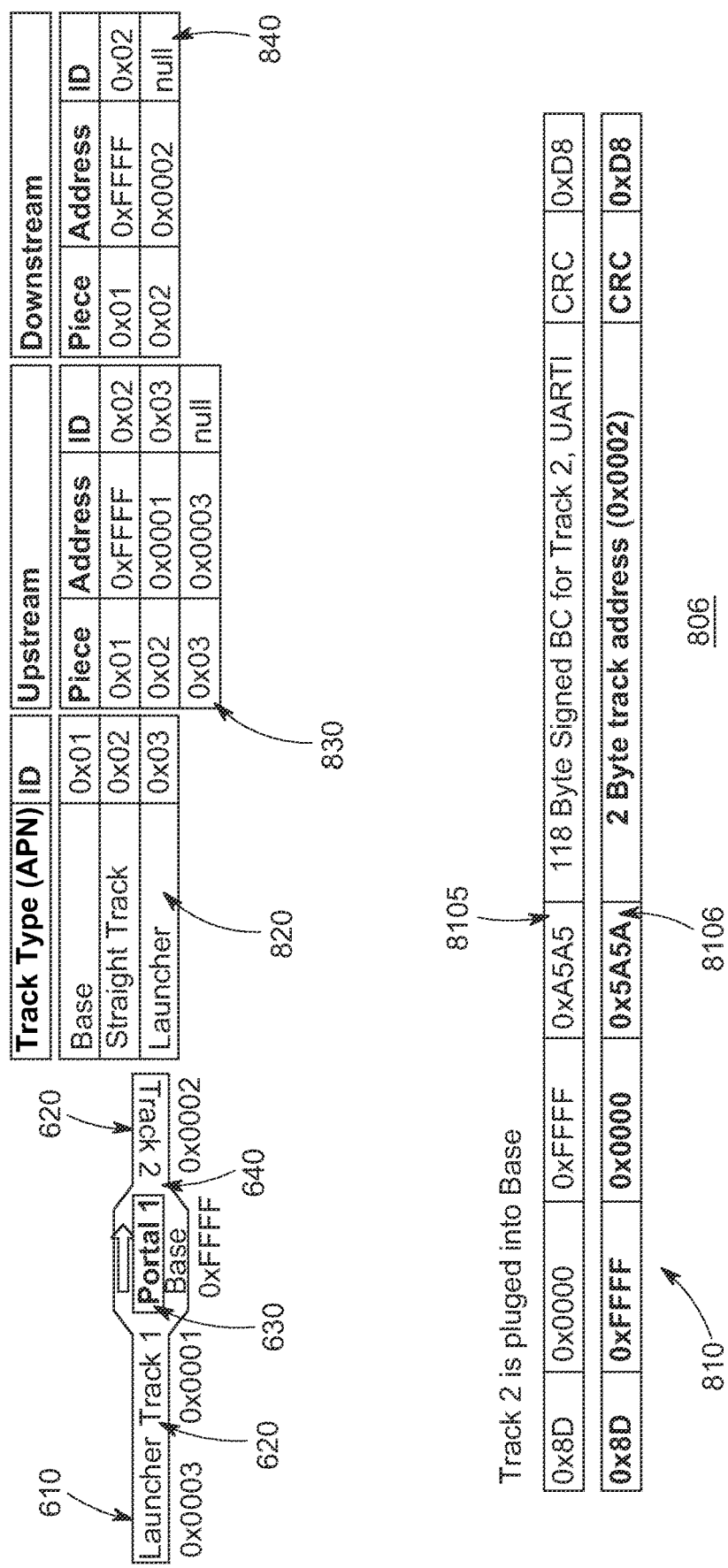

Now turning to FIG. 39, diagram 806 illustrates a straight track piece 620 ("Track 2") being installed onto a downstream end of the portal 630 in a reverse orientation and also illustrates the packets sent and table updates made during this installation. Just like the previous installations, once the couplers 300 of Track 2 are fully connected to the couplers 300 on the downstream end of the portal and deliver power to a processor included in Track 2, Track 2 assigns itself an address reserved for pieces that need enumeration (e.g., 0x0000) and generates an enumeration request 8105 to send to the portal (which is assigned the portal address (e.g., 0xFFFF)).

Since Track 1 and Track 2 are both attached directly to the base 640 with the portal 630, enumeration request 8105 is nearly identical to enumeration request 8101. In fact, the payload of enumeration request 8105 even includes "UART1" like enumeration request 8101. However, since Track 2 is coupled to the downstream end of base 640 (as is determined based on UART numbers of the base transmitting the enumeration request to the portal 630), the upstream end of a track piece (i.e., the end associated with "UART0") must be connected to the portal for a piece to be considered to be "oriented normally." Since tracks oriented normally are assigned odd numbers and tracks oriented in reverse are assigned odd numbers in this example, Track 2 is assigned the next highest even numbered address, which in this scenario is "0x0002." The portal then sends an address assignment 8106 back to Track 2 with this assignment in the payload. Aside from the payload, address assignment 8106 is identical to address assignments 8102 and 8104.

In diagram 806, track type table 820 is not updated because the portal has already identified straight track (in diagram 802) and assigned it track ID 0x02. Additionally, the upstream table 830 is not updated as compared to diagram 804 because no pieces have been added upstream of the portal 630. Instead, only the downstream table 840 is updated to specify that the track 0x0002 (Track 2, which is a piece type 0x02) is downstream of the portal (address 0xFFFF). Since a piece of type 0x02 was added to the downstream table 840, portal 630 also adds an entry (i.e., a row) to the downstream table 840 to identify downstream piece type 0x02 as piece address 0x0002. However, piece address 0x0002 (Track 2) is the most downstream piece and, thus, is does not have a downstream neighbor, so the table lists null for its downstream neighbor.

Figure 40:
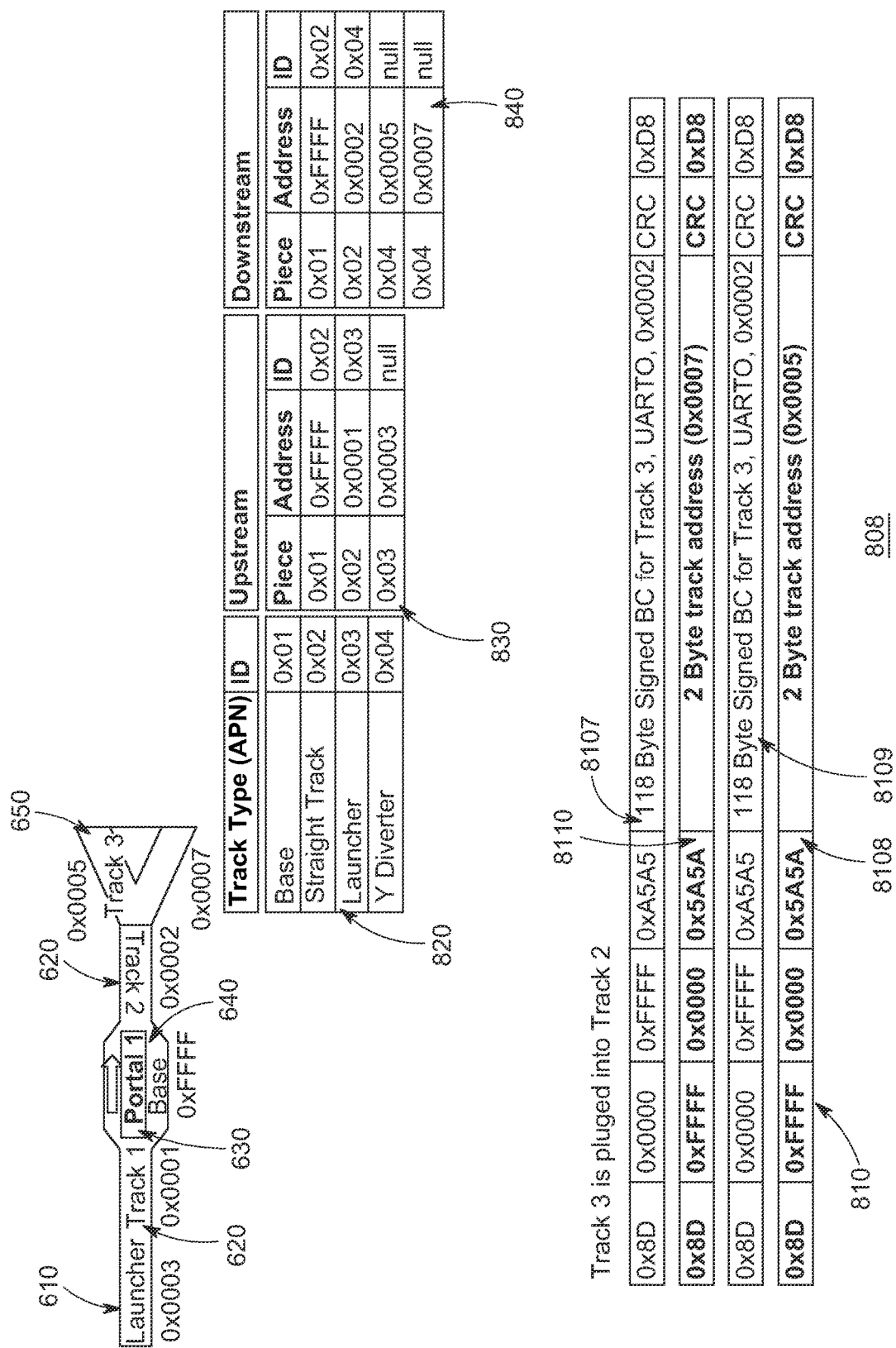

The last diagram, diagram 808, which is shown in FIG. 40, illustrates a diverter track piece 650 being installed onto a downstream end of Track 2 (track address 0x0002) and also illustrates the packets sent and table updates made during this installation. Like the previous installations, once the couplers 300 of diverter 650 are fully connected to the couplers 300 on the downstream end of the Track 2 and deliver power to a processor included in diverter 650, diverter assigns itself an address reserved for pieces that need enumeration (e.g., 0x0000). However, since diverter 650 includes three total ports (arranged as one entrance and two exits in this particular example), the diverter now generates two enumeration requests to send to the portal (which is assigned the portal address (e.g., 0xFFFF): enumeration request 8107 and enumeration request 8109. Request 8107 and request 8109 are identical to each other and, aside from their payload are also identical to enumeration requests 8101, 8103, and 8105.

As a general rule, a track piece will send a number of enumeration requests that is one less than a number of ports (i.e., entrances or exits with couplers 300) included on that track (i.e., N−1 requests, with N being the number of ports), with a minimum of one. Here, the three ports of the diverter (the entrance and two exits) each include a coupler. The upstream end (the entrance) is associated with "UART0" and, thus, enumeration requests 8107 and 8109 each include "UART0." Additionally, the payload of enumeration requests 8107 and 8109 each include "0x0002" because the requests are sent to the portal 630 via track 0x0002 (previously referred to as Track 2) and signed by this piece during transport, as was discussed above in connection with diagram 804.

In response to receiving two enumeration requests that indicate, based on the UART number and birth certificate, that they are from a branched piece (i.e., a single piece with more than two ports), the portal 630 responds with two address assignments: assignment 8108 and 8110. Each assignment sends an assignment for a different port/branch of the diverter and ensures that additional track pieces extending from a particular port can be tracked individually (assigning one address to a diverter would not allow tracking of a branched configuration). Here, assignment 8108 assigns a first branch address 0x0005 and assignment 8110 assigns a second branch address 0x0007. Notably, since the portal treats enumeration requests with UART0 in the payload that are received at the downstream end of the portal as being in a normal orientation, both branches are given odd addresses. Aside from the payload, address assignments 8108 and 8110 are identical to address assignments 8102, 8104, and 8106.

In diagram 808, the portal piece also updates track type table 820 to include ID "0x04" for Y-diverter tracks (based on information from the signed birth certificate included in the payloads of enumeration requests 8107 and 8109). The portal 630 also updates the downstream table 830 to specify that the track 0x0005 and track 0x0007 (piece 0x04) are downstream of piece address 0x0002. Since a piece of type 0x04 was added to the downstream table 840, portal 630 also adds two entries (i.e., two rows) to the downstream table 840 to identify downstream piece type 0x04 as piece addresses 0x0005 and 0x0007. However, pieces 0x0005 and 0x0007 (the two branches of diverter 650) are the most downstream pieces and, thus, do not have downstream neighbors, so the table lists null for its downstream neighbor. In diagram 808, no pieces have been added upstream of the portal 630 and, thus, the upstream table 830 is not updated as compared to diagram 804.

Notably, when a two port piece is added to a track configuration, the upstream or downstream table grows by 5 bytes. By comparison, if a diverter/splitter piece is added (i.e., a piece with three or more ports), the upstream or downstream table will grow by (N−1)×5 bytes, with N indicating the number of ports. This growth continues until the track is completed. If the track is completed by making a loop, the last piece of the loop will be enumerated based on the first connection made with that piece (i.e., based on which of its couplers is connected to another piece first). Then, the second connection formed with that track piece (i.e., the connection which completes the loop) will not trigger any additional enumerations (since the piece will have already have been enumerated).

Figure 41:
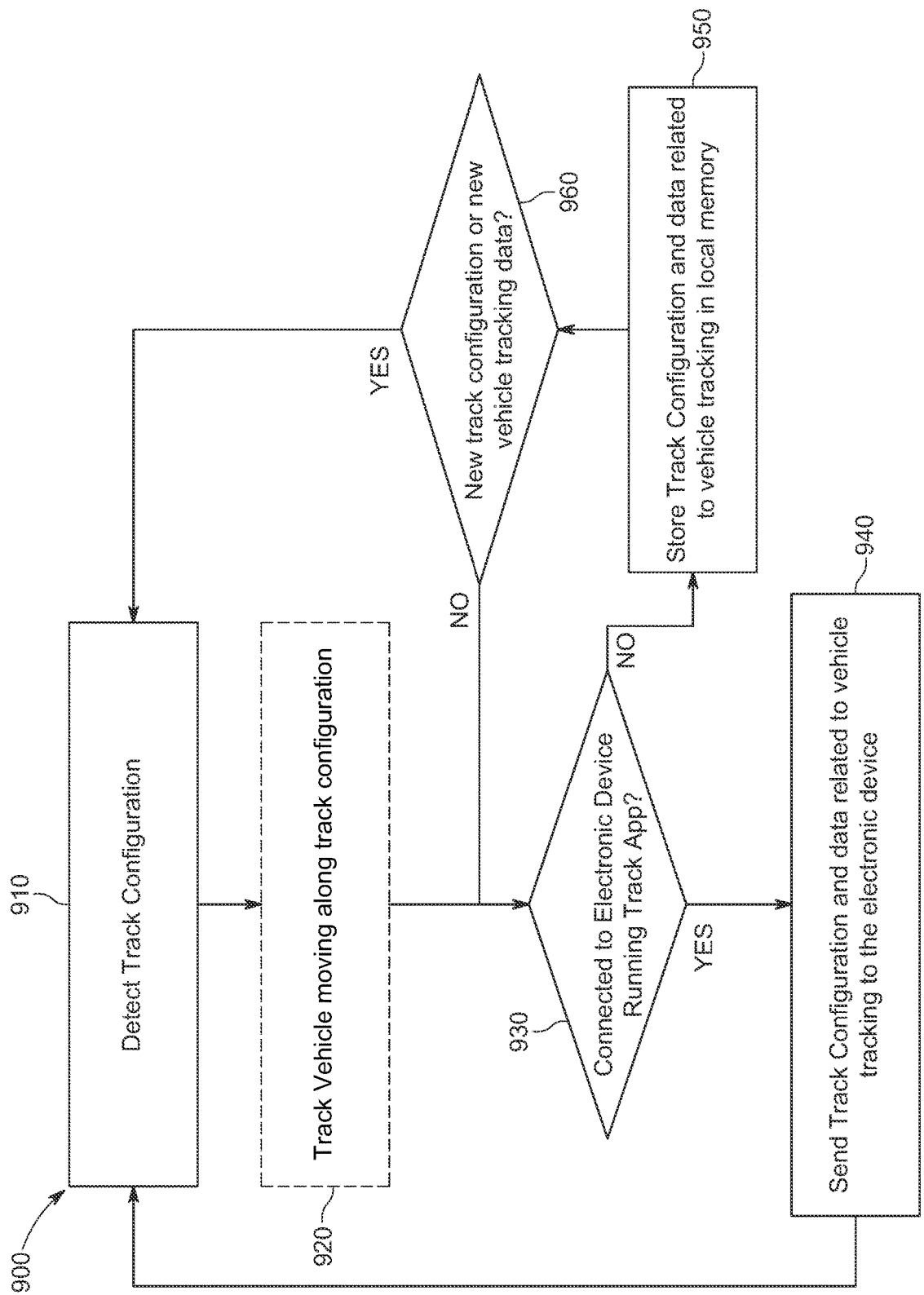
FIG. 41 depicts a high-level flow chart depicting example operations that may be executed by a portal piece to transmit a track configuration and related data to an electronic device executing an application associated with the toy vehicle track system presented herein.

FIG. 41 depicts a high-level flow chart depicting a method 900 executed by a portal piece to transmit a track configuration and related data to an electronic device executing an application associated with the toy vehicle track system presented herein ("track app"). Initially, at 910, the portal piece detects a track configuration in accordance with the techniques and communication protocol described herein. For example, the portal piece may communicate with track pieces and build various tables in the manner shown in FIGS. 37-40 to detect that track is in configuration 602 (e.g., the closed loop configuration of FIG. 32).

Once or as the track configuration is detected, the portal piece may also track toy vehicles that are moving along the track configuration at 920. For example, the portal piece may identify and track toy vehicles using wireless tags, NFC readers, and IR beams, as is described in U.S. patent application Ser. No. 16/170,145, filed on Oct. 25, 2018, and entitled "Toy Vehicle Accessory and Related System." As has been mentioned, the contents of this application are incorporated herein in their entirety. That said, the portal piece need not track toy vehicles in all embodiments.

As or after the portal piece has determined the track configuration and potentially tracked toy vehicle movements along the track configuration, the portal piece determines, at 930 whether it is connected to an electronic device that is executing the track app. As mentioned, any electronic device, including smartphones, tablets, laptops, desktop computers, etc. may be suitable for executing the track app. Moreover, the portal piece may connect to such an electronic device in any wired or wireless manner, such as via a BLUETOOTH LE connection.

If the portal piece is connected to an electronic device running the track app, the portal piece sends any data it has gathered (i.e., the track configuration and any vehicle tracking data) to the electronic device at 940. In some embodiments, the sending completed at 940 may be continuous so that, for example, the electronic device can track vehicles in or close to real-time. Additionally or alternatively, the sending at 940 might be at predetermined or dynamically adjusted intervals.

If, instead, the portal piece is not connected to an electronic device running the track app, the portal piece may store this data in local memory at 950 and wait for an electronic device to connect to the portal piece. During this waiting time, the portal piece may continue checking for new track configuration data (e.g., added or disconnected pieces) or vehicle tracking data at 960. If new data is detected, the portal piece may exit the feedback loop between 930 and 950 (i.e., stop waiting for an electronic device to connect to the portal) and gather/update the new data at 910 and/or 920.

Figure 42:
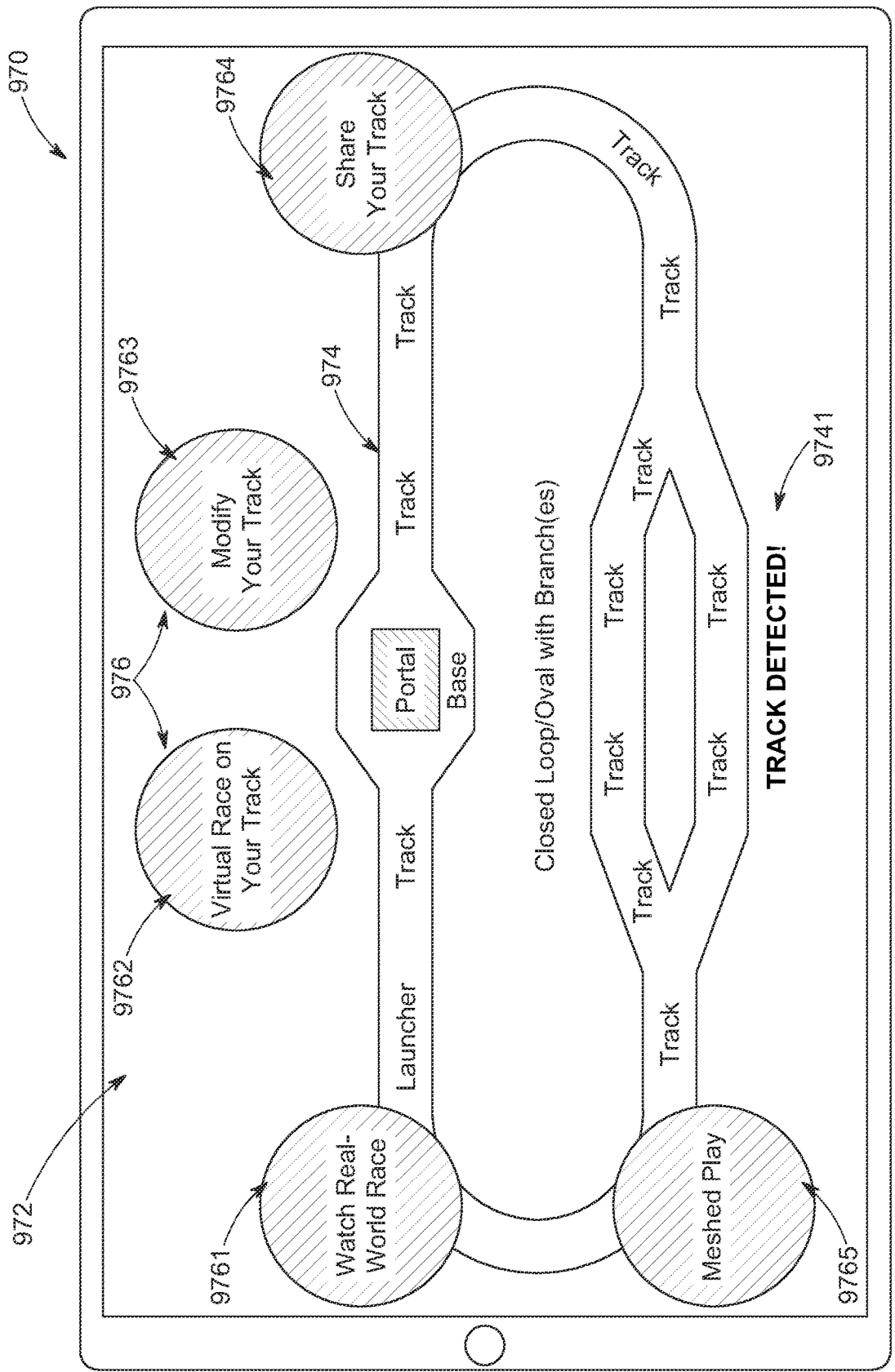
FIG. 42 depicts an example graphical user interface of an electronic device executing an application associated with the toy vehicle track system presented herein.

FIG. 42 shows an example graphical user interface (GUI) 972 that is displayed on an electronic device 970 running the track app after the portal piece transmits at least track configuration data to the electronic device 970 (e.g., via a BLUETOOTH LE connection). The GUI 972 may display a digital representation 974 of the detected track configuration (which, in this example, is track configuration 602 from FIG. 32) together with an indication 9741 that a track configuration has been successfully detected/captured. The GUI 972 may also display a number of digital buttons 976 that allow various modes of digital play based on the detected configuration of physical track pieces. Some modes of digital play may also be based on detected movements of physical toy vehicles on the configuration of physical track pieces.

For example, in the detected embodiment, the GUI 972 includes a "watch real-world race" button 9761 that may allow a user to watch a digital replay of their toy vehicles moving along a detected track configuration. The digital replay may be generated based on detected identities of the vehicles (e.g., detected by wireless reading tags in the vehicles) and detected movements of the toy vehicles (e.g., by IR gates disposed around the track). Although the app may not have completely accurate tracking data from the portal piece (since IR gates only periodically track toy vehicles), the track app may create a complete simulation based on the various data inputs it receives from the portal piece.

As another example, button 9765, which is labeled "meshed play" may allow a user to race physical toy vehicles on a track configuration while the GUI 972 displays a digital representation of the racing. That is, a user can press button 9765 to mesh dynamic play in the real (e.g., physical) world with dynamic play in a digital environment. Thus, as a booster launches a toy vehicle around a track configuration, a user can watch the physical toy vehicle race around the physical track configuration and/or watch a virtual representation of the toy vehicle or a digital representation of the track configuration. In at least some embodiments, the position of the toy vehicle in the virtual representation may be slightly delayed as compared to the real toy vehicle's position. This delay may be because the virtual representation is being created based on data collected by the track and transmitted to the electronic device. Thus, the "meshed play" may be described as approximately real-time, dynamic physical-digital play and/or nearly synchronized, dynamic physical-digital play.

By comparison, buttons 9762, 9763, and 9734 may simply provide a user with play options based primarily on the track. Button 9762 may allow a user to drive a digital vehicle, such as a modified version of a detected vehicle that is modified in accordance with the techniques described in U.S. patent application Ser. No. 16/170,145, filed on Oct. 25, 2018, and entitled "Toy Vehicle Accessory and Related System," along the detected track configuration. Meanwhile, button 9763 may allow a user to modify a digital version of their physical track configuration, perhaps to add stunts, accessories, indicia, etc. The user might also change or expand a digital version of a physical track configuration in this mode. Finally, button 9764 may allow a user to share their track, perhaps to show a friend what they built with their physical track pieces.

Figure 43:
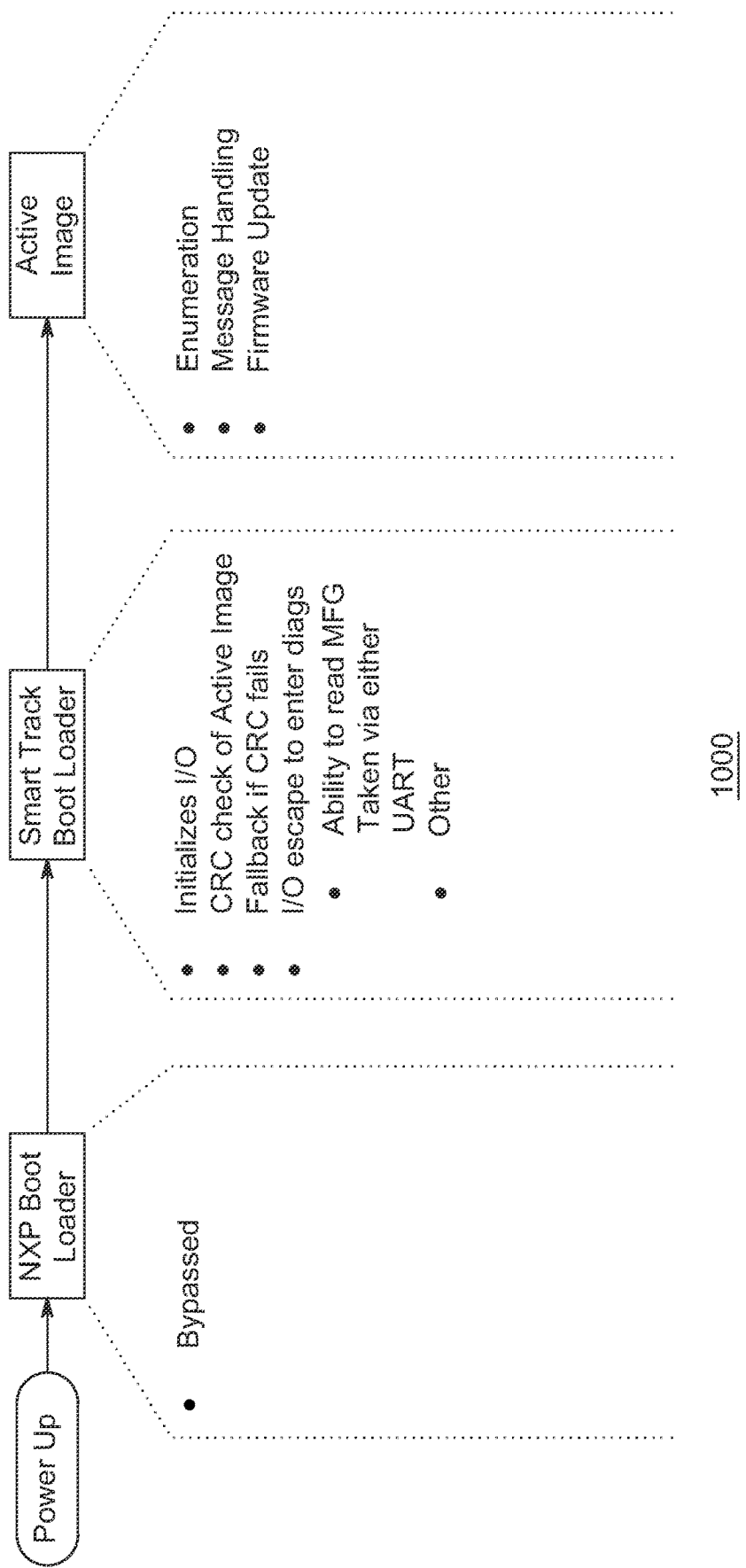
FIG. 43 is a diagram illustrating, at a high-level, an example power-on sequence for the toy vehicle track system of the present application.

Now turning to FIG. 43, this Figure illustrates a high-level flow chart of a power-up sequence 1000 for the toy vehicle track system presented herein. As can be seen, on power-up (e.g., on connection of a track piece to a powered portal or on powering up of the portal), the track system bypasses an NXP Boot Loader and utilizes a "smart track boot loader" to initialize input/output (I/O), run a CRC check of active images (with a fallback if CRC fails), and enter diagnostics. Then, the sequence moves into active imaging, during which enumeration operations (as described above), message handling (e.g., messages relating to the detected position of a toy vehicle), and firmware updates (described below) are executed.

Figure 44:
FIG. 44 illustrates a switch included in one or more track pieces of the toy vehicle track system of the present application.
Figure 45:
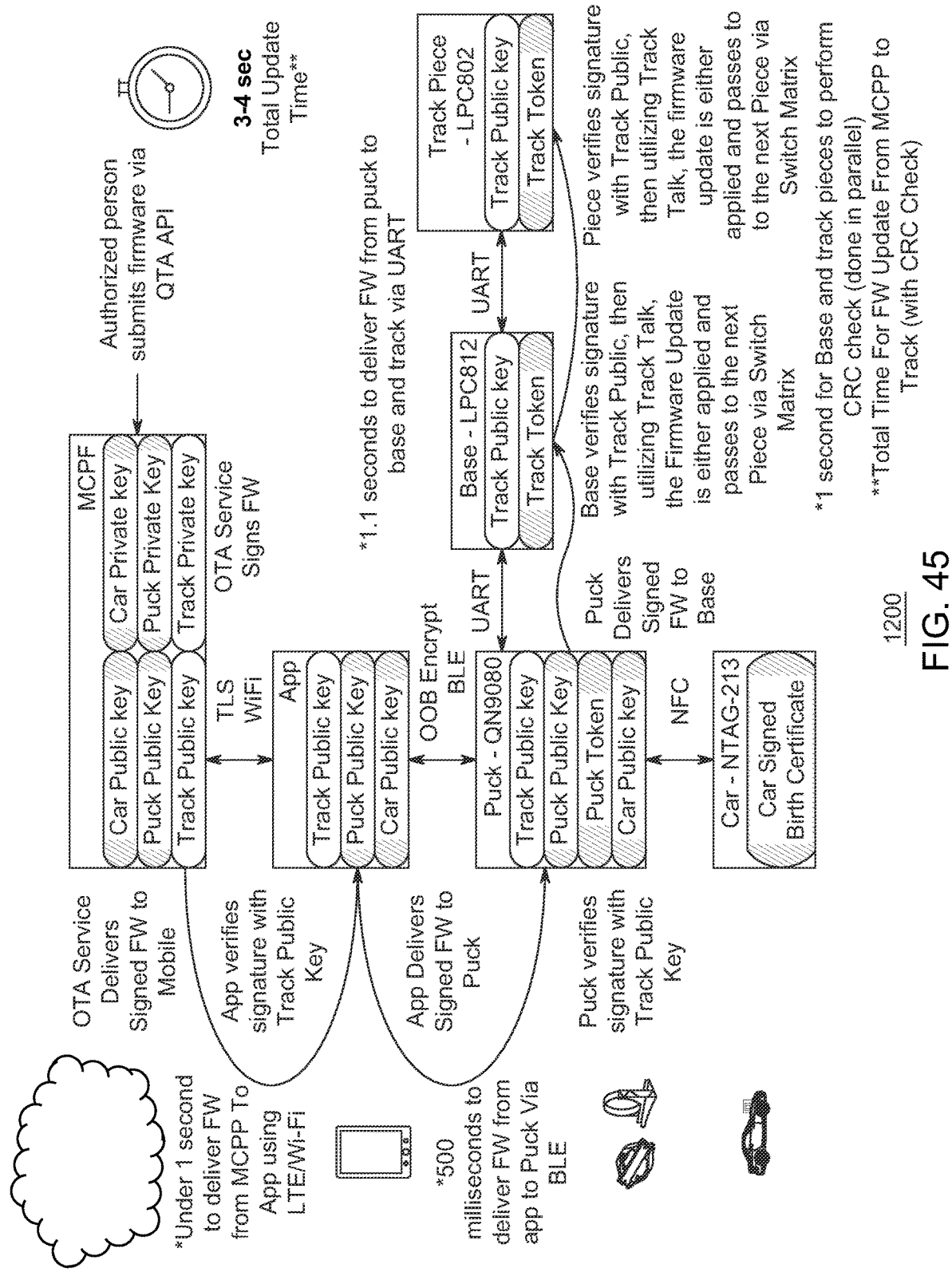
FIG. 45 is a diagram illustrating, at a high-level, an example firmware update sequence for the toy vehicle track system of the present application.

Now turning to FIGS. 44 and 45, these two figures illustrate components and operations associated with updating firmware for the toy vehicle track system presented herein. In particular, FIG. 44 illustrates a switch arrangement 1100 that can be included in the computing components of the portal, the base, and/or the track pieces described above. The switch can be operated by a UART circuit and/or by a processor and can alter the connections between a transmitter of a coupler and a transmitter pin of a UART circuit. More specifically, the switch arrangement includes two switches: a switch S1 that can selectively connect a receiver-to-receiver connection with a transmitter pin of a coupler; and a switch S2 disposed between the transmitter pin of the coupler and a transmitter pin of a UART circuit. During enumeration or message operations, S1 is open and S2 is closed. However, during a firmware (FW) update, S1 is closed and S2 is open.

FIG. 45 illustrates a high-level flow chart of a firmware update sequence 1200 for the toy vehicle track system presented herein. In this example, the firmware update is sent over the air (OTA) through an application programming interface (API). The OTA Service providing the firmware update utilizes a private key to deliver the firmware update to the track app, which is maintained with a public key (e.g., by MATTEL) and the track app verifies the firmware update based on the public key. The app then delivers the firmware update to a portal piece (referred to as "puck" in FIG. 43) which also verifies the update using the public key. The portal then delivers the firmware update to any track pieces connected thereto (e.g., by closing switch S1 and opening switch S2 of switch arrangement 1100), via the base in which the portal piece is installed. The portal piece may also transmit the update to a toy vehicle via NFC technology.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A method for determining a configuration of a physical toy vehicle track, the method comprising:
    at a portal piece that is electrically and mechanically connected to one or more track pieces such that mechanical connections align a track portion of the portal piece with the one or more track pieces and cause the track portion of the portal piece to form at least a portion of the physical toy vehicle track, monitoring data received at couplers associated with the portal piece for an enumeration request, the data being received from a track piece of the one or more track pieces;
    responding to the enumeration request with an assignment of an enumeration address for the track piece, the enumeration address being assigned based on at least an orientation of the track piece and a location of the track piece within a track layout; and
    storing the enumeration address to maintain updated information about the configuration of the track layout.

2. The method of claim 1, further comprising:
    determining the enumeration address based on a sequential scheme, with track pieces disposed closer to the portal piece receiving lower numbers.

3. The method of claim 2, wherein the sequential scheme reserves a first set of numbers for track pieces determined to be oriented in a normal orientation and reserves a second set of numbers for track pieces determined to be oriented in a reverse orientation, the first set and the second set including different numbers.

4. The method of claim 1, wherein storing further comprises updating construction tables to store a track type, the orientation, and the location of the track piece, wherein the construction tables comprise:
    a track type table that stores the track type of the one or more track pieces;
    an upstream table that stores upstream neighbors of the one or more track pieces; and
    a downstream table that stores downstream neighbors of the one or more track pieces.

5. The method of claim 1, wherein the method further comprises:
    detecting a disconnect of one of the one or more track pieces; and
    reassigning enumeration addresses for all of the one or more track pieces in response to the disconnect.

6. The method of claim 1, further comprising:
    if the portal piece is connected to a computing device that is usable independently from toy vehicle track system, transmitting data representative of the configuration to the computing device so that the computing device can create a digital representation of the configuration; and
    if the portal piece is not connected to the computing device, storing the data representative of the configuration in local memory until the portal piece is connected to the computing device.

7. The method of claim 1, wherein the method allows the one or more track pieces to be unaware of their location, their orientation, or both.

8. The method of claim 1, wherein each of the couplers is further associated with a different serial data circuit and the portal piece identifies the location of a particular track piece based, at least in part, on a serial data circuit associated with a particular coupler that is communicating with the particular track piece.

9. The method of claim 1, wherein the portal piece further comprises a base portion, the track portion of the portal piece being defined in a passageway defined by the base portion.

10. The method of claim 9, wherein the base portion of the portal piece comprises a housing that defines one or more internal cavities for electrical components.

11. The method of claim 1, wherein the portal piece is electrically connected to the one or more track pieces via a portal connector that is accessible from an external surface of the portal piece.

12. The method of claim 11, wherein the portal connector is coupleable to a base connector of a base piece, the base piece including the couplers associated with the portal piece.

13. The method of claim 12, wherein the base piece includes a portal receptacle to which the portal piece may be mechanically coupled.

14. The method of claim 1, wherein the enumeration request includes a birth certificate that identifies a track type of the track piece and a temporary enumeration address and the assignment of the enumeration address comprises a new enumeration address for the track piece that is usable for the configuration of the physical toy vehicle track, the new enumeration address being different than the temporary enumeration address.

15. The method of claim 14, wherein the temporary enumeration address and the enumeration request are transmitted in a payload of a packet structure that includes a source identification, a target identification, and the payload, wherein the payload does not exceed 500 bytes.

16. The method of claim 14, further comprising:
prior to the monitoring of the data, determining that the portal piece is a most upstream portal piece in the track layout.

* * * * *